US007455375B2

(12) United States Patent
Coffin et al.

(10) Patent No.: US 7,455,375 B2
(45) Date of Patent: *Nov. 25, 2008

(54) REMOVABLE MEDIA STORAGE METHOD AND DEVICE FOR A DATA STORAGE SYSTEM

(75) Inventors: Paul Clinton Coffin, Fort Collins, CO (US); Robert L. Mueller, Windsor, CO (US); Gregg S. Schmidtke, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

This patent is subject to a terminal disclaimer.

(21) Appl. No.: 09/938,159

(22) Filed: Aug. 23, 2001

(65) Prior Publication Data
US 2003/0042824 A1    Mar. 6, 2003

(51) Int. Cl.
*G11B 21/08* (2006.01)
(52) U.S. Cl. .................. 312/333; 312/9.43; 312/334.31; 360/92
(58) Field of Classification Search .............. 369/35.01, 369/191, 34.01, 192, 36.01, 38.01, 178.01, 369/75.1; 360/98.04, 92, 98.06, 98.01; 312/223.1, 312/223.2, 332.1, 333, 334.24, 334.31, 330.1, 312/348.3; 361/683–686, 724–727
See application file for complete search history.

(56) References Cited

U.S. PATENT DOCUMENTS

| 4,440,458 | A | * | 4/1984 | Berkman .................. 312/348.3 |
| 4,538,729 | A | * | 9/1985 | Ackeret .................... 312/9.22 |
| 4,998,232 | A | | 3/1991 | Methlie et al. |
| 5,010,536 | A | | 4/1991 | Wanger et al. |
| 5,014,255 | A | | 5/1991 | Wanger et al. |
| 5,043,962 | A | | 8/1991 | Wanger et al. |
| 5,059,772 | A | | 10/1991 | Younglove |
| 5,383,722 | A | * | 1/1995 | Chen ........................ 312/348.3 |
| 5,537,371 | A | | 7/1996 | Niederlein et al. |
| 5,596,556 | A | * | 1/1997 | Luffel et al. ............. 369/30.45 |
| 5,847,897 | A | | 12/1998 | Marlowe |

(Continued)

FOREIGN PATENT DOCUMENTS

DE        4431917 A        3/1996

(Continued)

OTHER PUBLICATIONS

Mueller, Data Cartridge Exchange Apparatus, U.S. Appl. No. 09/257,322, filed Feb. 25, 1999.

(Continued)

*Primary Examiner*—Hanh V Tran

(57) ABSTRACT

Media storage devices for, and methods of storing data media in, a data storage system are provided. The data storage system may comprise a data exchange device configured to exchange data stored on data media and a media handling system configured to transfer the data media between the media storage device and the data exchange device. Briefly described, in one of many possible embodiments, the media storage device comprises a housing configured to receive the data media. The housing includes a first elongate alignment groove adapted to slidably engage with a corresponding first elongate reference rail located adjacent an opening in the data storage system such that the media storage device may be inserted and removed by slidably engaging the first elongate reference rail and the first elongate alignment groove.

24 Claims, 33 Drawing Sheets

U.S. PATENT DOCUMENTS

| | | | |
|---|---|---|---|
| 5,867,458 A | | 2/1999 | Barkley et al. |
| 5,940,354 A | * | 8/1999 | Inoue .................... 369/30.48 |
| 5,999,500 A | | 12/1999 | Mueller |
| 6,025,972 A | | 2/2000 | Schmidtke et al. |
| 6,038,126 A | * | 3/2000 | Weng ..................... 361/683 |
| 6,042,205 A | | 3/2000 | Coffin et al. |
| 6,058,016 A | * | 5/2000 | Anderson et al. .......... 361/727 |
| 6,065,819 A | * | 5/2000 | Holmes et al. ............ 312/215 |
| 6,116,063 A | * | 9/2000 | Foslien ................... 312/223.2 |
| 6,160,786 A | | 12/2000 | Coffin et al. |
| 6,166,900 A | * | 12/2000 | Flynn et al. ............. 312/223.2 |
| 6,209,842 B1 | * | 4/2001 | Anderson et al. ......... 312/223.2 |
| 6,227,630 B1 | * | 5/2001 | Brown et al. ............ 312/223.2 |
| 6,231,145 B1 | * | 5/2001 | Liu ........................ 312/332.1 |
| 6,424,526 B1 | * | 7/2002 | Heard ..................... 312/223.2 |
| 6,480,391 B1 | * | 11/2002 | Monson et al. ............ 361/724 |
| 6,643,091 B2 | * | 11/2003 | Coffin et al. ................. 360/92 |
| 6,643,226 B1 | | 11/2003 | Thayer et al. |
| 6,648,428 B2 | * | 11/2003 | Chaloner et al. ........... 312/9.43 |
| 6,813,113 B1 | * | 11/2004 | Mueller et al. ............. 360/92.1 |

FOREIGN PATENT DOCUMENTS

| | | | | |
|---|---|---|---|---|
| EP | 0780016 B | | 6/1997 | |
| EP | 0877367 A | | 11/1998 | |
| EP | 0997896 A3 | | 5/2000 | |
| EP | 1251504 A3 | | 10/2002 | |
| GB | 2233216 | * | 1/1991 | |
| JP | 404152598 | * | 5/1992 | ............ 361/727 |
| JP | 405191066 | * | 7/1993 | ............ 361/727 |
| JP | 7-161117 A | | 6/1995 | |

OTHER PUBLICATIONS

European Search Report dated Oct. 21, 2003.

Translation of JP Office Action dated, Jul. 3, 2007, pp. 1-4.

R.L. Mueller et al., JP 2000-251356A, "Data Cartridge Changer," 18 pages (Sep. 14, 2000).

P.C. Coffin et al., JP 2000-353371, "Medium Holder, and Method and Means for Fixing Medium Inside the Same," 12 pages (Dec. 19, 2000).

JP.H03-110826 (JP.H05-55351.U), "Structure for Preventing Disks From Dropping Out From an Autochanger," 2 pages.

R. Mueller, JP 11-031381, "Interlock Release Actuator System for Data Cartridge," 16 pages (May 7, 1998).

I. Kazuhiko, JP 10-255372, "Library Device," 21 pages (Mar. 17, 1997).

H.O. Kvifte et al., JP 07-130060, "Data Carrier Loader," 2 pages (May 2, 1994).

Claims of JP 10-506493A, 3 pages.

EP Search Report dated Sep. 27, 2006.

* cited by examiner

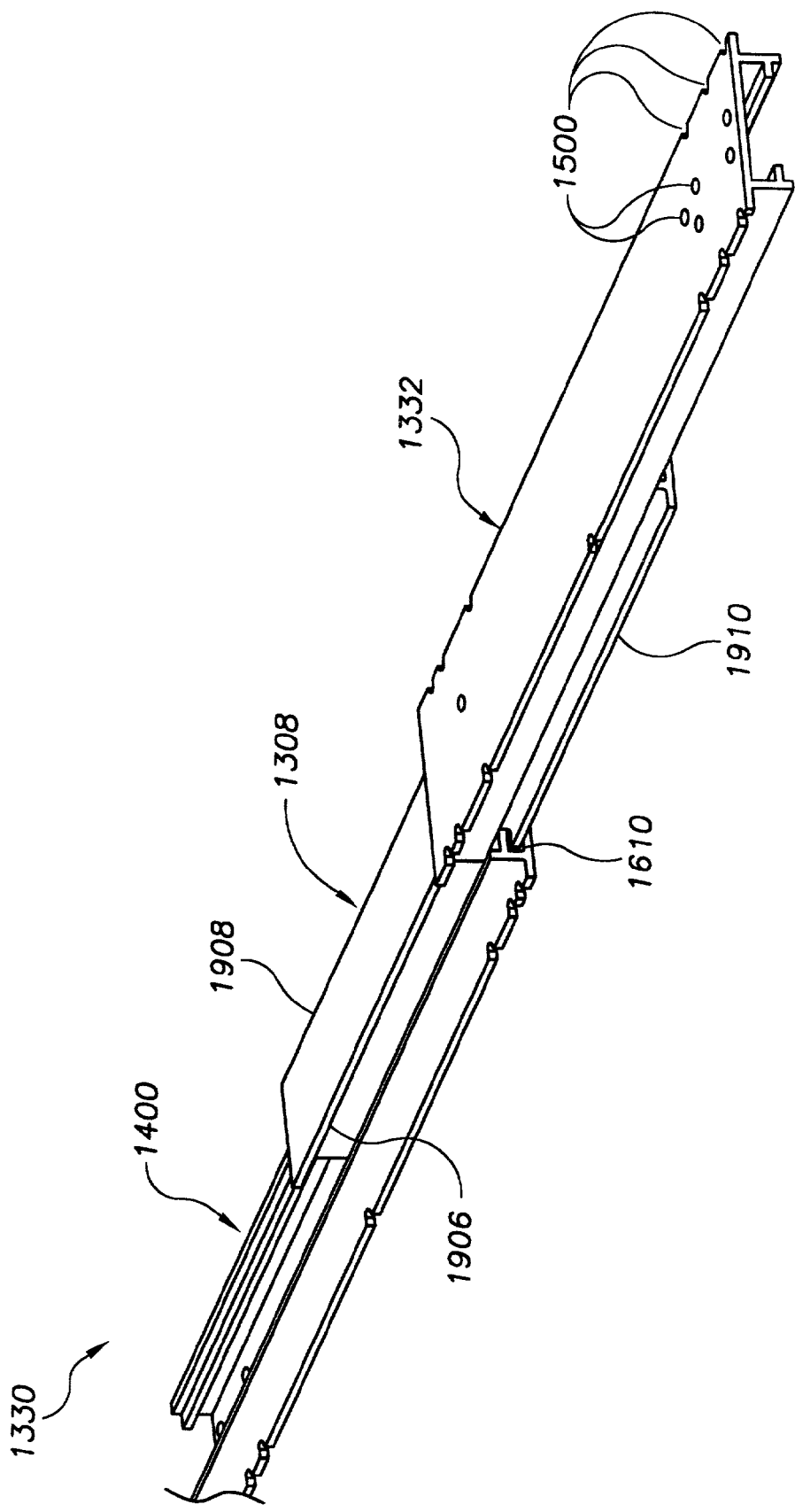

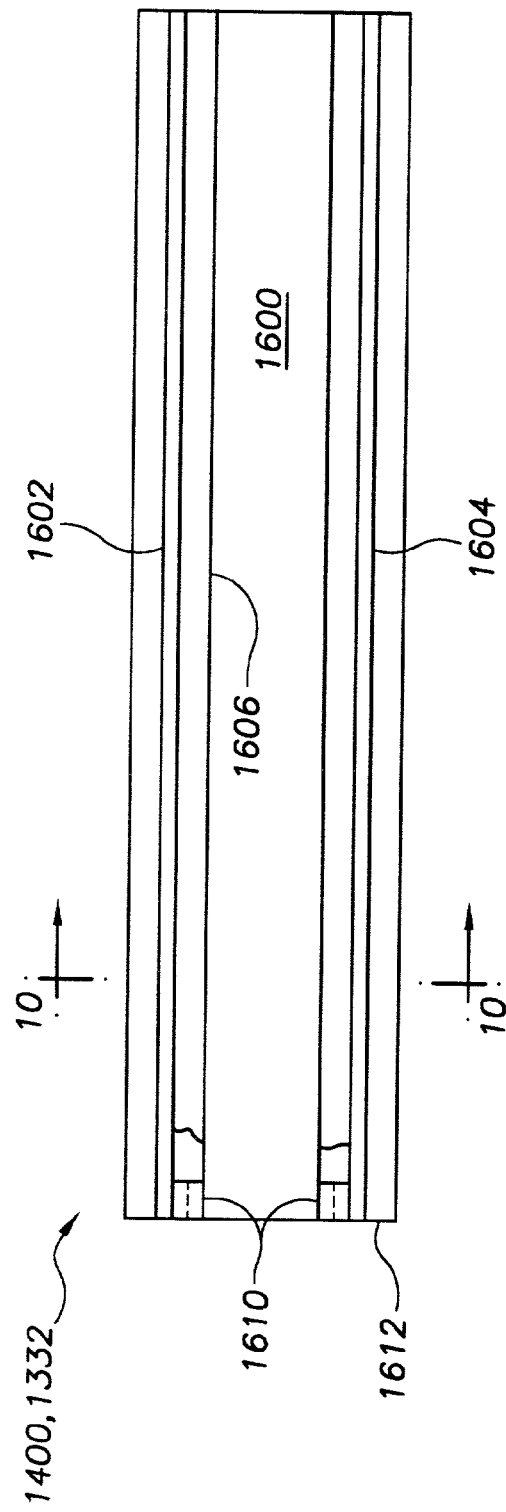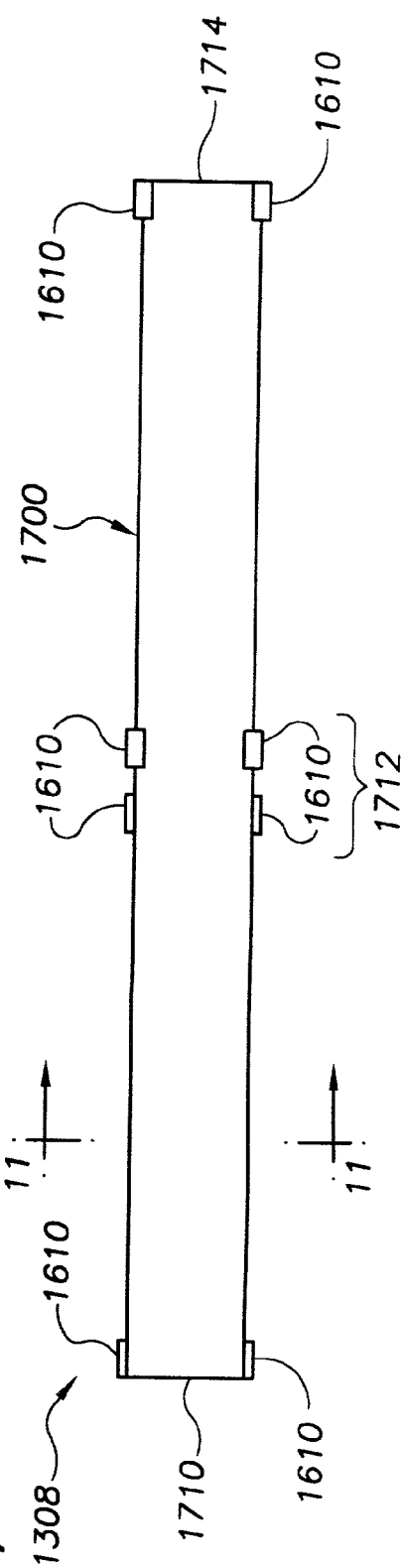

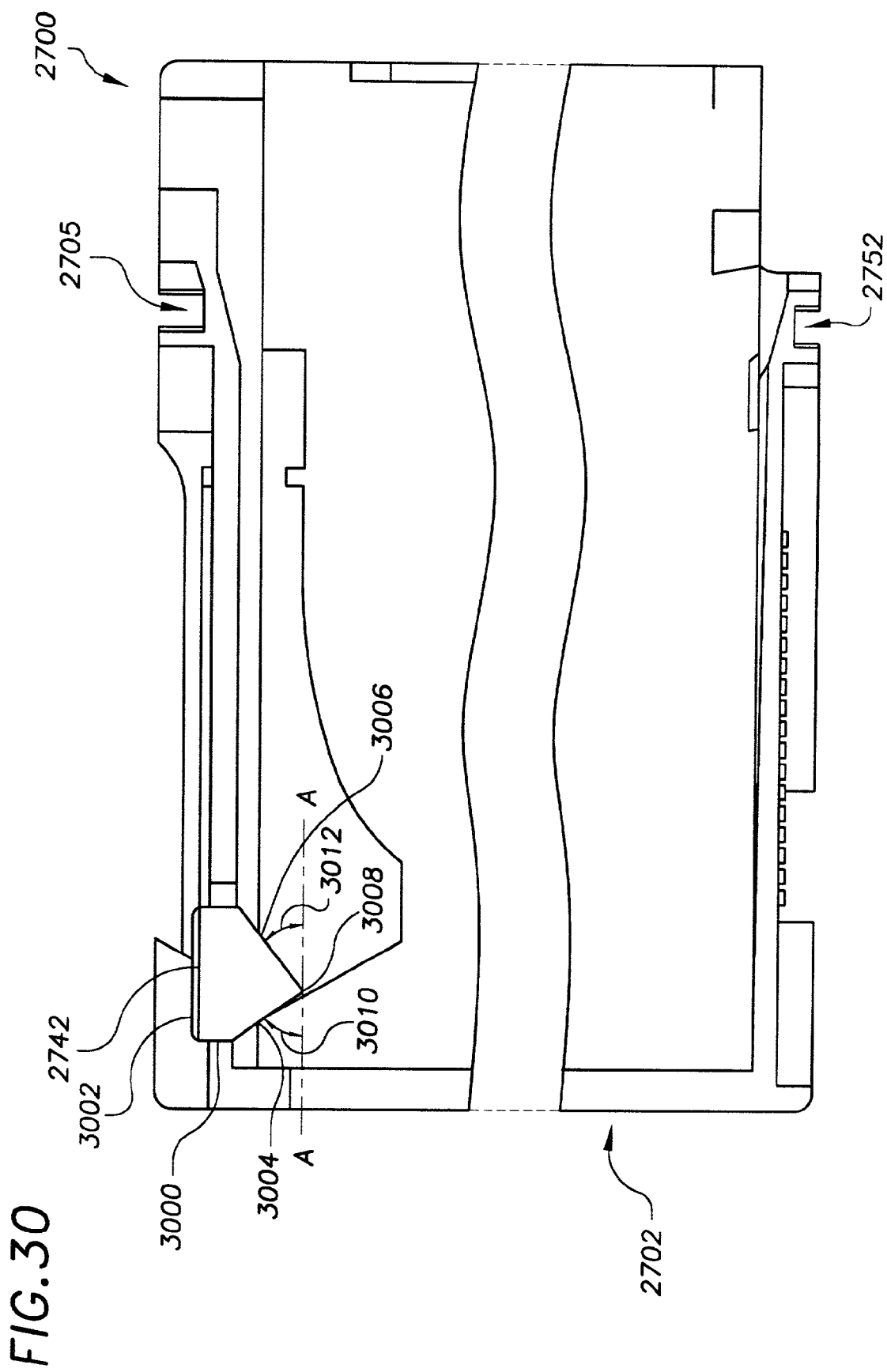

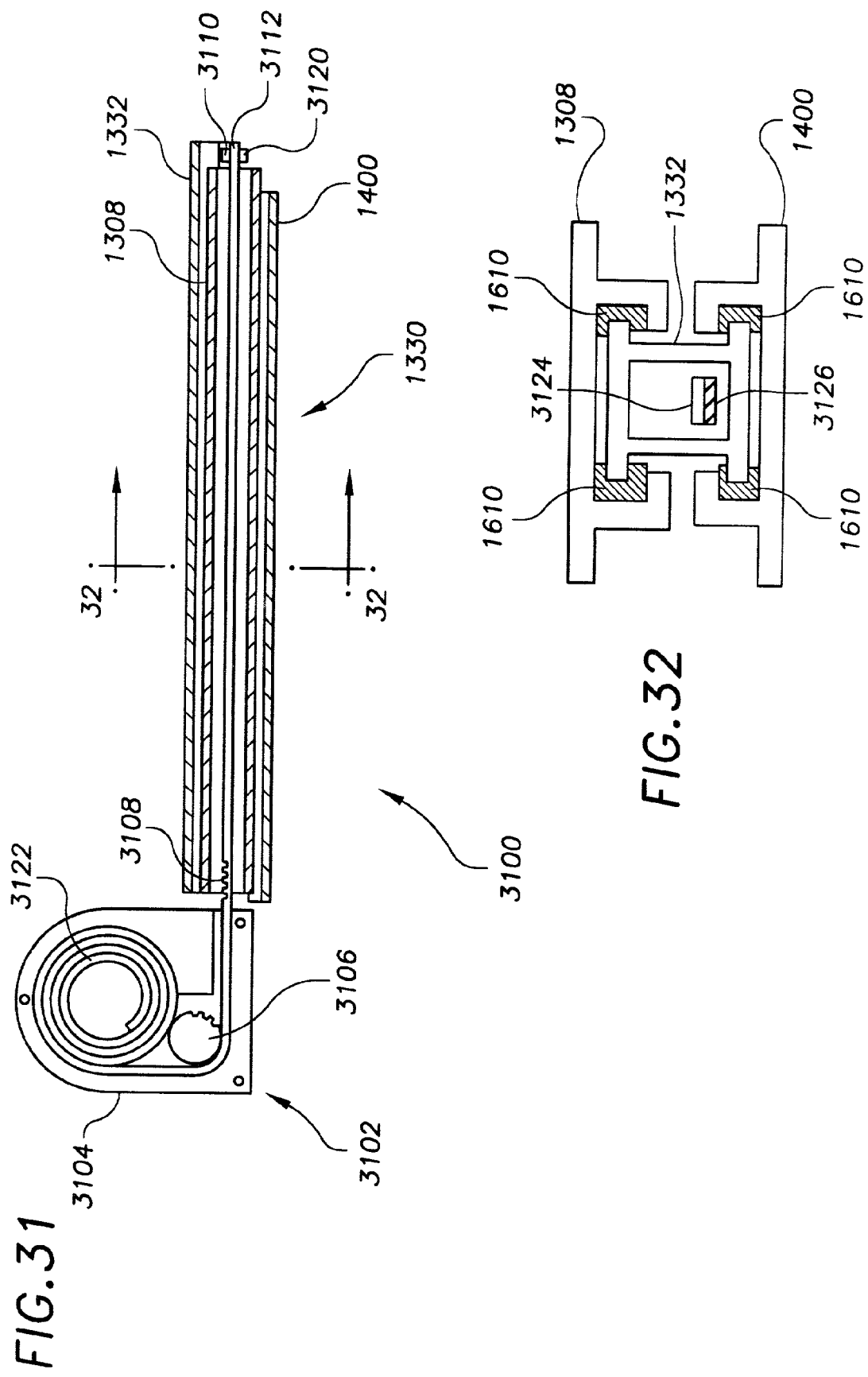

REMOVABLE MEDIA STORAGE METHOD AND DEVICE FOR A DATA STORAGE SYSTEM

TECHNICAL FIELD

The present invention is generally related to data storage systems, and more particularly is related to methods and devices for storing and providing access to data media in a data storage system.

BACKGROUND OF THE INVENTION

Many different types of data storage systems exist and are currently being used to store and access various types of data media, such as optical disks and magnetic tape cartridges to name a few, so that data may be read from and/or written to the data media. Typically, data storage systems include many media storage devices for storing a group of data media, one or more data exchange devices for reading from and/or writing to the data media, and a media handling device for transferring the data media between the media storage devices and the data exchange devices. A typical example of a data storage system is disclosed in U.S. Pat. No. 6,025,972 entitled "Multi-Plane Translating Cartridge Handling System," which is hereby incorporated by reference in its entirety.

The data media employed by data storage systems may be any of a variety of types of machine-readable devices capable of storing data, having the data read from the device by a data exchange device, and/or having the data written to the device by the data exchange devices. For instance, the data media may be a magnetic disk or tape, such as a digital linear tape (DLT) or an optical disk, such as a compact disc (CD) and a digital video disc (DVD). Depending on the type of data media employed by the data storage system, any of a variety of data exchange devices may be used.

The data exchange devices and the media storage devices are typically positioned at various locations around the media handling device so that the media handling device may access the data media stored in the media storage devices. Examples of media storage devices are disclosed in U.S. Pat. No. 6,042,205, entitled "Media Holding Device Incorporating A Media Locking Mechanism" and U.S. patent application Ser. No. 09/257,322 entitled "Data Cartridge Exchange Apparatus," which are hereby incorporated by reference in their entirety.

In many data storage systems, the media storage devices are arranged in a plurality of vertical stacks. Such data storage systems typically include a lift assembly engaged with, and for, moving the media handling device to access the data media arranged in the vertical stacks.

Data storage systems are usually connected to a host computer system that may access or store data on the data media. For example, if the host computer issues a request for data contained on a particular data medium, a control system associated with the data storage system may engage a positioning system to move the media handling system adjacent the desired data medium. The media handling system may then remove the data medium from the media storage device and transport it to the data exchange device. When properly positioned adjacent the data exchange device, the media handling system may insert the data medium in the data exchange device so that the host computer may access the data stored on the data medium.

It is often necessary and desirable for an operator or service personnel to periodically access the data media contained within the data storage system. Therefore, data storage systems may be configured in a variety of ways to enable the operator to access the data media. For example, as disclosed in U.S. Pat. No. 6,042,205, the media storage devices may implemented within a data media exchange apparatus providing an extendable drawer that can be pulled open to allow the operator to access the data media stored in the data storage system. However, present data storage systems have several disadvantages. These types of systems require multiple components: a mounting system, an extendable drawer attached to the mounting system, and one or more media storage devices configured to receive the data media and configured to be inserted within the extendable drawer. Accordingly, existing systems are more expensive to manufacture and more difficult to install in the data storage system.

SUMMARY OF THE INVENTION

The present invention provides removable media storage devices and methods for a data storage system. The data storage system may comprise a data exchange device configured to exchange data stored on data media and a media handling system configured to transfer the data media between the media storage device and the data exchange device.

The present invention may be viewed as a media storage device for storing and providing access to data media in a data storage system. Briefly described, in one of many possible embodiments, the media storage device comprises a housing configured to receive the data media. The housing includes a first elongate alignment groove adapted to slidably engage with a corresponding first elongate reference rail located adjacent an opening in the data storage system such that the media storage device may be inserted and removed by slidably engaging the first elongate reference rail and the first elongate alignment groove.

The present invention may also be viewed as providing a method of storing a data media in a data storage system. Briefly, one such method comprises the steps of: locating the data media within the media storage device, the media storage device configured to receive the plurality of data media and having a first elongate alignment groove; and inserting the media storage device into an opening in the data storage system by engaging the first elongate alignment groove with a first elongate reference rail located adjacent the opening in the data storage system and applying a force in a direction substantially parallel to the first elongate alignment groove.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 15 is a detailed diagram of the mounting system of FIG. 13.

FIG. 16 is a cross-sectional view of one of the guide rails in the mounting system of FIG. 15.

FIG. 17 is a cross-sectional view of another of the guide rails in the mounting system of FIG. 15.

FIG. 30 is a side cross-sectional view of the integrated media exchange/storage device of FIGS. 27-29 illustrating the operation of the spring mechanism.

FIG. 31 is a side view of one of many possible embodiments of an automated media exchange system according to the present invention that may be used to automatically retract and extend the data media exchange apparatus of FIGS. 12 and 24-26 in the data storage system of FIGS. 1-3.

FIG. 32 is an end view of the automated media exchange system of FIG. 31.

DETAILED DESCRIPTION OF A PREFERRED EMBODIMENT

I. Data Storage System

Figure 1:
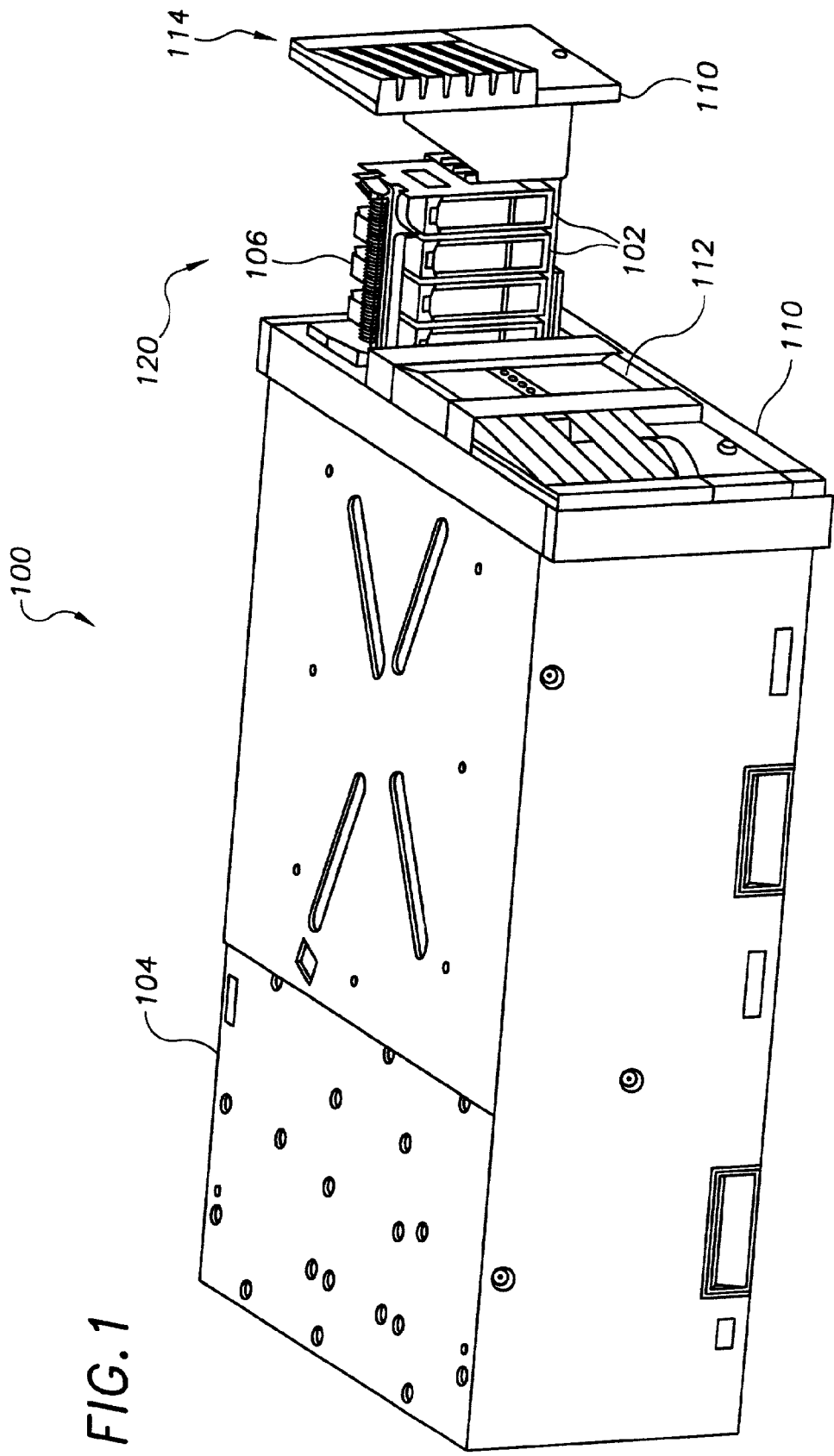
FIG. 1 is a perspective view of one of many possible embodiments of a data storage system.
Figure 2:
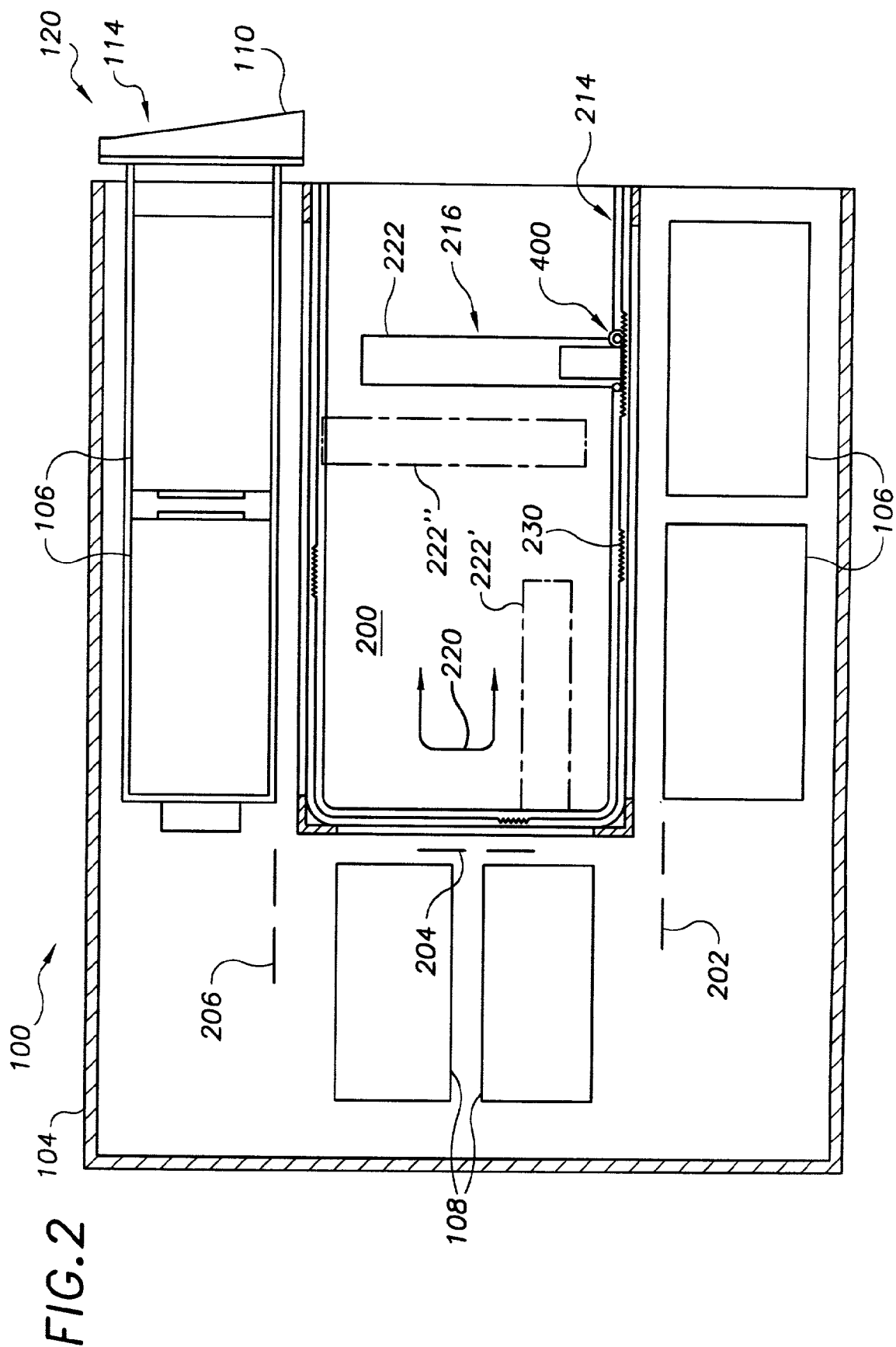
FIG. 2 is a top view diagram illustrating the internal arrangement of the components of the data storage system of FIG. 1.

FIGS. 1 and 2 illustrate a data storage system 100 for handling and storing various data media 102. Data storage system 100 may comprise a housing 104 that contains media storage devices 106, such as magazines, for storing a group of data media 102, data exchange devices 108 for reading from, and/or writing to, data media 102, a media handling system 200 for transferring data media 102 between media storage devices 106 and data exchange devices 108, media storage access panels 110, and handling system access panel 112. One of ordinary skill in the art will understand that housing 104 may also contain any of a variety of additional components or devices, such as control systems, processors, memory devices, software modules, and power supplies to name a few, which may be required or desired for operation of data storage system 100.

Data storage system 100 may be implemented in a number of different types of data storage systems. For example, data storage system 100 may be implemented within a data storage system of the type shown and described in U.S. Pat. No. 6,025,972 entitled "Multi-Plane Translating Cartridge Handling System." Although the present drawings illustrate a particular type of data storage system, one of ordinary skill in the art will understand that data storage system 100 may be implemented in any of a variety of alternative types of data storage systems.

In this regard, data media 102 may be any of a variety of types of machinereadable devices capable of storing data, having the data read from the device by data exchange devices 108, and/or having the data written to the device by data exchange devices 108. For example, data media 102 may be a magnetic disk or tape, such as a digital linear tape (DLT), an optical disk, such as a compact disc (CD) and a digital video disc (DVD), or any other type of data medium regardless of the way in which data is stored on the data medium 102, read from the data medium 102, and/or written to the data medium 102. Accordingly, data exchange devices 108 may be configured in a variety of different ways depending on the specific type of data medium 102 being used in data storage system 100.

Data exchange devices 108 and media storage devices 106 may be positioned at various locations around media handling system 200 so that they define the generally U-shaped configuration shown in FIG. 2. In this manner, media handling system 200 may access data media 102 from media access planes 202, 204, and 206. As one of ordinary skill in the art will understand, data exchange devices 108, media storage devices 106, and media handling system 200 may be arranged in numerous alternative configurations.

Media storage devices 106 may be configured in a variety of ways. For example, media storage device 106 may be configured as disclosed in U.S. Pat. No. 6,042,205. As described in more detail below, media storage devices 106 may be implemented within a data media exchange apparatus 120. Data media exchange apparatus 120 may comprise a retractable drawer 114, such as disclosed in U.S. patent application Ser. No. 09/257,322 entitled "Data Cartridge Exchange Apparatus." In other embodiments, data media exchange apparatus 120 may be implemented without the need for the retractable drawer. For example, as described below with respect to FIGS. 27-30, data media exchange apparatus 120 according to the present invention may be configured to eliminate the need for the retractable drawer.

Figure 3:
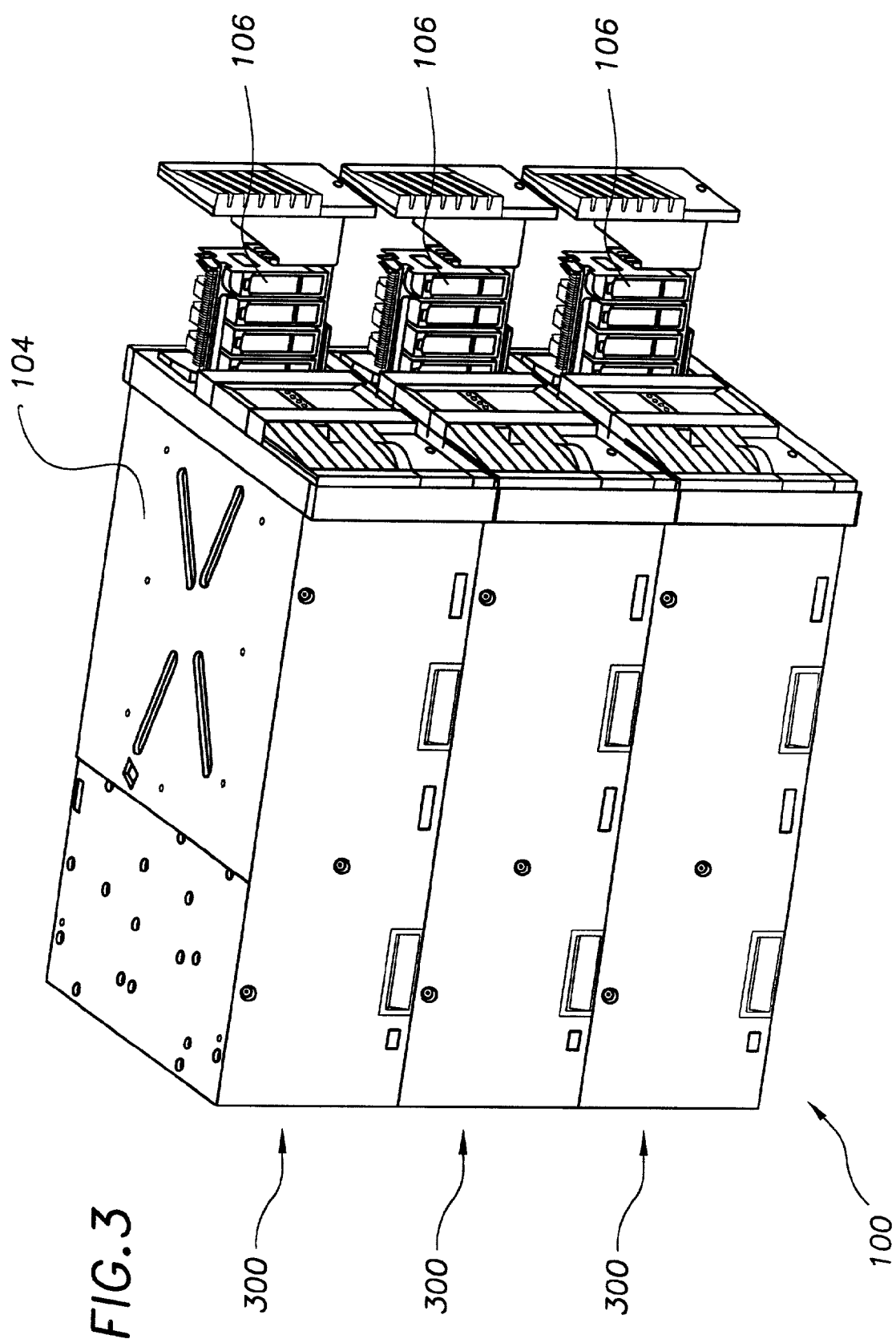
FIG. 3 is a perspective view of another embodiment of a data storage system.

As illustrated in FIG. 3, housings 104 may be arranged in vertical stacks to expand the capacity of data storage system 100. Media storage devices 106 in housings 104 may be arranged so that they form a plurality of vertical stacks 300 in data storage system 100. As described in detail below, where data storage system 100 includes a large number of data media 102 arranged in vertical stacks 300, data storage system 100 may further comprise a lift assembly 600 for moving media handling system 200 to access data media 102.

II. Media Handling System

Figure 4:
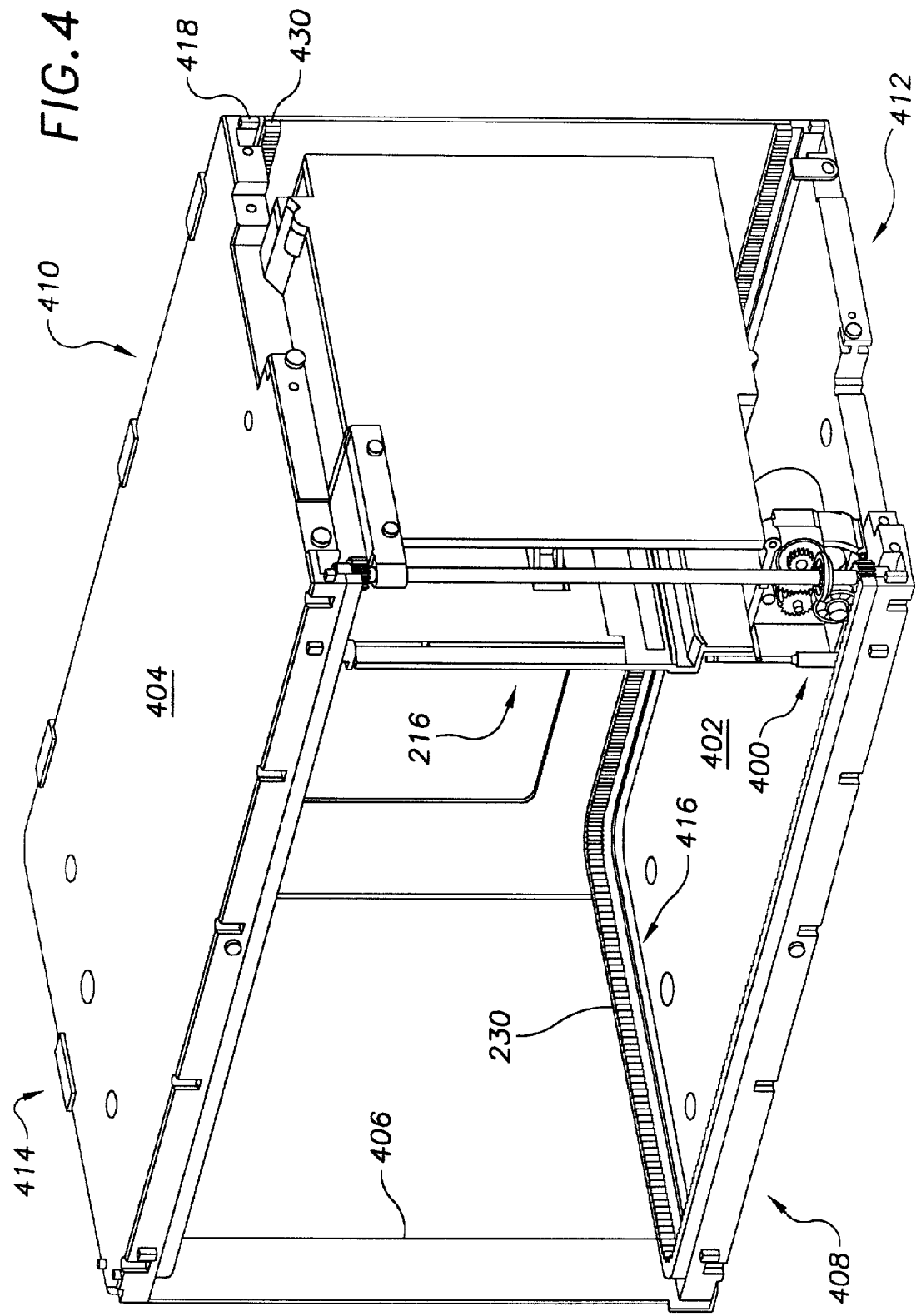
FIG. 4 is a perspective view of the media handling system in the data storage system of FIGS. 1-3.

Referring to FIGS. 2 and 4, media handling system 200 may comprise a frame assembly 214, a data medium access device 216, and a positioning system 400. Frame assembly 214 may comprise a lower or base plate 402 and an upper or top plate 404 that are held in generally parallel, spaced-apart relation by a support structure 406. Frame assembly 214 may define a generally rectangularly-shaped structure having a first lateral side portion 408, a second lateral side portion 410, a front side portion 412, and a back side portion 414. By way of example, frame assembly 214 may be positioned within data storage system 100 such that lateral side portions 408 and 410 are adjacent to one or more media storage devices 106, front side portion 412 is adjacent to handling system access panel 112, and back side portion 414 is adjacent one or more data exchange devices 108. However, one of ordinary skill in the art will understand that the configuration of frame assembly 214 may be varied depending on the specific positioning of media storage devices 106, data exchange devices 108, and handling system access panel 112 within data storage system 100. The important aspect is that media handling system 200 transports data media 102 between media storage devices 106 and data exchange devices 108.

Lower plate 402 of frame assembly 214 may include a lower U-shaped guide member or channel 416 that forms a substantially continuous member along first lateral side portion 408, second lateral side portion 410, and back side portion 414 of frame assembly 214. Similarly, upper plate 404 may include an upper U-shaped guide member or channel 418 that also forms a substantially continuous member along first lateral side portion 408, second lateral side portion 410, and back side portion 414 of frame assembly 214.

Media handling system 200 may further comprise a data medium access device 216 configured for loading data media 102 to and from media storage devices 106 and data exchange devices 108. In certain embodiments, data media access device 216 may be configured as described in U.S. patent application Ser. No. 09/045,558, entitled "Cartridge Engaging Assembly with Rack Drive Thumb Actuator System," which is hereby incorporated by reference in its entirety. In other embodiments, data medium access device 216 may be configured as described in the following U.S. patents, which are all hereby incorporated by reference in their entirety: U.S. Pat. No. 4,998,232 entitled "Optical Disk Handling Apparatus with Flip Latch;" U.S. Pat. No. 5,010,536 entitled "Cartridge Handling System;" U.S. Pat. No. 5,014,255 entitled "Optical Disk Cartridge Handling Apparatus with Passive Cartridge Engagement Assembly;" and U.S. Pat. No. 5,043,962 entitled "Cartridge Handling System." The precise configuration of data medium access device 216 is not relevant. Thus, one of ordinary skill in the art will appreciate that there are various other embodiments of data medium access device 216.

Data medium access device 216 engages upper and lower U-shaped guide members 416 and 418 along first lateral side portion 408, second lateral side portion 410, and back side portion 414 of frame assembly 214. In other words, data medium access device 216 moves along a generally U-shaped path 220 corresponding to guide members 416 and 418. For example, as illustrated in FIG. 2, data medium access device 216 may be moved between a first position 222 adjacent first lateral side portion 408, a second position 222' adjacent back side portion 414, and a third position 222" adjacent second lateral side portion 410. Obviously, data medium access device 216 may also be moved in any of a variety of other ways. For instance, data medium access device 216 may be moved from a position adjacent second lateral side portion 410 to positions adjacent back side portion 414 and first lateral side portion 408. The important aspect is that depending on the particular configuration of frame assembly 214 and the particular arrangement of media storage devices 106 and data exchange devices 108 within data storage system 100, data medium access device 216 may retrieve and provide data media 102 by being moved adjacent media storage devices 106 and data exchange devices 108.

Figure 5:
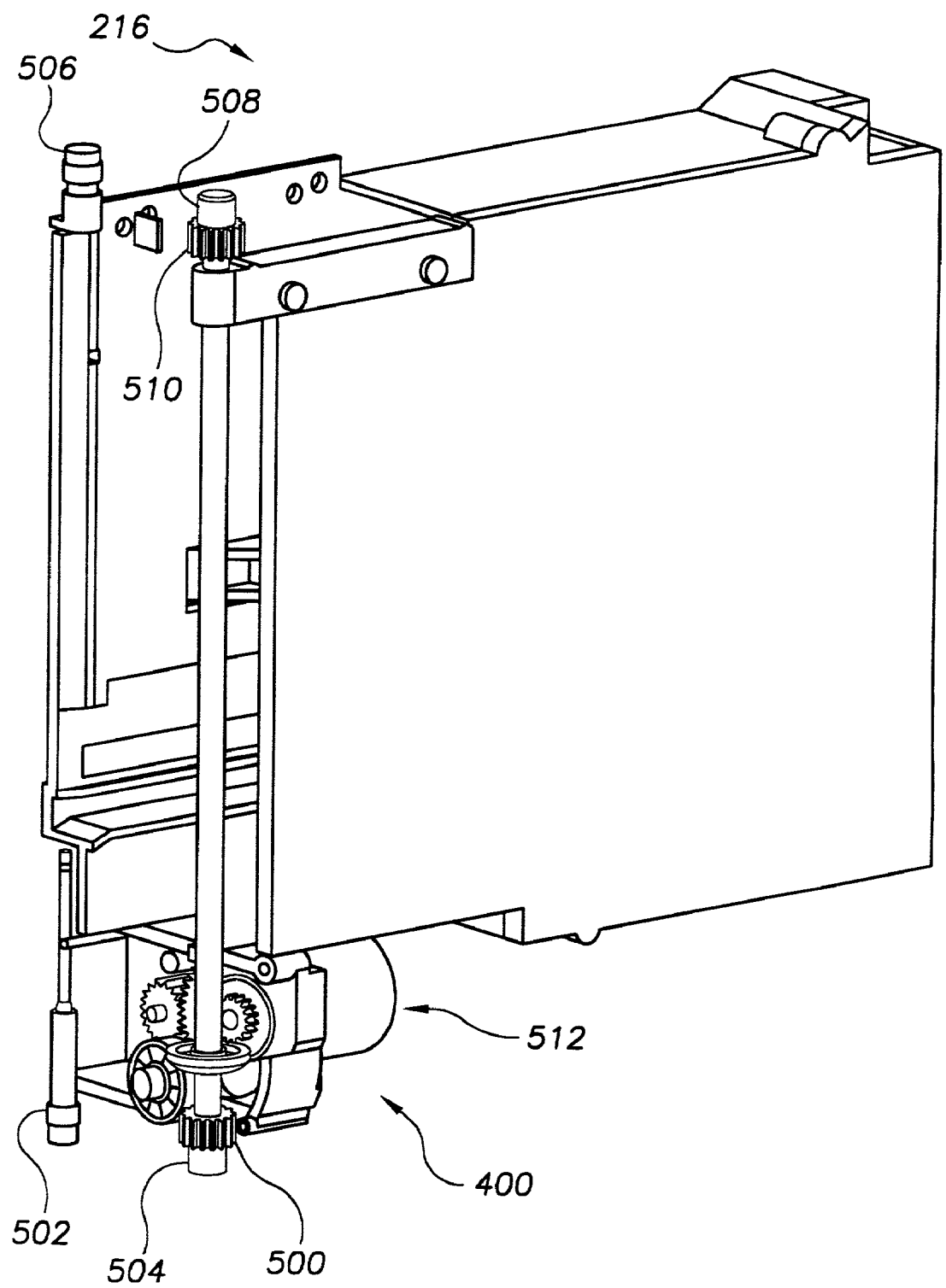
FIG. 5 is a perspective view of one of many possible embodiments of a data medium access device according to the present invention that may be used in the media handling system of FIG. 4.

Data medium access device 216 may be moved along lower and upper guide members 416 and 418 by positioning system 400. FIG. 5 illustrates one of a number of possible embodiments of data medium access device and positioning system 400. Positioning system 400 may comprise a rack and pinion drive system having a substantially continuous lower gear rack 230 mounted adjacent U-shaped guide member 416. A lower pinion gear 500 may be mounted to data medium access device 216 so that it engages lower gear rack 230. A pair of lower bearing members 502 and 504 mounted to data medium access device 216 may be configured to be received by guiding member 416. Data medium access device 216 may also comprise a pair of upper bearing members 506 and 508 and an upper pinion gear 510, which engage upper U-shaped guide member 418 and an upper U-shaped gear rack 430 provided on upper plate 404. A drive pinion actuator 512 may be used to drive lower and upper pinion gears 500 and 510 and position data medium access device 216 along U-shaped path 220.

In operation, data storage system 100 may be used to transfer data media 102 between media storage devices 106 and data exchange devices 108 positioned throughout data storage system 100. For example, data storage system 100 may be used by a host computer (not shown) or other data processing system to store and access data contained in data media 102. If the host computer system issues a request for data stored on a particular data medium 102, a control system (not shown) associated with data storage system 100 may operate positioning system 400 as necessary to position data medium access device 216 until it is located adjacent the appropriate data medium 102.

For instance, a desired data medium 102 may be stored in data storage system 100 in one of media storage devices 106. Upon receiving a request for the data medium 102 from the host computer system, the control system operates positioning system 400 to move data medium access device 216 along U-shaped path 220 until it is adjacent the selected data medium 102 in media storage device 106. Data medium access device 216 then loads the data medium 102 and positioning system 400 moves data medium access device 216 to a data exchange device 108. Once properly positioned adjacent the desired data exchange device 108, data medium exchange device 216 loads the data medium 102 into the desired data exchange device 108. As one of ordinary skill in the art will understand, the host computer system may then access the data on the data medium 102.

When the data medium 102 is no longer needed, the control system may operate actuator 512 to move data medium access device 216 along U-shaped path 220 until data medium access device 216 is again located adjacent the data exchange device 108 (if data medium access device 216 is not already located in the appropriate position). Thereafter, data medium access device 216 may retrieve the data medium 102 from data exchange device 108. Data medium access device 216 may then return the data medium 102 to an appropriate location in media storage device 106.

As stated above with respect to FIG. 3, in various embodiments of data storage system 100, media storage devices 106 may be arranged in a plurality of vertical stacks 300. In such embodiments, data storage system 100 further comprises a lift assembly 600 (FIG. 6) operable to engage with and move moving media handling system 200 to access data media 102 arranged in the vertical stacks 300. The precise configuration of lift assembly 600 is not critical. As understood by one of ordinary skill in the art, lift assembly 600 may be configured in any of a variety of ways.

Figure 6:
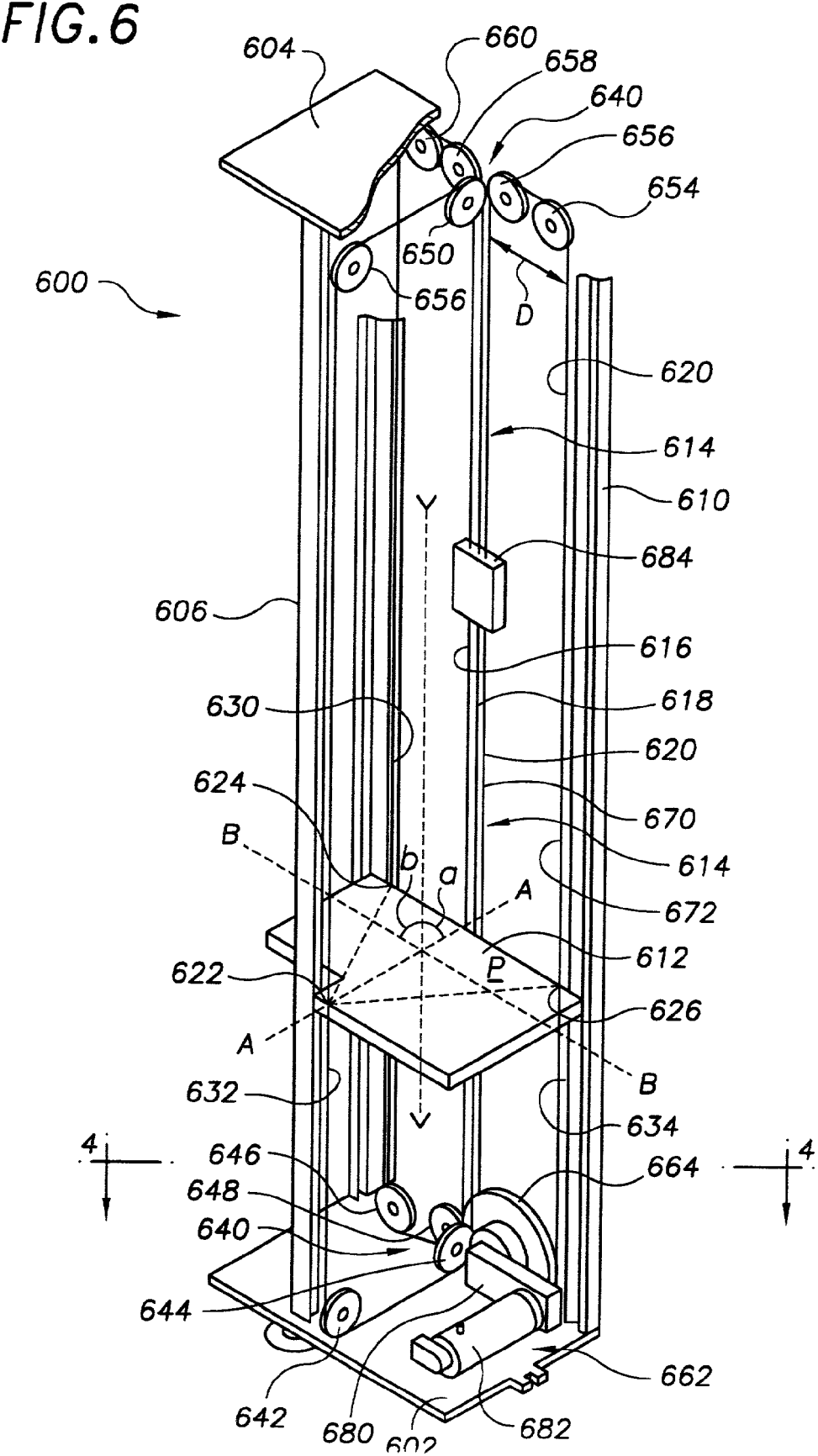
FIG. 6 is a perspective view of one of many possible embodiments of a lift assembly according to the present invention that may be used in the data storage system of FIG. 3.

Although any configuration may be used, as illustrated in FIG. 6, lift assembly 600 may be configured as disclosed in U.S. Pat. No. 5,596,556, entitled "Linear Displacement and Support Apparatus for Use in a Cartridge Handling System," which is hereby incorporated by reference in its entirety. Lift assembly 600 may comprise a lower base plate 602, an upper base plate 604, a plurality of vertical beams 606, 608, and 610 fixedly attached at opposite ends to the upper and lower base plates 604 and 602, and a lift frame 612. Media handling system 200 may be fixedly secured to lift frame 612. As described in detail below, media handling system 200 is preferably removably secured to lift frame 612 so that media handling system 200 may be easily detached from lift frame 612 and removed from data storage system 100 via handling system access panel 112. Base plates 602 and 604 and vertical beams 606, 608, and 610 are each preferably constructed from a high-strength, yet lightweight, material, such as thin steel, aluminum, or any other material with desirable properties.

Lift assembly 600 may include elongate flexible member means 614 fixedly secured to lift frame 612 for providing support thereto and for applying a driving force thereto to displace lift frame 612 and media handling system 200 up and down in the vertical direction to access data media 102 arranged in vertical stacks 300. Elongate flexible member means 614 may comprise a plurality of elongate flexible members 616, 618, and 620. Each of the elongate flexible members 616, 618, and 620 maybe comprised of a cable, such as that sold under the product name wire rope and manufactured by Sava Industries. As understood by one of ordinary skill in the art, elongate flexible members 616, 618, and 620 may also be comprised of any other desirable material, such as, for example, a frictionally-driven belt, a toothed belt, a steel band, or a chain.

Elongate flexible members 616, 618, and 620 are fixedly secured in any conventional manner at one or more points, for example, 622, 624, and 626, respectively, to lift frame 612. For example, when elongate flexible members 616, 618, and 620 are comprised of cables, each cable may be provided with one or more ball-shaped fittings (not shown) fixedly secured to the cable which may be fitted into corresponding grooves (not shown) on the lift frame 612.

Figure 7:
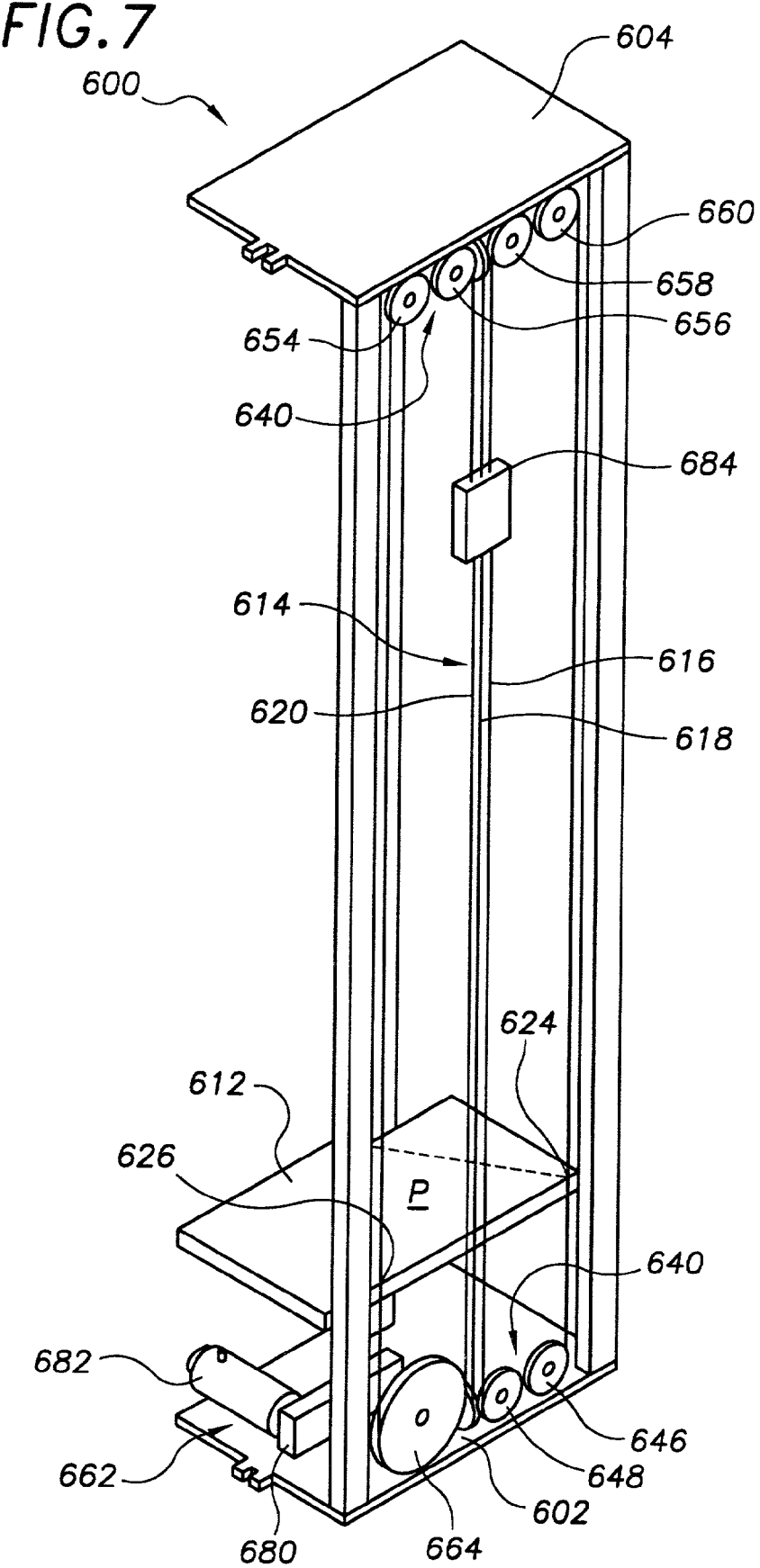
FIG. 7 is another perspective view of the lift assembly of FIG. 6.

In a preferred embodiment as shown in FIGS. 6 and 7, at least three elongate flexible members 616, 618, and 620 are provided. Each elongate flexible member 616, 618, and 620 is preferably fixedly secured to lift frame 600 at one or more points 622, 624, and 626, respectively, so that lift frame 612 and media handling system 200 are supported by at least three points.

Furthermore, at least three of these points, e.g. 622, 624, and 626, are not located along the same axis. The three points 622, 624, and 626 thus define plane "P" extending perpendicularly to the displacement path "VV" of the lift frame 612 as shown in phantom in FIG. 6.

Such multiple-point support facilitates planar stability for lift frame 612 and media handling system 200. For example, if the lift frame 612 and media handling system 200 were supported at a single point there would be a tendency to rotate around that point. Similarly, if the lift frame 612 and media handling system 200 were supported at only two points there would be a tendency to rotate around the axis on which the two points are located. However, these problems can be avoided by providing a lift frame 612 that is supported at three (or more) points 622, 624, and 626 such as described above.

The elongate flexible member means 614 is preferably constructed and arranged with at least three linear strand portions 630, 632, and 634 extending parallel to the displacement path VV. Each linear strand portion 630, 632, and 634 is defined as a section of each elongate flexible member 616, 618, and 620, respectively, extending above and below the point 622, 624, and 626, respectively, at which the member 616, 618, and 620 is attached to the lift frame 612. The linear strand portions 630, 632, and 634 all move in the same direction at the same rate in response to drive force applied to the elongate flexible member means 614, as described in greater detail below.

With continued reference to FIGS. 6 and 7, lift assembly 600 may also include flexible member engagement means 640 fixedly positioned relative to the displacement path VV. A function of the flexible member engagement means 640 is to maintain the plurality of elongate flexible member means 616, 618, and 620 and linear strand portions 630, 632, and 634 in parallel relationship with the displacement path VV. Another function of the flexible member engagement means 640 is to tension the elongate flexible member means 616, 618, and 620.

The flexible member engagement means 640 preferably comprises a plurality of pulley members 642, 644, 646, 648, 650, 652, 654, 656, 658, and 660. Four pulley members (e.g. 642, 644, 646 and 648) are preferably mounted on the lower base plate 603, and six pulley members are preferably mounted on the upper base plate 604, as shown in FIG. 6. Each pulley member may have a diameter of, e.g., 1.8 inches, and a width of, e.g., 0.6 inches. Alternatively, the flexible member engagement means 640 may be comprised of rollers, toothed pulleys, or the like, which may depend upon the type of elongate flexible members used (e.g. frictionally-driven belts, toothed belts, steel bands, chains, etc.).

In a preferred embodiment, the pulley members may be configured in pairs having parallel rotation axes which may be comprised of a first pair 642, 644 mounted on the lower base plate 602; a second pair 646 and 648 mounted on the lower base plate 602 perpendicularly to the first pair 642, 644; a third pair 650, 652 mounted on the upper base plate 604 directly above and parallel to the first pair 642, 644; a fourth pair 654, 656 mounted on the upper base plate 604 perpendicularly to the third pair 650, 652 and directly above the drive means 662 and capstan 664 (the drive means 662 and capstan 664 are described in more detail below); and a fifth pair 658, 660 mounted on the upper base plate 604 parallel to the fourth pair 654, 656 and directly above the second pair 646, 648. Alternatively, each pulley member pair may be replaced by a single, larger pulley member (not shown) which has a diameter "D", equal to the distance between the outer portions of each pulley member pair. Three or more pulley members (not shown) may also replace each pulley member pair.

Each elongate flexible member 616, 618, and 620 is in nonslipping engagement with at least one pulley member pair. Two of the elongate flexible members are preferably each associated with two pulley member pairs; one pair mounted on the lower base plate 602, and the other pair mounted on the upper base plate 604.

Specifically, elongate flexible member 616 may be in nonslipping engagement with pulley member pair 646, 648 on the lower base plate 602 and pulley member pair 658, 660 on the upper base plate 604. Elongate flexible member 618 may be similarly associated with pulley member pair 642, 644 on the lower base plate 602 and pulley member pair 650, 652 on the upper base plate 604. Elongate flexible member 620 may be similarly associated with pulley member pair 654, 656 on the upper base plate 604, and member 620 may be nonslipping engaged with a drive means 662 capstan 664 mounted on the lower base plate 602, as described in further detail below.

As shown in FIGS. 6 and 7, each elongate flexible member 616, 618, and 620 is preferably configured in a continuous loop with two vertical portions (e.g. 670, 672 of member 620). The pulley members associated with each elongate flexible member 616, 618, and 620 loop are spaced apart sufficiently, and each elongate flexible member 616, 618, and 620 has an appropriate length (e.g. 120 inches), to maintain each elongate flexible member 616, 618, and 620 taut about the associated pulley members 642, 644, 646, etc. Thus, all of the vertical portions (e.g. 670, 672) of all of the flexible members are taut and parallel.

Since elongate flexible members such as cables may stretch and slacken over time, one or more conventionally-known tensioning devices (not shown) may be provided for each elongate flexible member 616, 618, and 620. Tensioning devices may be mounted, for example, with pulley members 642, 644, 646, etc. so that the pulley members may be adjusted to take up any slack in the elongate flexible members 616, 618, and 620. Tensioning devices may alternatively be mounted along each elongate flexible member 616, 618, and 620, for example, at the points 622, 624, and 626 where the members 616, 618, and 620 are attached to lift frame 612.

Lift assembly 600 may further include drive means 662 operatively connected to the elongate flexible member means 640 for simultaneously driving the linear strand portions 630, 632, and 634 in the same direction at the same rate as described above. The drive means 662 may be comprised of a capstan 664 mounted on the lower base plate 602 directly below the fourth pulley member pair 654, 656. The capstan 664 may be operatively connected to an electric drive motor 666 by a conventional gear box 680 or the like. To maintain the vertical portions of all of the flexible members parallel to one another as described above, the capstan 664 preferably has a diameter equal to that of one pulley member pair, i.e. the capstan 664 has a diameter equal to the diameter "D" of the fourth pulley member pair 654, 656. The capstan 664 may also have a width of, e.g., 1.0 inch. The electric drive motor 682 is preferably a ⅛ hp, 24 V dc motor, such as manufactured by Electro-Craft. The drive means 662 may further include a remotely mounted computer control system (not shown) for controlling the vertical displacement of lift frame 612 through appropriate control commands to motor 682.

In the preferred embodiment as shown in FIGS. 6 and 7, one elongate flexible member 620 is nonslippingly engaged with the capstan 664 so that the member 620 is driven by the drive means 662. Member 620 may be connected to the capstan 664 in any conventional manner. For example, a member 620 that is comprised of a cable could be provided with ball-shaped ends which could each be fitted into corresponding holes or "keys" in the capstan and thus held in place. A member 620 that is comprised of an endless belt could be wrapped around the capstan 664 and held in nonslipping engagement with the capstan 664 by frictional force.

The elongate flexible members 616, 618, and 620 may be retained together at one or more points in any conventional manner, such as by one or more couplers (only one shown) or the like, which allows the elongate flexible members 616, 618 to be driven with and at the same rate as member 620. As previously described, elongate flexible members 616, 618, and 620 are fixedly connected to lift frame 612 at points 622, 624, and 626, respectively. Therefore, when the elongate flexible members 616, 618, and 620 are driven, points 622, 624, and 626 of lift frame 612 are displaced at the same rate and thus maintain lift frame 612 at a fixed orientation relative to its displacement path VV. In other words, longitudinal and lateral axes AA, BB of lift frame 612 each remain oriented at fixed angles "a" and "b", respectively, with the axis of the displacement path VV. The elongate flexible members 616, 618, and 620 thus act to support and maintain the stability of lift frame 612 as well as to linearly displace it.

Figure 8:
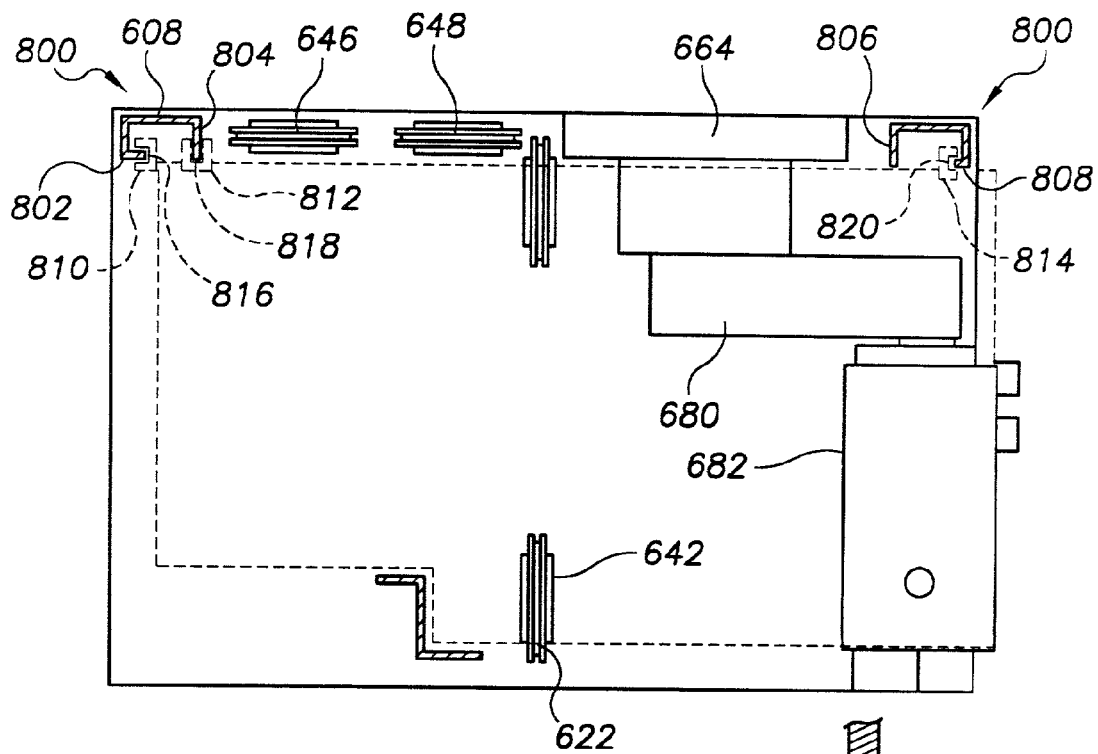
FIG. 8 is top view of the lift assembly of FIGS. 6 and 7.

As shown in FIGS. 6 and 8, lift assembly 600 may further comprise guide means 800 for preventing transverse and/or rotational displacement of lift frame 612. Guide means 800 is best shown in FIG. 8, which is a top plan view taken at Section 4-4 of FIG. 6, with portions thereof, including the elongate flexible member means 614, removed for clarity, and with lift frame 612 shown in phantom. As illustrated in FIG. 8, guide means 800 may include one or more, and preferably two, guide posts which are substantially U-shaped in cross-section and which maybe comprised of vertical beams 608, 610. Each of the vertical beams 608, 610 has two edge portions 802, 804 and 806, 808, respectively.

The guide means 800 may also include a plurality of bearing members 810, 812, 814 (shown in phantom). The bearing members 810, 812, and 814 are preferably comprised of bushing members which are also substantially U-shaped in cross-section and which are mounted on lift frame 612. However, the bearing members 810, 812, and 814 may also be comprised of rollers (not shown) or other substantially non-frictional sliding or rolling components.

As shown in FIG. 8, the bearings 810, 812, and 814 are preferably comprised of a first bushing member 810 having a first interior portion 816, a second bushing member 812 oriented perpendicularly to the first bushing member 810 and having a second interior portion 818, and a third bushing member 814 oriented 180 degrees to the first bushing member 810 and having a third interior portion 820.

Referring to both FIGS. 6 and 8, as lift frame 612 is displaced along its vertical displacement path VV, the first interior portion 816 of the first bushing member 810 is substantially nonfrictionally, slidingly engaged with the edge portion of vertical beam 608, the second interior portion 818 of the second bushing member 812 is substantially nonfrictionally, slidingly engaged with the edge portion of vertical beam 608, and the third interior portion 820 of the third bushing member 812 is substantially nonfrictionally, slidingly engaged with the edge portion of vertical beam 608. This sliding engagement and the relative orientation of the bushing members 810, 812, and 814 as shown in FIG. 8 and described above prevents transverse displacement (e.g. displacement along axis AA or BB, FIG. 6) of lift frame 612 and media handling system 200, and also prevents rotational displacement (e.g. displacement around axis VV, FIG. 6, or an axis parallel thereto) of the lift frame 612 and media handling system 200.

Since the stability of lift frame 612 is maintained by the elongate flexible members 616, 618, and 620 as described above, guide means 800 is not subject to any significant load during displacement of lift frame 612. Specifically, during intended operation, no large lateral or longitudinal load is applied to lift frame 612 that would be of sufficient magnitude to substantially strain the cable means. Thus, guide means 800 requires less precision and less rigidity than conventionally-used rails or guides such as those used with single-point-support components such as leadscrews. Therefore, the relative mass of the guide means 800 to lift frame 612 may be very low, and the guide means 800 may be constructed from lightweight materials. As previously noted, in the preferred embodiment, the vertical beams 608 and 610 may be constructed from a high-strength, yet lightweight, material such as thin steel, aluminum, or any other desirable material. The bushing members 810, 812, and 814 may be constructed from plastic or any other material.

Figure 9:
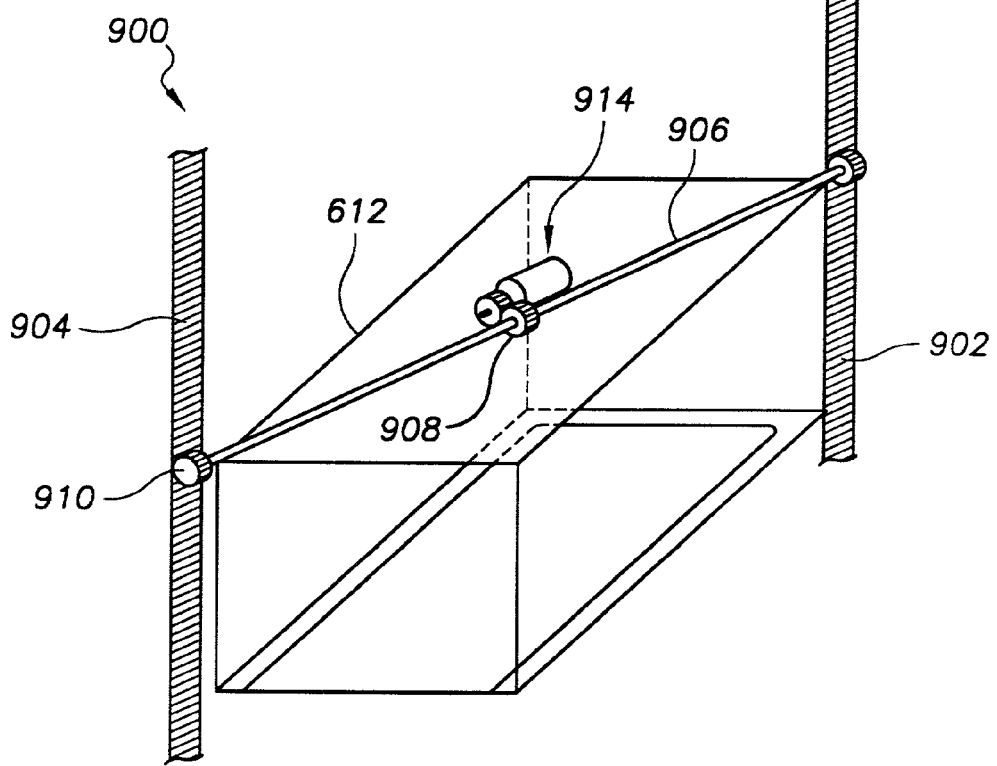
FIG. 9 is a perspective view of another embodiment of a lift assembly that may be used in the data storage system of FIG. 3.

FIG. 9 illustrates another possible embodiment of a lift assembly 900. Lift assembly 900 may comprise a rack and pinion drive system comprising a lift frame 612, a pair of fixed lift racks 902 and 904, lift bearing member 906 having a drive gear 908 and pinion gears 910 and 912, and a drive actuator 914.

Lift racks 902 and 904 may comprise vertical support members configured for engaging pinion gears 910 and 912. Lift racks 902 and 904 may be positioned vertically at any two points adjacent lift frame 612. Although lift racks 902 and 904 may be positioned in a number of ways, as illustrated in FIG. 9, it may be advantageous to position lift racks 902 and 904 vertically adjacent lift frame 612 at points such that the load associated with lift frame 612 and media handling system 200 is equally balanced between the two points. By way of example, as illustrated in FIG. 9, where lift frame 612 is substantially rectangular, lift racks 902 and 904 may be positioned at points along a diagonal defined by lift frame 612. This symmetrical configuration will minimize the forces exerted on lift assembly 900 during operation. For instance, if lift racks 902 and 904 are positioned along the same side of lift frame 612, the unbalanced load between the two points may exert too much force on lift assembly 900. As one of ordinary skill will appreciate, lift assembly 900 may further include additional vertical racks to ensure the stability of lift assembly 900. Furthermore, depending on the precise configuration of lift frame 612, lift racks 902 and 904 may be positioned adjacent lift frame 612 as desired.

Lift bearing member 906 may comprise a support member secured to lift frame 612. Drive gear 908 and pinion gears 910 and 912 maybe secured to lift bearing member 906 in such a way that the rotation of drive gear 908 causes pinion gears 910 and 912 to also rotate.

Lift frame 612 and media handling system 200 may be moved vertically along lift racks 908 and 910 by drive actuator 914 engaged with drive gear 908. For example, a desired data medium 102 may be stored in one of media storage devices 106 stacked vertically in data storage system 100. Upon receiving a request for the data medium 102 from the host computer system, the control system operates lift assembly 900 to move media handling system 200 vertically along lift racks 902 and 904 until it is positioned adjacent the selected data medium 102 in media storage device 106. Referring to FIG. 9, drive actuator 914 engages drive gear 908 such that it rotates in the desired direction for moving media handling system 200 either up or down. As drive gear 908 rotates, pinion gears 910 and 912 attached to lift bearing member 906 also rotate and engage lift racks 904 and 902, thereby moving lift frame 612 and media handling system 200 along lift racks 904 and 902. After media handling system 200 is in the proper vertical position adjacent the desired data medium 102, position system 400 controls the movement of data medium access device 216 as described above.

Figure 10:
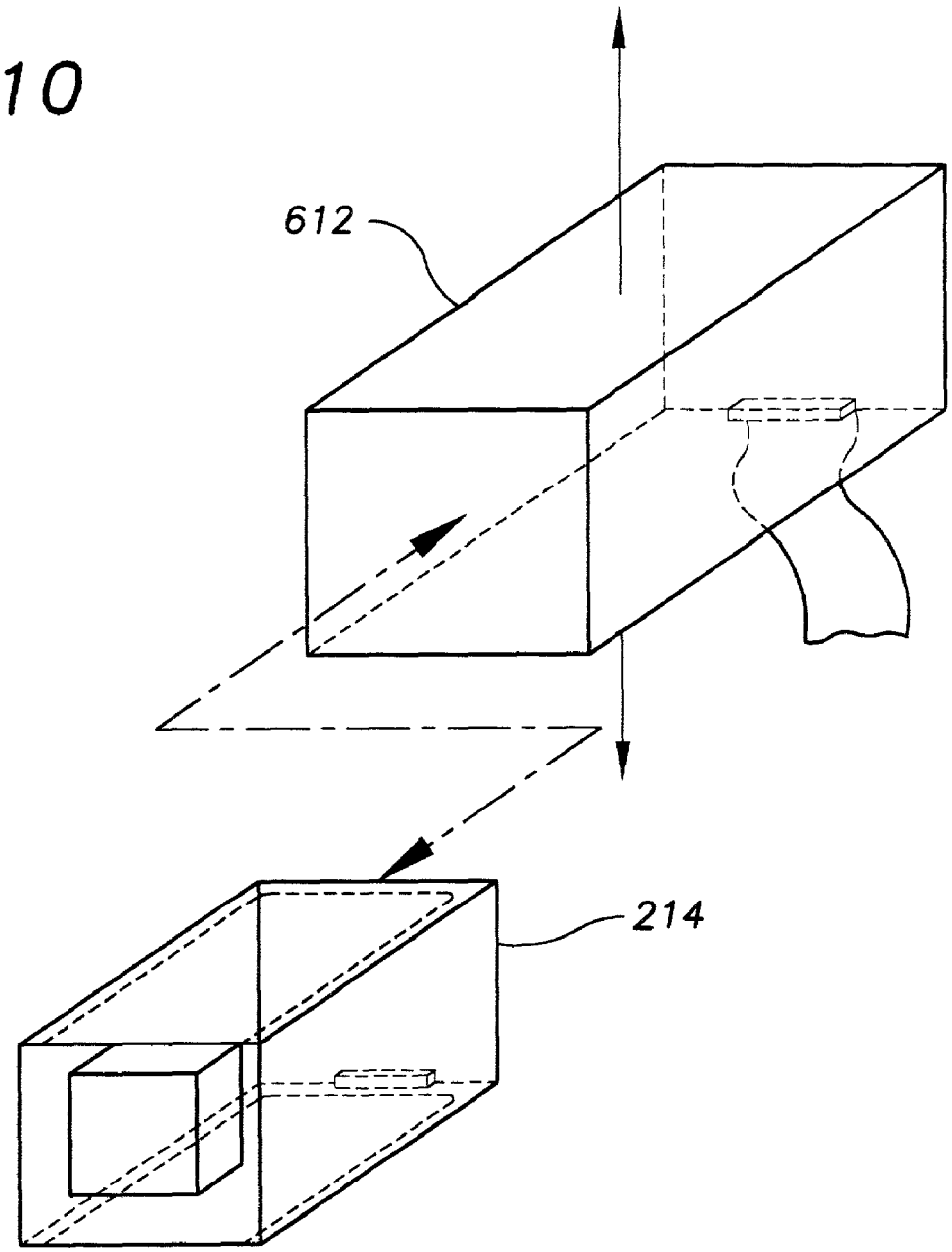
FIG. 10 is a perspective view illustrating one of many possible embodiments for removably securing the media handling system of FIG. 4 and the lift assembly of FIGS. 6-9 according to the present invention.

As stated above, regardless of the precise configuration of lift assembly 600 and 900, media handling system 200 is preferably removably secured to lift frame 612 so that media handling system 200 may be easily detached from lift frame 612 and removed from data storage system 100 via handling system access panel 112. As illustrated in FIG. 10, frame assembly 214 of media handling system 200 may be removably secured to lift frame 612 of lift assembly 600 and 900. Lift frame 612 and frame assembly 214 may be removably secured in numerous ways. For example, in one of a number of embodiments, lift frame 612 may be configured with similar dimensions except with lift frame 612 having a slightly larger cross-sectional area so that frame assembly 214 easily slides in and out of lift frame 612.

Figure 41:
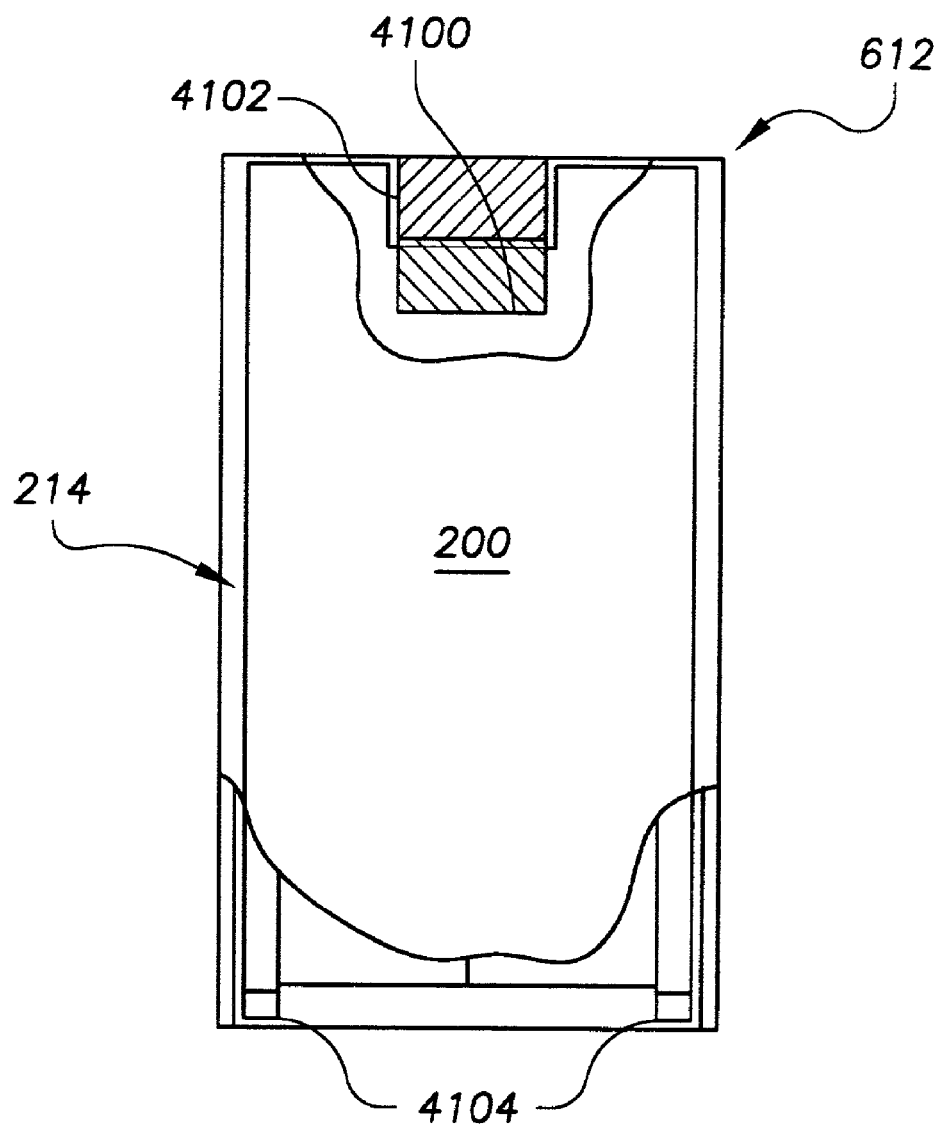
FIG. 41 is a top view illustrating the frame assembly of the media handling system of FIGS. 2 and 4 removably attached to a lift frame according to the present invention.
Figure 42:
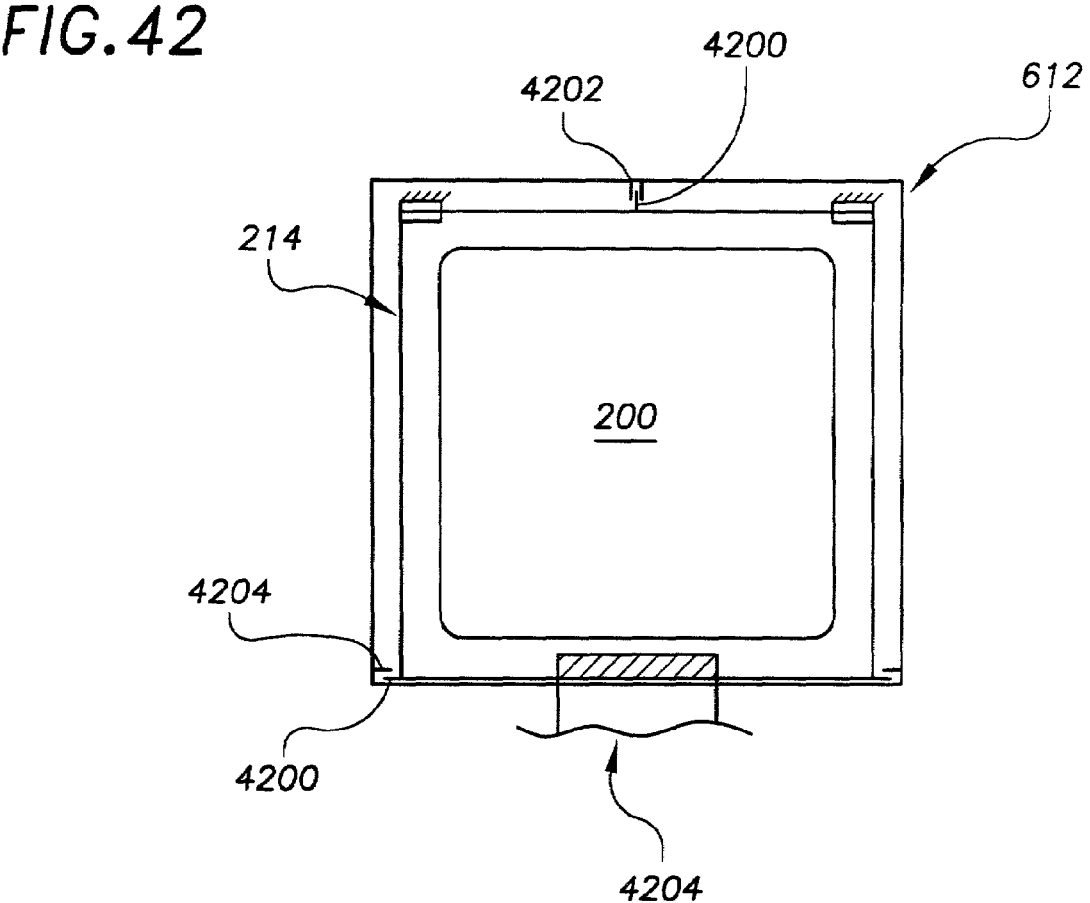
FIG. 42 is a front view of the frame assembly and lift frame of FIG. 41.
Figure 43:
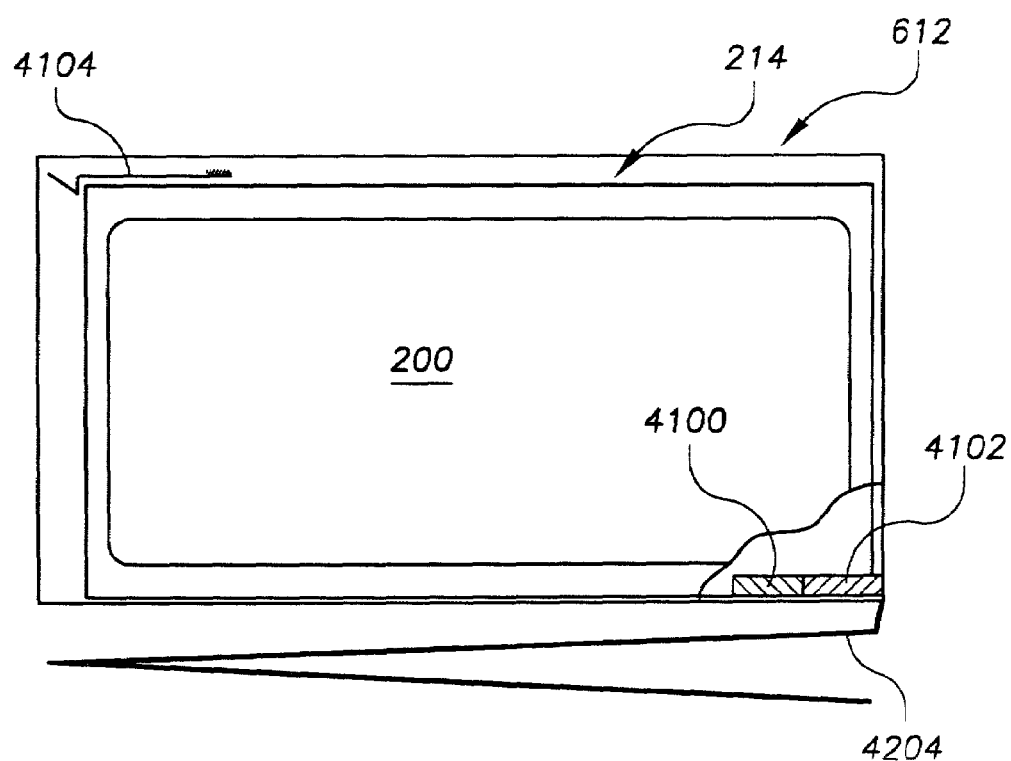
FIG. 43 is a side view of the frame assembly and lift frame of FIG. 41.

Referring to FIGS. 4 and 41-43, another embodiment for removably attaching lift frame 612 and frame assembly 214 will be described. FIGS. 41-43 are top, front, and side views, respectively, which illustrate frame assembly 214 removably attached to lift frame 612. As best illustrated in FIG. 42, frame assembly 214 may include one or more guide slots 4200 affixed to frame assembly 214.

In the embodiment illustrated in FIG. 42, frame assembly 214 comprises three guide members 4200. A first guide member 4200 may extend upward from top plate 404 (FIG. 4) of frame assembly 214. The first guide member 4200 may be positioned anywhere on top plate 404, but in FIG. 42 it is shown being located substantially in the middle of top plate 404. Furthermore, the first guide member 4200 located on top plate 404 may be elongate and extend substantially from front side portion 412 to back side portion 414. Second and third guide members 4200 may extend laterally away from the portion of lower plate 402 facing lateral side portions 408 and 410. The second and third guide members 4200 may also be elongate and extend from front side portion 412 to back side portion 414. One of ordinary skill in the art will appreciate that various other configurations and combinations of locations exist for guide members 4200. For example, any number of guide slots 4200 may be implemented. Furthermore, the first guide slot 4200 may be located on lower plate 402, while the second and third slots 4200 may be located on top plate 404.

As best illustrated in FIG. 42, lift frame 612 may include one or more lift frame guide members 4202 affixed to lift frame 612. In the embodiment illustrated in FIG. 42, lift frame 612 comprises three lift frame guide members 4202. First and second lift frame guide members 4202 may extend from opposing lateral side portions of lift frame 612. First and second lift frame guide members 4202 should be positioned on lift frame 612 and configured such that each engages with one of the guide members 4200 facing lateral side portions 408 and 410 when frame assembly 214 is installed in lift frame 612. In this manner, lift frame guide members 4202 and 4200 may be used to facilitate the insertion and removal of frame assembly 214 from lift frame 612, as well as provide support when frame assembly 214 is installed in lift frame 612.

A third lift frame guide member 4202 may extend downward from a top portion of lift frame 612. The third lift frame guide member 4202 should be positioned on lift frame 612 and configured such that it engages with the guide member 4200 positioned on top plate 404. As shown in FIG. 42, the third lift frame guide member 4202 may comprise two opposing lift frame guide members 4200 in spaced-apart relation such that the guide member 4200 extending from top plate 404 may be positioned between the opposing guide members 4200 when frame assembly 214 is installed in lift frame 612. Again, the guide members 4202 and 4200 may be used to facilitate the insertion and removal of frame assembly 214 from lift frame 612, as well as provide support when frame assembly 214 is installed in lift frame 612.

As best illustrated in FIG. 42, lift frame 612 may also include one or more frame assembly retention springs 4104 affixed to lift frame 612. Frame assembly retention springs 4104 may be configured to engage frame assembly 214 when frame assembly 214 is installed in lift frame 612. Furthermore, frame assembly retention springs 4104 provide a force against frame assembly 214 to prevent frame assembly 214 from losing engagement with lift frame 612 and thereby retaining frame assembly 214 within lift frame 612. The embodiment shown in FIG. 42 illustrates that frame assembly retention springs 4104 may be configured with an elongate portion and a triangle-shaped portion latch portion. Frame assembly retention spring 4104 may be affixed to lift frame 612 at one end of the elongate portion. The triangle-shaped portion may be attached to the elongate portion such that the angled portion faces a front portion of lift frame 612. As described below, when frame assembly 214 is inserted within lift frame 612, the back portion 414 of frame assembly 214 deflects frame assembly retention spring 4104. When frame assembly 214 is positioned properly within lift frame 612, frame assembly retention spring 4104 may return to an initial position in which the straight side of the triangle-shaped portion engages the front portion 412 of frame assembly 214, thereby securing frame assembly 214 within lift frame 612.

In order to provide power to media handling system 200 contained within frame assembly 214, lift frame 612 may include an electrical connector 4100 and frame assembly 214 may include a mating connector 4102. When frame assembly 214 is installed within lift frame 612, mating connector 4102 and electrical connector 4100 may be connected in order to provide power and various control signals to media handling system 200. Electrical connector 4100 may communicate with a power supply and/or control system associated with the data storage system 100 by any known means. Although communication may be via wireless means, the embodiment illustrated in FIGS. 41-43 illustrates that electrical connector 4100 may be connected to the power supply and/or control system via an umbilical cable 4204.

In operation, frame assembly 214 may be installed in the lift frame 612 through and opening in the front of the lift frame 614. Accordingly, the lift frame 614 may comprise a box frame configured with five-sides such that each side has an opening adapted to enable the data medium access device 216 (FIG. 5) contained within the frame assembly 214 to access, during operation of data storage system 100, the data media 102 positioned around frame assembly 214. The frame assembly 214 may be guided into the lift frame 612 by lift frame guide members 4202 and guide members 4200. Guide members 4200 on the frame assembly 214 engage lift frame guide members 4202 and align the frame assembly 214 to the lift frame 612. The frame assembly retention springs 4104 are configured to secure the frame assembly 214 in the lift frame 612. In order to remove the frame assembly 214 from the lift frame 612, the frame assembly retention springs may be deflected, thereby allowing the frame assembly 214 to be removed from the lift frame 612 in the manner described above.

As stated above, there are various other embodiments for aligning and retaining the frame assembly 214 within the lift frame 612. For example, other methods of aligning and retaining the frame assembly 214 within the lift frame 612 may include capture plates that may be installed after engaging the frame assembly in the lift frame 612. Such plates may be fastened to the lift frame 612 by any standard type of mechanical fastener or other means that permits easy removal of the capture plate and thus easy removal of the frame assembly 214 from the lift frame 612. Several other methods exist for guiding and aligning the frame assembly 214 within lift frame 612. For instance, such methods may include guide pins, plastic guide rails, machined ways and precision ground shafting.

Figure 11:
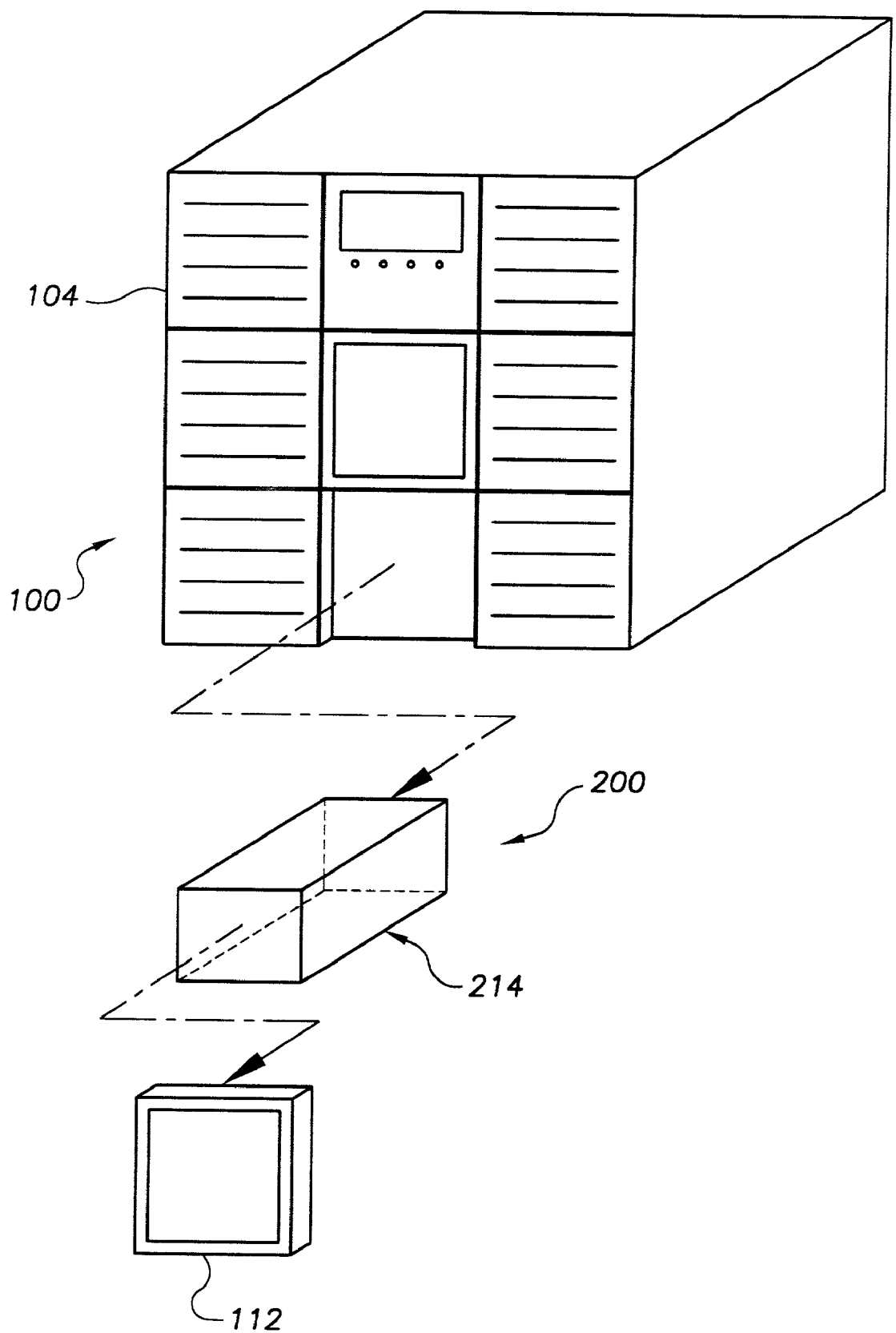
FIG. 11 is a perspective view illustrating the media handling system of FIG. 4 being removed from the data storage system of FIG. 3.

Again, the precise manner in which lift frame 612 and frame assembly 214 are removably attached is not critical. Rather, as illustrated in FIG. 11, because lift frame 612 and frame assembly 216 are removably attached, media handling system 200 may be easily detached from lift frame 612 and removed from data storage system 100 via handling system access panel 112. As stated above, in data storage systems that employ media handling system 200 and a lift assembly, such as lift assembly 600 or 900, it is desirable to have convenient access to media handling system 200 and data medium access device 216 for situations in which repair and/or replacement are needed. Because of its complex nature and precision requirements, media handling system 200 may have a much higher failure rate than other components of data storage system 100. Thus, it may be desirable to have easy access to media handling system 200 for service and/or maintenance. By removably securing lift frame 612 and frame assembly 214, an operator and/or service personnel may easily access and remove media handling system 200 from data storage system 100 without having to also remove the lift assembly.

For example, in situations where media handling system 200 is to be removed from data storage system 100, such as where media handling system 200 malfunctions and requires repair and/or replacement and where maintenance is required, an operator and/or service personnel may remove handling system access panel 112 from data storage system 100. In alternative embodiments, handling system access panel 112 may be configured as a panel door that hinges to provide access to media handling system 200.

After handling system access panel 112 is removed (or opened where configured as a door), the operator or service personnel may easily detach frame assembly 214 from lift frame 612, thereby removing media handling system 200 from data storage system 100. Once media handling system 200 is removed, the operator or service personnel may repair the device and/or perform required maintenance. Then, media handling system 200 (or a replacement) may be inserted back in data storage system 100 by removably attaching frame assembly 214 to lift frame 612.

III. Data Media Exchange Apparatus

As stated above, data media 102 may be stored within data storage system 100 in media storage devices 106. FIGS. 1 and 2 described above illustrate a data media exchange apparatus 120 in which media storage devices 106 may be implemented. Data media exchange apparatus 120 allows at least one data medium 102 to be accessed by an operator or service personnel. The operator or service personnel may use data media exchange apparatus 120 to access any of the data media 102 stored therein. For example, the operator or service personnel may use data media exchange apparatus 120 to withdraw a certain data medium 102 and replace it with a substitute data medium 102. In this manner, data media exchange apparatus 120 provides a convenient way to deposit and withdraw selected data media 102 to and from data storage system 100.

Obviously, data storage system 100 may be provided with any number of data media exchange apparatus 120. For instance, data storage system 100 illustrated in FIG. 1 includes two data media exchange apparatus 120, one which is closed and the other which is open. However, as stated above and illustrated in FIG. 3, data storage system 100 may be configured with multiple data exchange apparatus 120 that are arranged in a plurality of vertical stacks 300. With this in mind, and for the sake of simplicity, the remaining description will be directed at a single data exchange apparatus 120.

Figure 12:
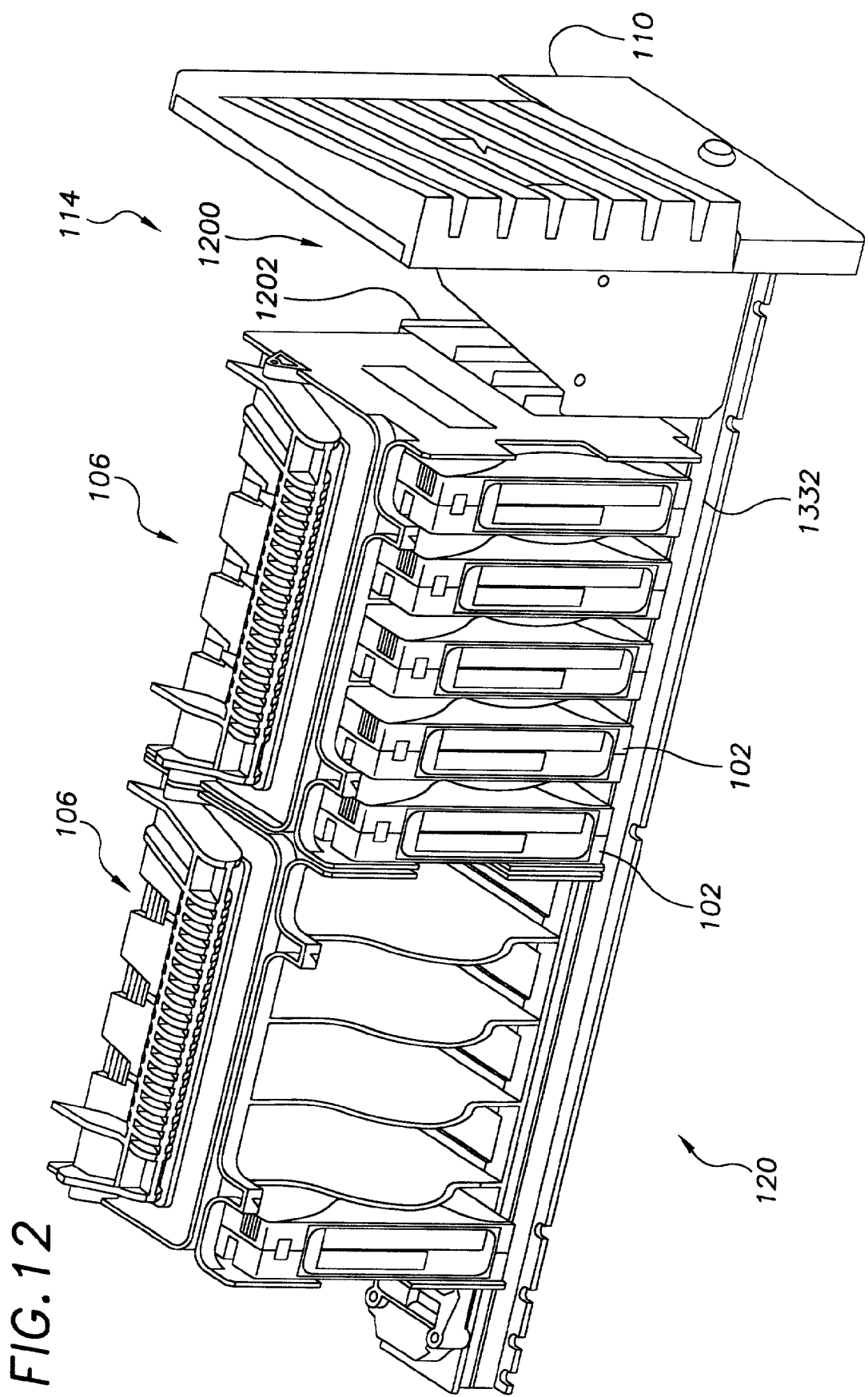
FIG. 12 is a perspective view of one of many possible embodiments of a data media exchange apparatus according to the present invention that may be used in the data storage system of FIGS. 1-3 for storing data media.

As illustrated in FIG. 12, in one of many possible embodiments, data media exchange apparatus 120 may comprise a drawer 114 mounted to data storage system 100 such that drawer 114 may be moved between a retracted or closed position and an extended or open position, one or more media storage devices 106 for receiving one or more data media 102, and front access panel 110. Drawer 114 may be configured to receive one or more data media 102, which may be contained within one or more media storage devices 106.

Figure 13:
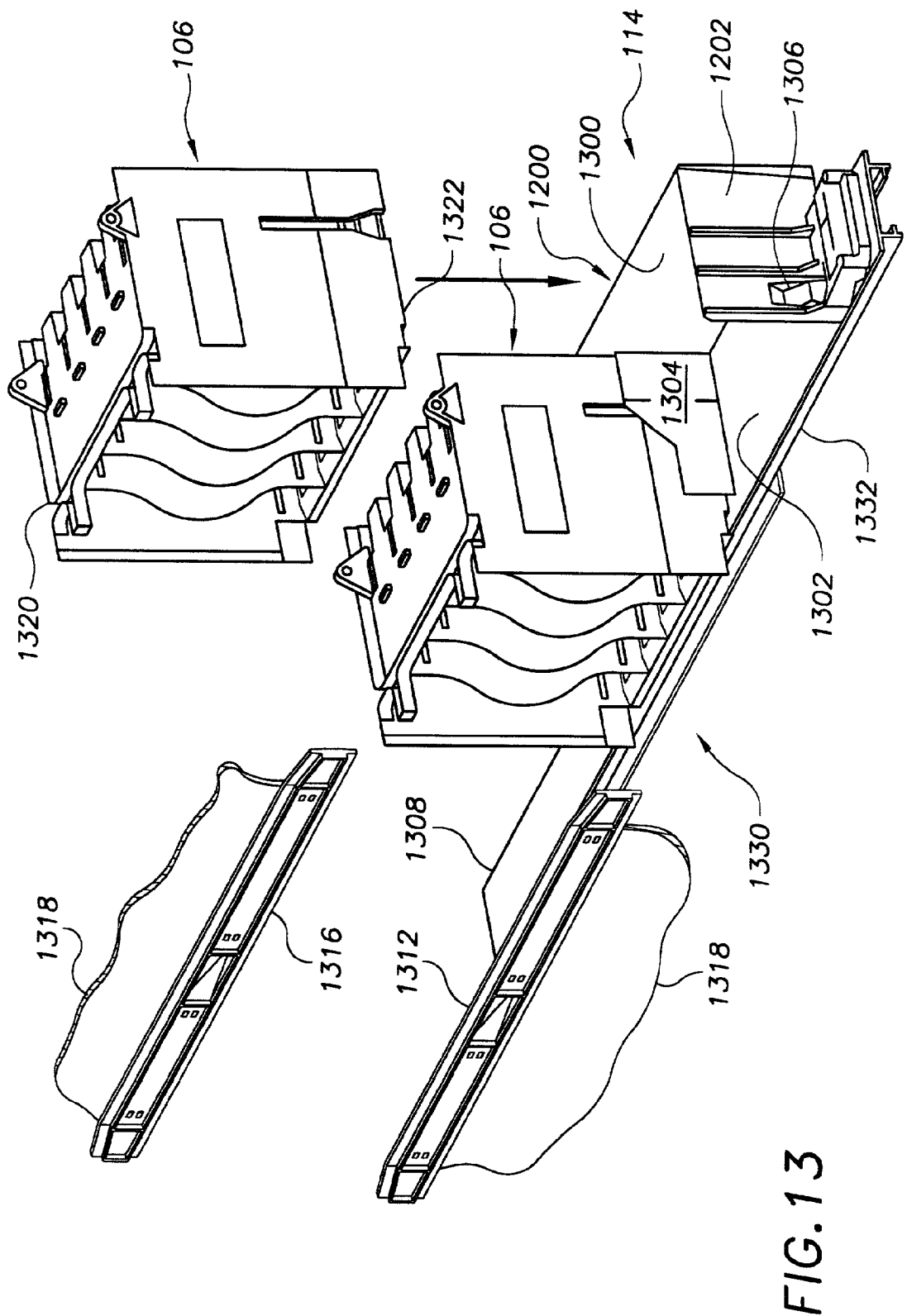
FIG. 13 is an exploded perspective view of the data media exchange apparatus of FIG. 12 and one of many possible embodiments of a mounting system according to the present invention that may be used to mount the data media exchange apparatus to the data storage system of FIGS. 1-3.
Figure 14:
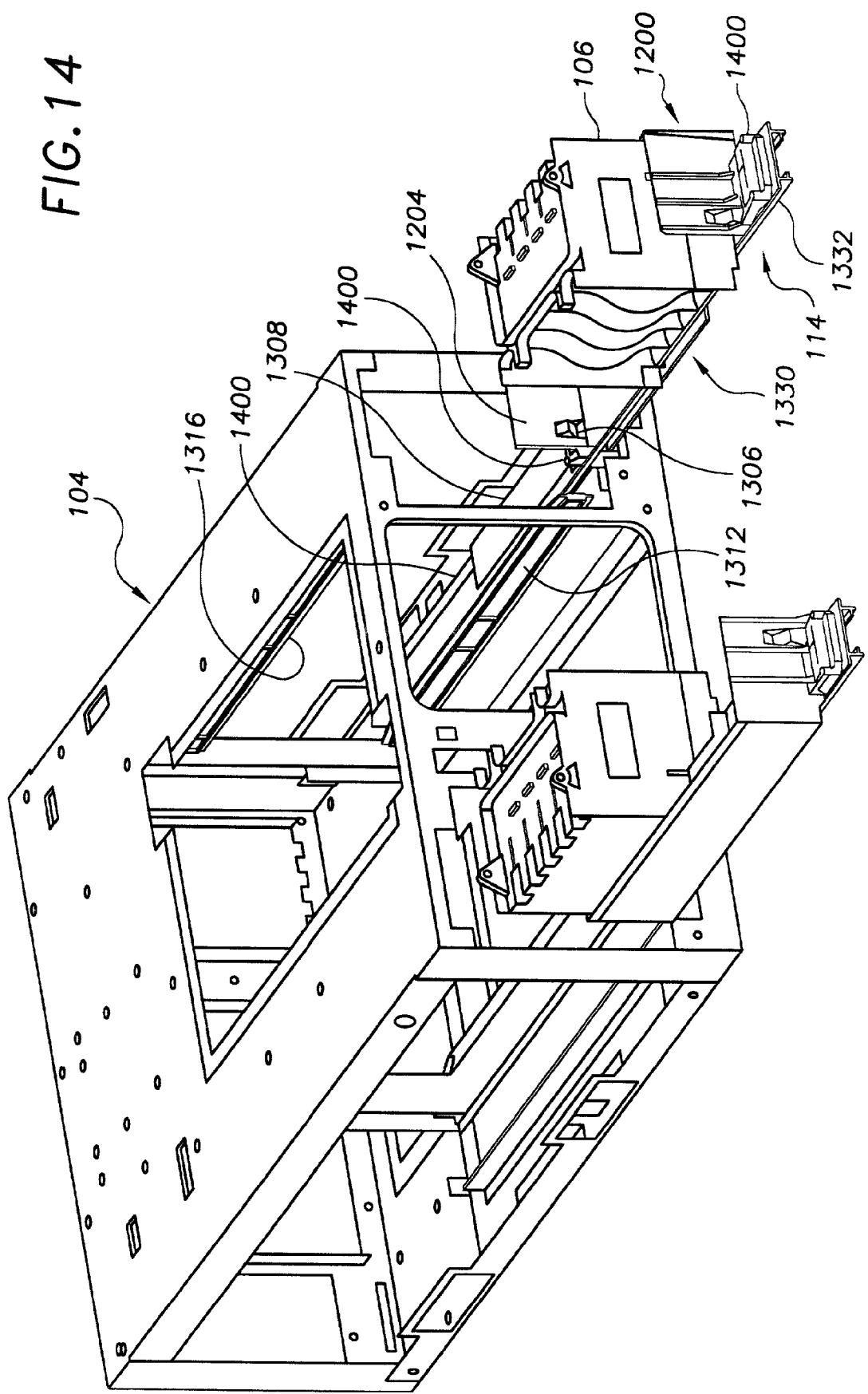
FIG. 14 is a perspective view of a portion of the data media exchange apparatus of FIG. 12 mounted in the data storage system of FIGS. 1-3.

Referring to FIGS. 12-14, one embodiment of drawer 114 may comprise a storage tray 1200 that may be mounted directly to a mounting system 1330 in the manner that will be described in greater detail below. Storage tray 1200 may be configured to removably receive one or more media storage devices 106. Storage tray 1200 is illustrated in FIGS. 12-14 as receiving two media storage devices 106. Media storage devices 106 may be configured to receive one or more data medium 102. Media storage devices 106 are illustrated in FIGS. 12-14 as configured to removably receive five data media 102. Storage tray 1200 may comprise a generally rectangular member having a floor section 1302, a back section 1300, and opposed end walls 1202 and 1204. Storage tray 1200 may also be provided with a center divider section 1304 located substantially between end walls 1202 and 1204. Each end wall 1202 and 1204 may be provided with a spring member 1306 to urge media storage device 106 against center divider section 1304, although spring member 1306, or urging media storage device 106 against center divider section 1304, is not required.

Storage tray 1200 may be made from any of a wide range of desirable materials, such as metals or plastics, suitable for the intended application. By way of example, in one of many possible embodiments, storage tray 1200 is molded as a single piece from a fiber reinforced polycarbonate plastic material. Media storage device 106 may also be made from any of a wide range of desirable materials, depending on the requirements of the particular application. For instance, media storage devices 106 maybe molded from a fiber reinforced polycarbonate plastic material.

Drawer 114 may also be provided with a front access panel 110, or bezel (FIGS. 1 & 2) that may be attached directly to a guide rail 1332 as described in detail below. In alternative configurations, front access panel 110 may be attached to storage tray 1200 or may even comprise an integral portion of storage tray 1200. Front access panel 110 forms a part of front access panel 110 of the data storage system 100 when drawer 114 is in the retracted position. Front access panel 110 also provides a convenient means to allow the system operator or service personnel to pull drawer 114 open.

Drawer 114 may be mounted to data storage system 100 by a mounting system 1330. Referring now to FIGS. 15-20, mounting system 1330 may comprise three guide rails 1400, 1308, and 1332, which are configured to be mounted in sliding engagement with one another so as to allow drawer 114 to be moved between the extended and retracted positions as described above. Guide rails 1400, 1308, and 1332 each may comprise one of two configurations: a first configuration (illustrated in FIGS. 16 and 18) and a second configuration (illustrated in FIGS. 17 and 19). More specifically, guide rails 1400 and 1332 may comprise the first configuration, whereas guide rail 1308 may comprise the second configuration. Accordingly, only two guide rail configurations are preferably employed, even though mounting system 1330 implements three separate guide rails 1400, 1308, and 1332.

Figure 18:
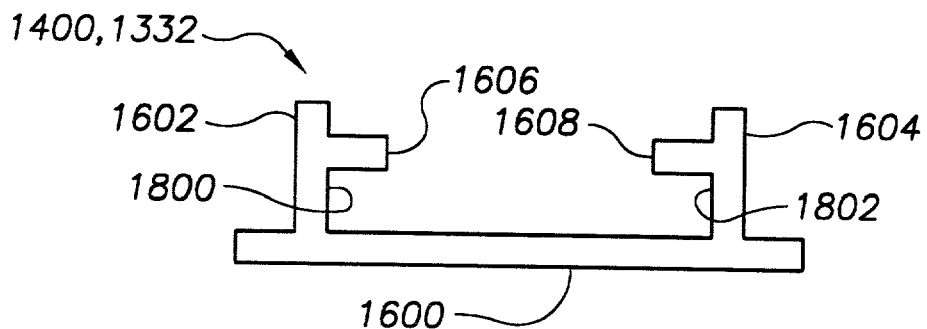
FIG. 18 is side view of the guide rail of FIG. 16.

Guide rails 1400 and 1332 having the first configuration are best illustrated in FIGS. 16 and 18. Guide rails 1400 and 1332 may be identical to one another in all respects. Each guide rail 1400 and 1332 may comprise an elongate member having a back portion 1600 from which extend a pair of flanges 1602 and 1604. A first bearing track 1606 extends generally outwardly from flange 1602 and, together with flange 1602 and elongate member 1600, defines a first channel 1800. Similarly, a second bearing track 1608 extends generally outwardly from the flange 1604 and, together with flange 1604 and elongate member 1600, defines a second channel 1802. Bearing tracks 1606 and 1608 are substantially parallel to elongate member 1600 as illustrated in FIG. 18. A pair of U-shaped bearing members 1610 may be provided within channels 1800 and 1802 at substantially a proximal end 1612 of each guide rail 1400 and 1332 (FIG. 16).

Figure 19:
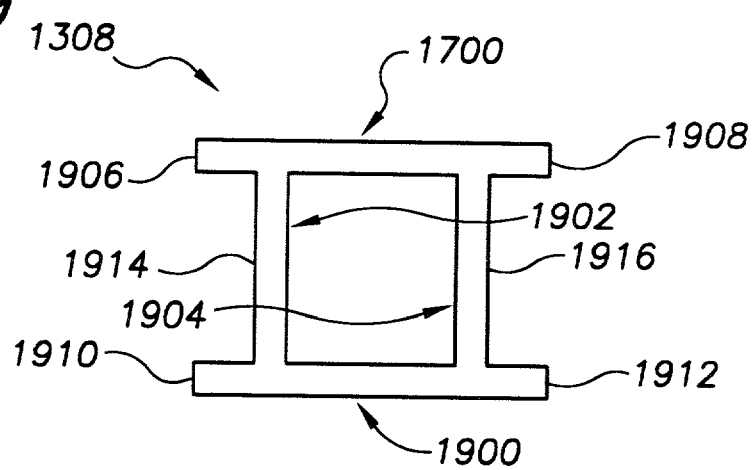
FIG. 19 is a side view of the guide rail of FIG. 17.

The guide rail having the second configuration, for example guide rail 1308, is best illustrated in FIGS. 17 and 19. Guide rail 1308 may comprise a cross-section generally in the form of a Roman numeral II. Guide rail 1308 having the second configuration may comprise a pair of elongate bearing guide members 1700 and 1900, which are held in substantially parallel, spaced-apart relation by a pair of flange members 1902 and 1904. The portions of first bearing guide member 1700 that are outboard of the flanges 1902 and 1904 form bearing tracks 1906 and 1908. Similarly, the portions of second bearing guide member 1900 that are outboard of the flanges 1902 and 1904 form bearing tracks 1910 and 1912. Guide members 1700 and 1900, together with first and second flanges 1902 and 1904, define respective first and second channels 1914 and 1916.

Bearing guide members 1700 and 1900 of guide rail 1308 having the second configuration also may be provided with a plurality of U-shaped bearing members 1610 located substantially in the positions shown in FIG. 17. More specifically, four bearings 1610 may be affixed to lower bearing tracks 1910 and 1912, two bearings 1610 at about the proximal end 1710 of guide rail 1308 and two bearings 1610 at about the center region 1712 of guide rail 1308. Similarly, four bearings 1610 may be affixed to upper bearing tracks 1906 and 1908: two bearings 1610 at about the center region 1712 and two bearings 1610 at about the distal end 1714 of guide rail 1308.

Guide rails 1400, 1308, and 1332 may be made from any of a wide range of materials (such as metals or plastics) suitable for the intended application. Thus, the present invention should not be regarded as limited to guide rails being fabricated from any particular material. Nonetheless, in one of many possible embodiments, guide rails 1400, 1308, and 1332 are formed from extruded aluminum. Bearing members 1610 may also be made from a wide range of materials suitable for providing a low friction sliding engagement with guide rails 1400, 1308, and 1332. For example, in one possible embodiment each bearing member 1610 is molded as a single piece from polythalamide plastic. In other embodiments, other types of bearings, such as wheels or rollers, could be substituted for sliding bearings 1610.

Figure 20:
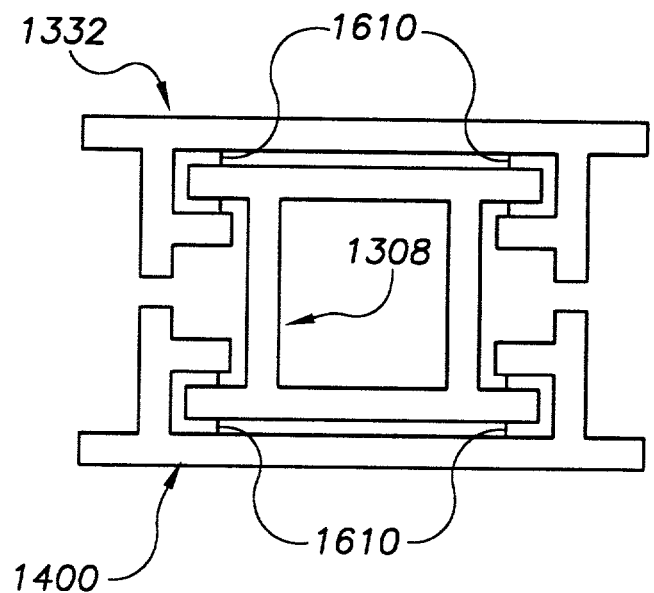
FIG. 20 is a side view illustrating the engagement of the guide rails of FIGS. 16 19.

Guide rails 1400, 1308, and 1332 may be slidably engaged with one another as illustrated in FIGS. 15 and 20. Channels 1800 and 1802 of the guide rails, for example guide rails 1400 and 1332, having the first configuration receive U-shaped bearing members 1610 mounted to bearing guide members 1700 and 1900 of the guide rail, for example guide rail 1308, having the second configuration. (Similarly, U-shaped bearings 1610 located in channels 1800 and 1802 of guide rails 1400 and 1332 having the first configuration engage the bearing guide members 1700 and 1900 of guide rail 1308 having the second configuration.)

The locations of U-shaped bearings 1610 on the various guide rails are such that U-shaped bearings 1610 located in channels 1800 and 1802 of guide rails 1400 and 1332 will come into abutting contact with U-shaped bearings 1610 affixed to the bearing guide members 1700 and 1900 of guide rail 1308 when the guide rails 1400, 1308, and 1332 are in the fully extended position illustrated in FIG. 15. More specifically, bearings 1610 located on lower guide rail 1400 will come into abutting contact with bearings 1610 on lower bearing tracks 1910 and 1912 that are located in center region 1712 of guide rail 1308. Similarly, bearings 1610 located on upper guide rail 1332 will come into abutting contact with bearings 1610 on upper bearing tracks 1906 and 1908 that are located in center region 1712 of guide rail 1308. This configuration may prevent the operator or service personnel from inadvertently pulling drawer 114 beyond the extended position and thereafter possibly pulling apart or separating guide rails 1400, 1308, and 1332.

Referring again to FIG. 15, guide rails 1400 and 1332 having the first configuration may be provided with one or more mounting holes or slots 1500 to allow the guide rails to be mounted to housing 104 of data storage system 100 and to allow storage tray 1200 to be mounted to the guide rail. For example, in one of many possible embodiments, guide rail 1400 is mounted directly to housing 104 (FIG. 14) of data storage system 100 by a plurality of screws (not shown). Similarly, storage tray 1200 may also be mounted directly to guide rail 1332 by a plurality of screws (not shown). In alternative embodiments, other types of fasteners now known in the art or that may be developed in the future may be used to mount guide rail 1400 to housing 104 and to mount storage tray 1200 to guide rail 1332.

IV. Automated Media Exchange System

As understood by one of ordinary skill in the art, the various embodiments of data media exchange apparatus 120 may be mounted directly to data storage system 100 in a variety of ways. For example, as described above in detail with respect to FIGS. 15-20, data media exchange apparatus 120 may be mounted directly to mounting system 1330. In this embodiment, mounting system 1330 enables an operator or service personnel to manually extend and/or retract data media exchange apparatus 120. Various other systems and methods exist for enabling the data media exchange apparatus 120 to extend and/or retract as described above. In one of many possible embodiments, an automated media exchange system 3100 (FIGS. 31-32) may be provided in conjunction with mounting system 1300 and data media exchange apparatus 120. Automated media exchange system 3100 enables an operator to automatically control the operation of data media exchange apparatus 120. In other words, automated media exchange system 3100 enables an operator to automatically control how far media exchange apparatus 120 is retracted and/or extended from data storage system 100. In this manner, an operator may designate a particular data medium 102 located in a particular data media exchange apparatus 120. Based on the particular data medium 102 designated, automated media exchange system 3100 may automatically extend the particular data media exchange apparatus 120 an appropriate distance so that the operator may access the particular data medium 102. Automated media exchange system 3100 may also enable the operator to control, for example, via a control panel, how far to extend and/or retract data media exchange apparatus 3100.

Automated media exchange system 3100 may include a drive system 3102, an elongate drive member 3112 engaged by drive system 3102, and a mounting system, such as mounting system 1330. One of ordinary skill in the art will appreciate that various mounting systems may be employed by automated media exchange system 3100. As described above in detail, mounting system 1300 may comprise three guide rails 1400, 1308, and 1332, which are configured to be mounted in sliding engagement with one another so as to allow drawer 114 to be moved between the extended and retracted positions as described above. Referring to FIG. 31, in one of many possible embodiments, guide rail 1400 may be mounted directly to housing 104 (FIG. 14) of data storage system 100 by a plurality of screws (not shown).

Drive system 3102 may comprise a motor (not shown), a drive gear 3106 engaged by the motor, the elongate drive member 3112, and a housing 3104 for containing the motor, the drive gear 3106, and a portion of the elongate drive member 3112. Elongate drive member 3112 may comprise a first end 3120, a second end 3122, a top portion 3124, and a bottom portion 3126. First end 3120 may be fixedly attached to guide rail 1308 at point 3110. Second end 3122 maybe contained within housing 3104. The top portion 3124 of elongate drive member 3112 may be a gear rack 3108 that may be engaged by drive gear 3106. One of ordinary skill in the art will appreciate that there are various configurations for drive gear 3106 and gear rack 3108. For example, drive gear 3106 and gear rack 3108 each may be configured with teeth, such that the teeth of drive gear 3106 and the teeth of gear rack 3108 mesh together so that as drive gear 3106 rotates in one direction, elongate drive member 3112 is coiled within housing 3104, and as drive gear 3106 rotates in another direction, elongate member 3112 is uncoiled within housing 3104. Because elongate drive member 3112 is fixedly attached to guide rail 1308, when the drive gear 3106 uncoils the elongate drive member 3112, guide rail 1308 is extended from data storage system 100. Depending on how much drive gear 3106 uncoils the elongate member 3112, guide rail 1332 may also become extended because of the interaction of guide rails 1308, 1332, and 1400 as described above. When the drive gear 3106 coils the elongate drive member 3112, guide rail 1308 (and when necessary guide rail 1332) is retracted into data storage system 100. Obviously, drive gear 3106 and elongate drive member 3112 may be configured in such a way that the bottom portion 3124 includes the gear rack 3108. Furthermore, drive gear 3106 and gear rack 3108 need not be configured with teeth. Drive gear 3106 engages elongate drive member 3112 and coils or uncoils (depending on the rotation of drive gear 3106), thereby retracting or extending data media exchange apparatus 120 mounted to guide rail 1308.

Figure 21:
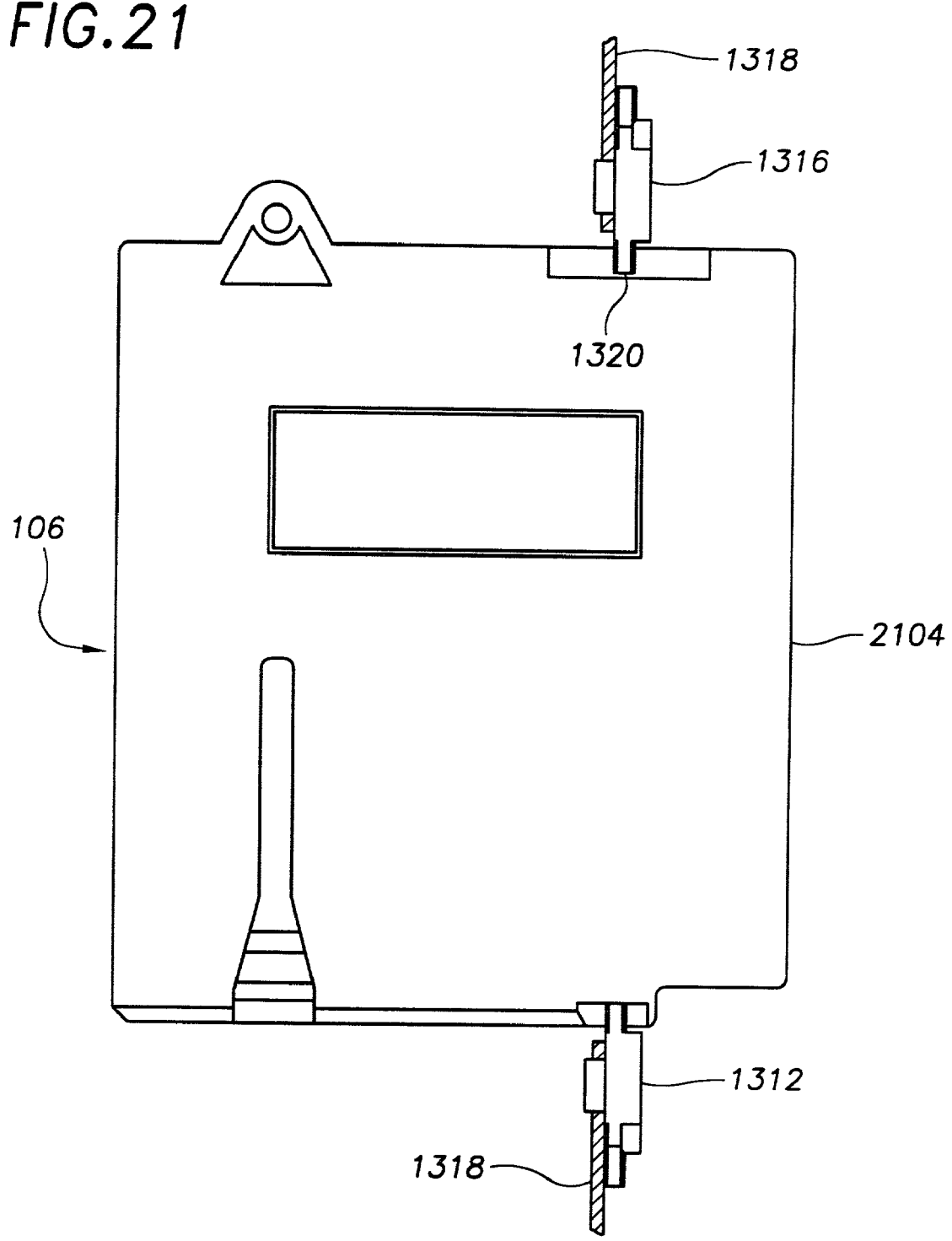
FIG. 21 is a side view illustrating the engagement of the data media exchange apparatus of FIG. 12 and the mounting system of FIG. 15.

Referring to FIGS. 13, 14, and 21, data cartridge exchange apparatus 120 may further comprise a media storage device alignment apparatus 1314 to provide more precise positioning of media storage devices 106 when drawer 114 is in the fully retracted position. Media storage device alignment apparatus 1314 may comprise a pair of elongate reference rails 1316 and 1312, which are mounted in spaced-apart relation to housing 104 of data storage system 100 as best illustrated in FIG. 14. Each media storage device 106 may be provided with first and second elongate slots 1320 and 1322, which are sized to slidably engage respective elongate reference rails 1316 and 1312 when drawer 114 is moved to the retracted position. The engagement of elongate reference rails 1316 and 1312 with respective slots 1320 and 1322 in media storage devices 106 slightly lifts media storage devices 106 from drawer 114 and holds each media storage device 106 in a registration position 2104, as best illustrated in FIG. 21. Consequently, when drawer 114 is fully retracted, the positions of media storage devices 106 may be determined by media storage device alignment apparatus 1314 and not by drawer 114.

Media storage device alignment apparatus 1314 more accurately positions media cartridge devices 106 than would be possible if media storage devices 106 were to remain seated in storage tray 1200 of drawer 114. The more accurate positioning provided by media storage device alignment apparatus 1314 substantially improves the likelihood that media handling system 200 will be capable of properly engaging the selected data medium 102. This configuration also dispenses with the need to provide a high precision drawer mounting system. In other words, since media storage devices 106 are not held in position by drawer 114, drawer 114 need not be designed to return media storage devices 106 to their exact locations each time drawer 114 is closed.

Figure 22:
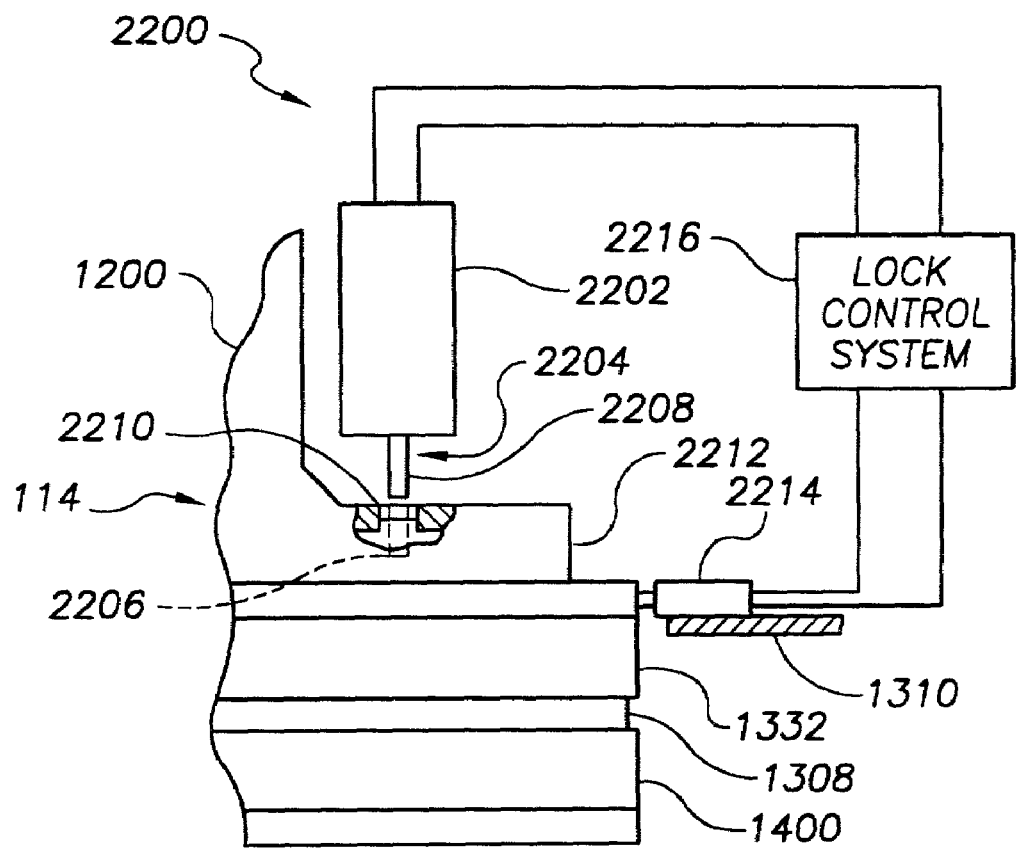
FIG. 22 is a side view of one of many possible embodiments of a locking system for locking the data media exchange apparatus of FIG. 12 in the retracted position according to the present invention.
Figure 23:
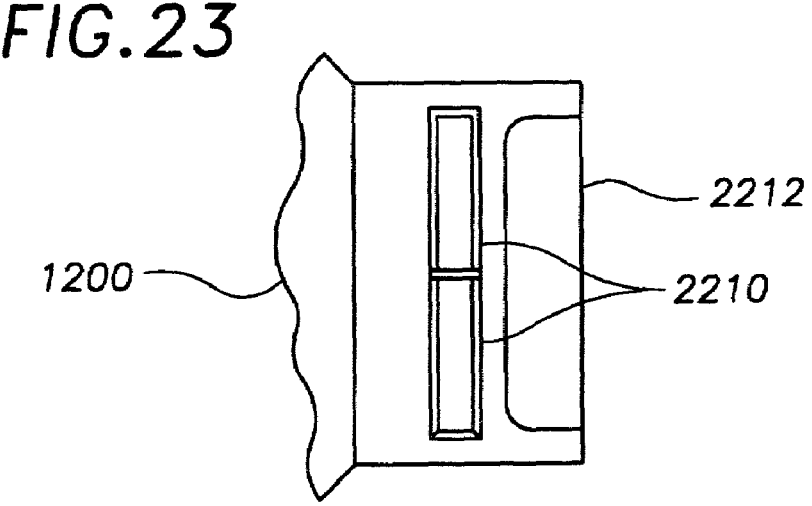
FIG. 23 is a top view of the lock plate in the locking system of FIG. 22.

Referring to FIGS. 22 and 23, in additional embodiments, data cartridge exchange apparatus 120 may comprise a drawer lock apparatus 2200 to hold drawer 114 in the fully retracted position. Drawer lock apparatus 2200 may comprise a lock actuator 2202 for moving a lock bolt or plunger 2204 between a locked position 2206 and an unlocked position 2208. A spring (not shown) may be used to bias lock bolt 2204 in a unlocked position 2208. Lock bolt 2204 may be sized to engage at least one of a plurality of apertures 2210 provided in a lock plate 2212 affixed to drawer 114. A limit switch 2214 may be mounted to housing 104 of data storage system 100 and may provide a signal to a lock control system 2216 when drawer 114 is in the fully closed or retracted position.

Lock plate 2212 may comprise an integral portion of storage tray 1200. However, since storage tray 1200 is designed to be utilized in either a right-hand drawer 114 (FIG. 14) or a left-hand drawer 114' (FIG. 14), storage tray 1200 is provided with two lock plates 2212 and 2212', one located at either end of storage tray 1200 (FIG. 14). This configuration allows a single storage tray 1200 to be used in either a right-hand or a left-hand drawer 114 by simply turning storage tray 1200 180°. Furthermore, lock actuator 2202 may not be located along the centerline of the guide rail 1332, but instead displaced slightly to one side. Accordingly, lock plate 2212 may be provided with two apertures 2210, which again allows the same storage tray 1200 and lock plate 2212 to be used in either a right-hand or left-hand configuration.

The various components of drawer lock apparatus 2200 may comprise any of a wide range of devices and systems well-known in the art and that are commercially available. For example, lock actuator 2202 may comprise an electrically operated solenoid having a plunger 2204 sized to engage at least one of the holes 2210 provided in lock plate 2212. Lock actuator 2202 may be biased in unlocked position 2208 by a suitable spring (not shown). Thus, when the solenoid is energized, it will move lock bolt 2204 to locked position 2206. Obviously, one of ordinary skill in the art will appreciate that various other types of components and operating arrangements could also be used.

Data cartridge exchange apparatus 120 may be operated as follows to allow an operator or service personnel to access the various media 102 contained within data storage system 100. Consider, for example, a situation in which data storage system 100 has been provided with a plurality of data media 102. During normal operation, drawer 114 may remain in the closed or retracted position shown, thereby allowing media handling system 200 (FIGS. 2 and 4) to access all of data media 102 contained in data storage system 100. If the need arises for the operator or service personnel to access one or more of data media 102, to remove, for example, one or more of data media 102 and replace it, or them, with a substitute data media 102, the operator or service personnel may pull on the front access panel 110 of drawer 114, thereby moving drawer 114 to the extended position. Where data storage system 100 includes automated media exchange system 3100, the operator or service personnel may automatically control the extension and/or retraction of drawer 114 via a control panel and/or a host computer. The operator or service personnel may input a particular data medium 102 in a particular data media exchange apparatus 120 that needs to be accessed. Data storage system 100 may include logic which contains the precise location of each data medium 102 within the drawer 114 and a predefined distance in which the drawer 114 is to be extended in order to enable the operator or service personnel to access the data medium 102. Thus, based on the particular data medium 102 selected by the operator or service personnel and the predefined logic, a control system (not shown) may control the motor to engage the drive gear 3106 until elongate drive member 3112 is uncoiled such that guide rail 1308 (and, as necessary, guide rails 1332 and 1400) extends drawer 114 to the predefined distance. The operator or service personnel may also automatically control the extension and/retraction of the drawer 114 by controlling the motor and drive gear 3106.

If data media exchange apparatus 120 is provided with a drawer lock apparatus 2200, the lock control system 2216 first would actuate the lock actuator 2202 to move the lock bolt or plunger 2204 to the unlocked position 2208, thereby allowing media handling system 200 (FIGS. 2 and 4) to access all of data media 102 in drawer 114. The lock control system 2216 could be engaged by a signal from a control system (not shown), or by the operator or service personnel via a control panel (not shown). Once drawer 114 has been opened or extended, the operator or service personnel may thereafter access the exposed data media 102 for the exchange, removal, or replacement of data media 102. While drawer 114 is in the extended position, data storage system 100 may remain operable and media handling system 200 may continue to access data media 102 stored in other media storage devices 106. When the operator or service personnel no longer needs access to the exposed data media 102, the front access panel 110 of drawer 114 may be pushed, thereby returning drawer 114 to the retracted position. As drawer 114 is moved to the retracted position, elongate reference rails 1316 and 1312 may engage respective slots 1320 and 1322 on media storage devices 106. When fully engaged with slots 1320 and 1322, reference rails 1316 and 1312 slightly lift media storage devices 106 from drawer 114 and hold each media storage device 106 in registration position 2104 shown in FIG. 21.

After drawer 114 has been returned to the retracted position, the magazine sensor switch is tripped triggering the data storage system 100 to command the lock control system 2216 to operate drawer lock apparatus 2200 to lock drawer 114 in the closed or retracted position. Thereafter, data storage system 100 may "re-inventory" data media 102 contained within data storage system 100. In this example, data storage system 100 need only re-inventory data media 102 contained in drawer 114 since those were the only data media 102 that could have been exchanged, removed, or replaced by the operator or service personnel.

If data media exchange apparatus 120 is configured so that the various data media 102 carried by drawer 114 are contained within one or more media storage devices 106, then data media exchange apparatus 120 will allow an entire media storage device to be removed and replaced. For example, where drawer 114 is configured to receive two media storage devices 106, each of which is configured to receive five data media 102, then an entire media storage device 106 may be removed by the operator or service personnel, thereby allowing for the convenient exchange, removal, or replacement of the plurality of data media 102 contained within media storage device 106. Media storage device 106 may be provided with a handle 30 to allow media storage device 106 to be conveniently carried by the operator or service personnel.

Figure 24:
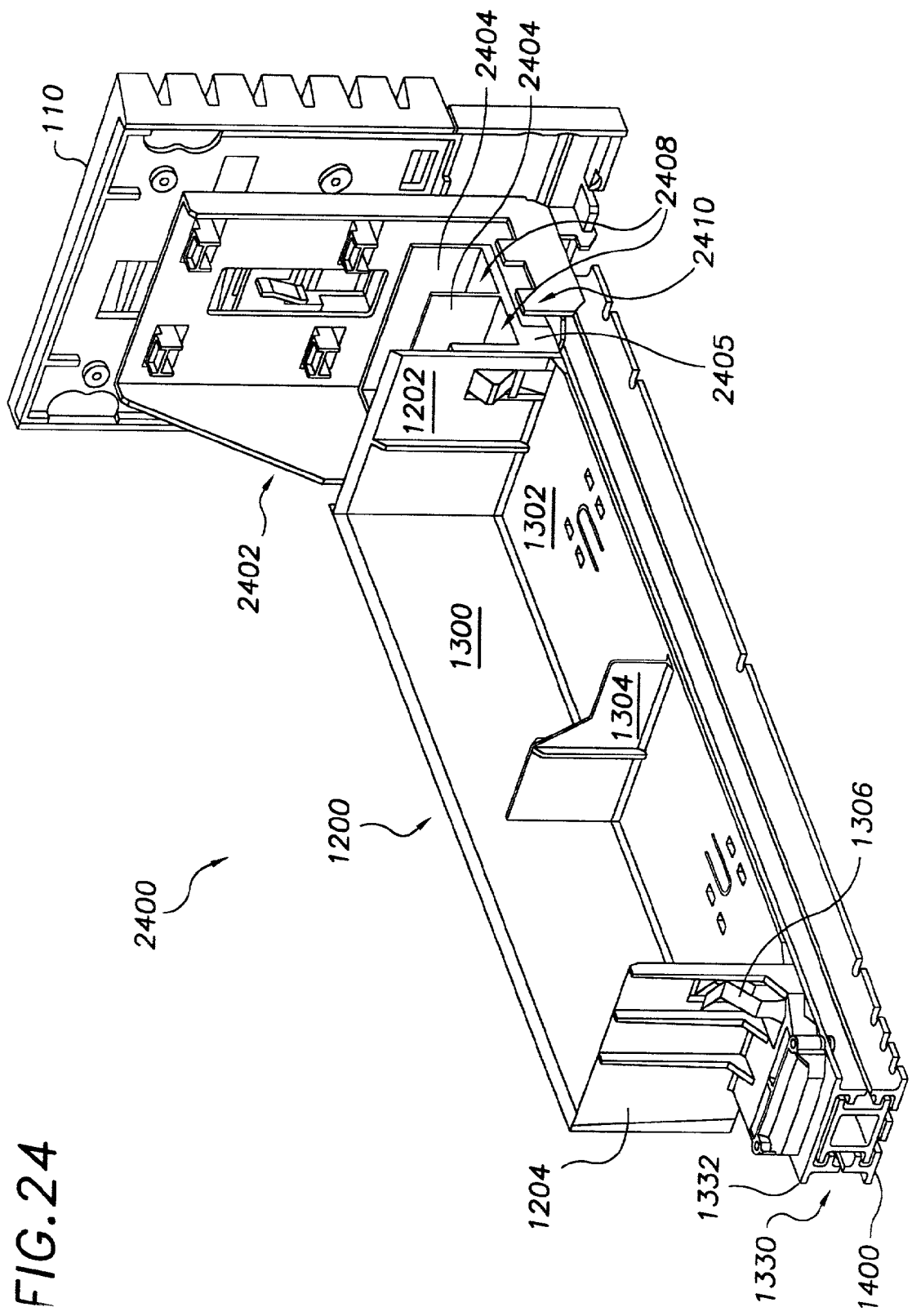
FIG. 24 is a perspective view of another embodiment of a data media exchange apparatus that contains a supplemental storage apparatus according to the present invention.
Figure 25:
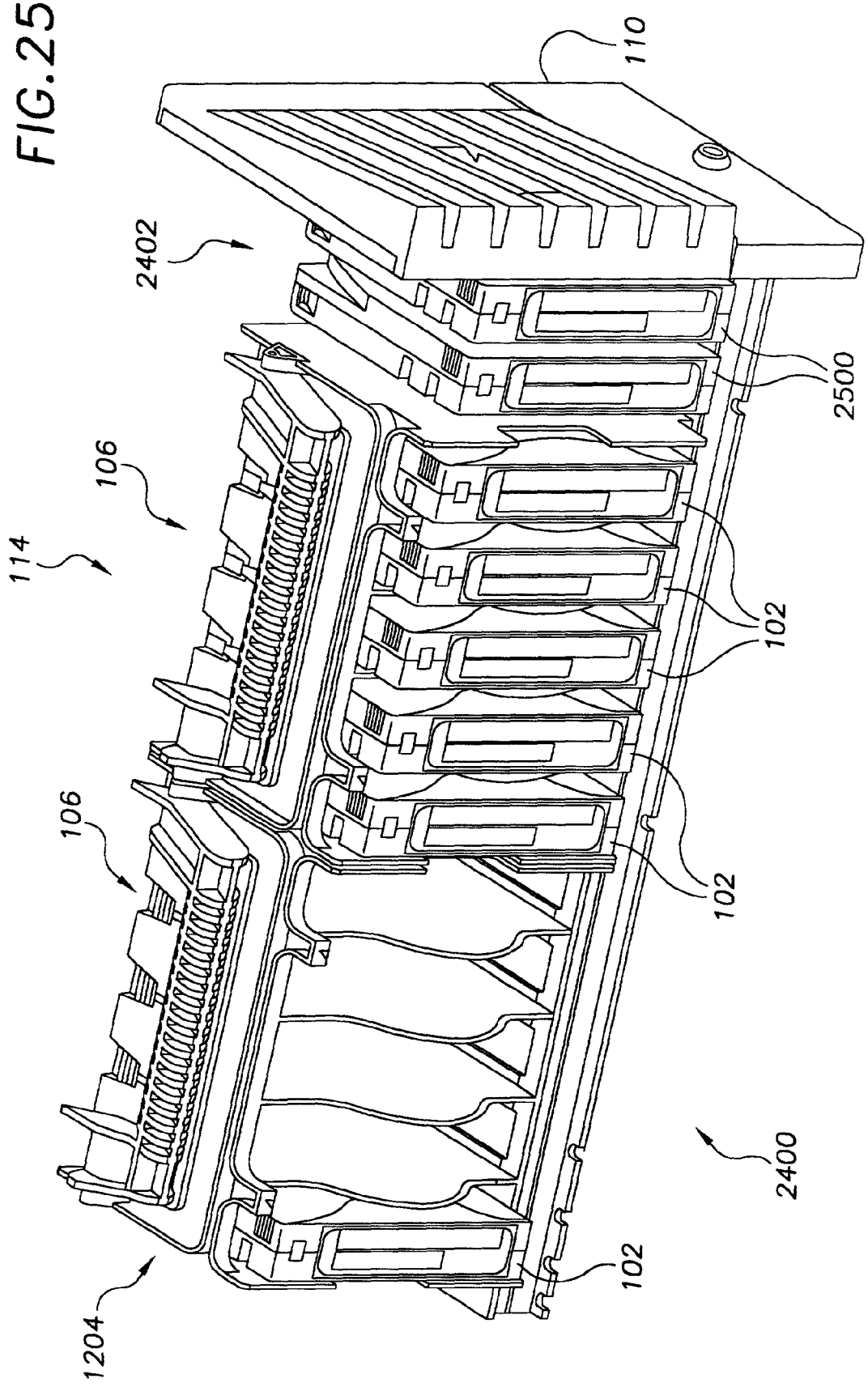
FIG. 25 is a perspective view of the data media exchange apparatus of FIG. 24.
Figure 26:
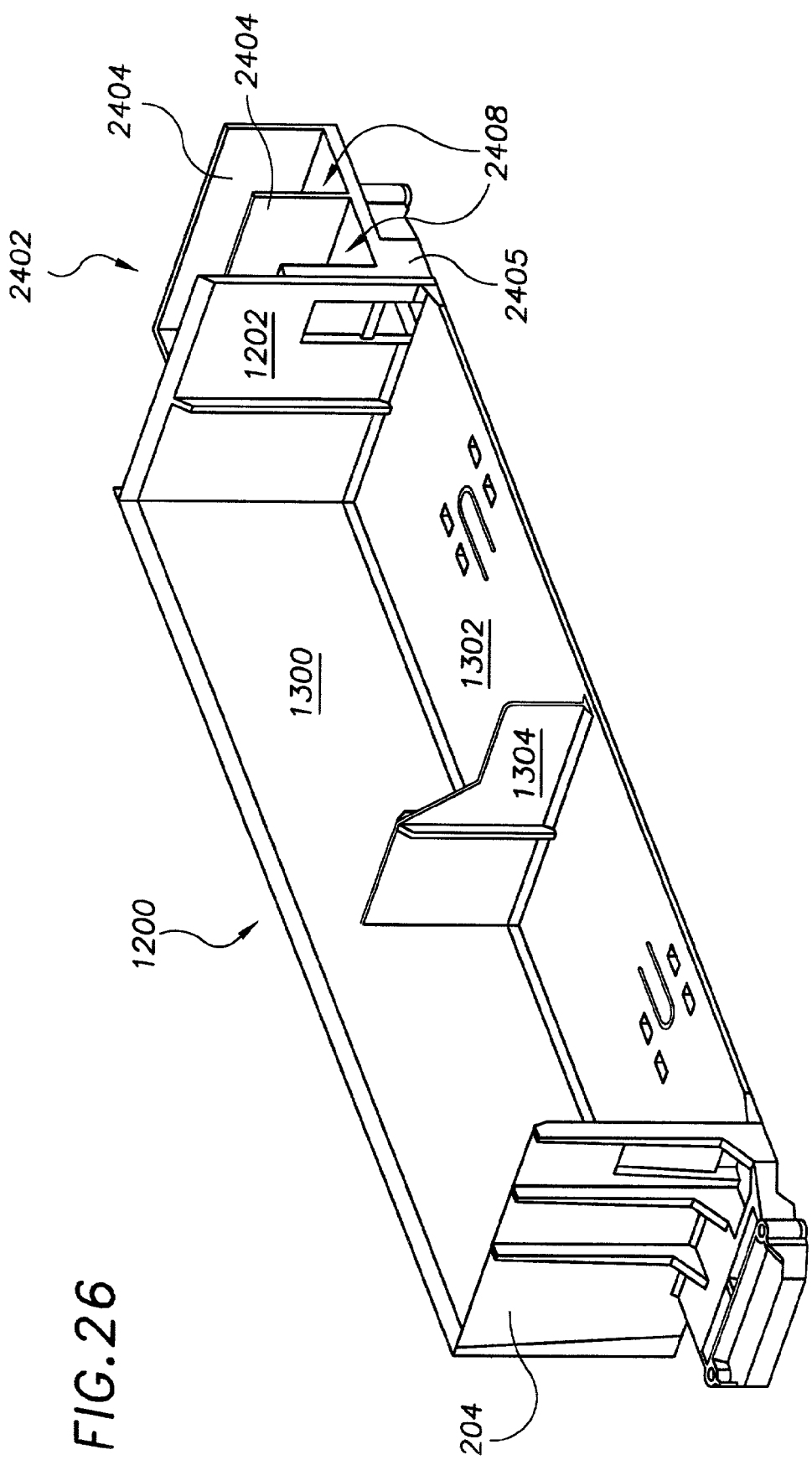
FIG. 26 is a perspective view of a storage tray of the data media exchange apparatus of FIG. 24.
Figure 27:
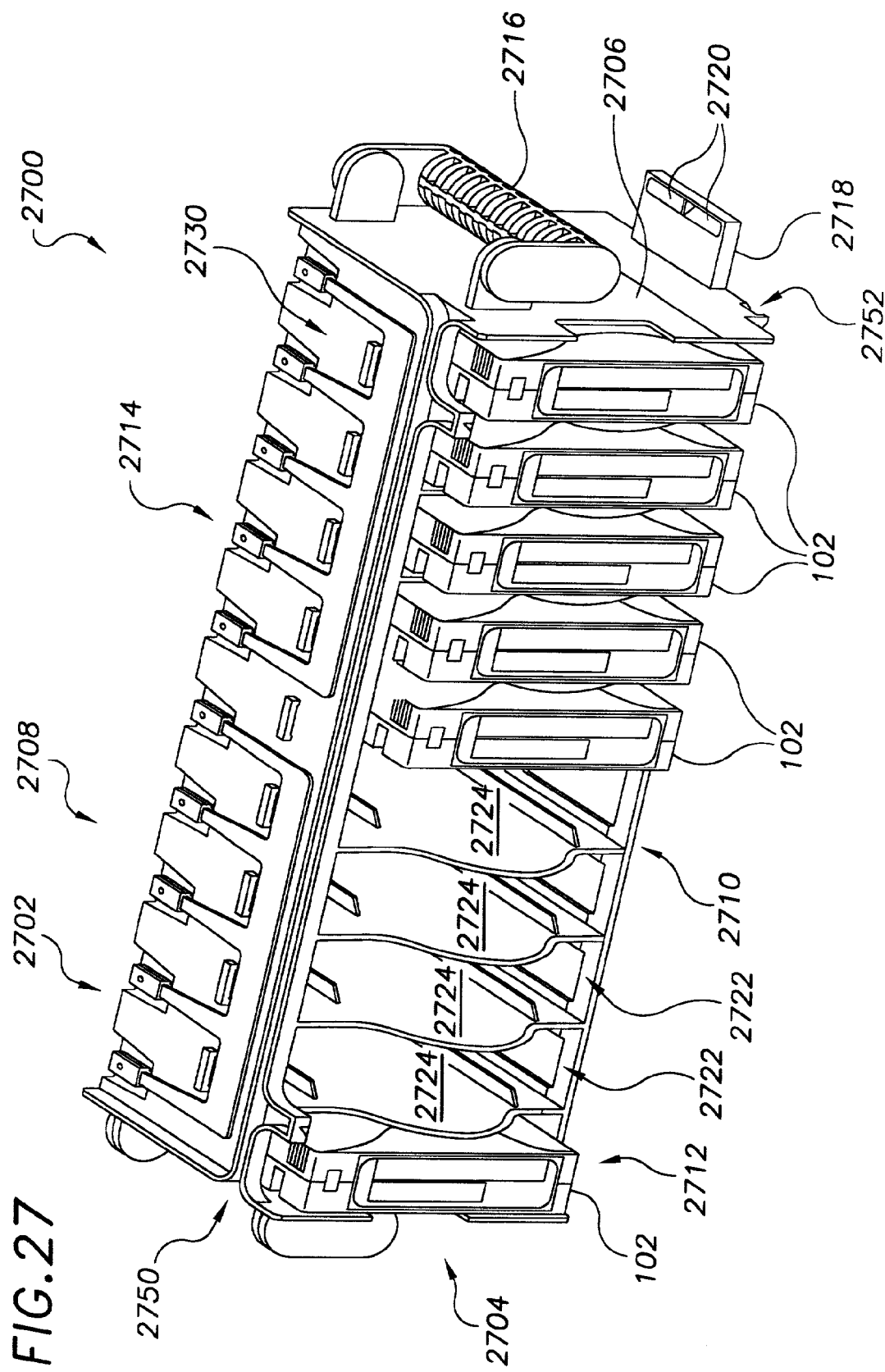
FIG. 27 is a perspective view of one of many possible embodiments of an integrated media exchange/storage device that may be inserted and removed from the data storage system of FIGS. 1-3 according to the present invention.
Figure 28:
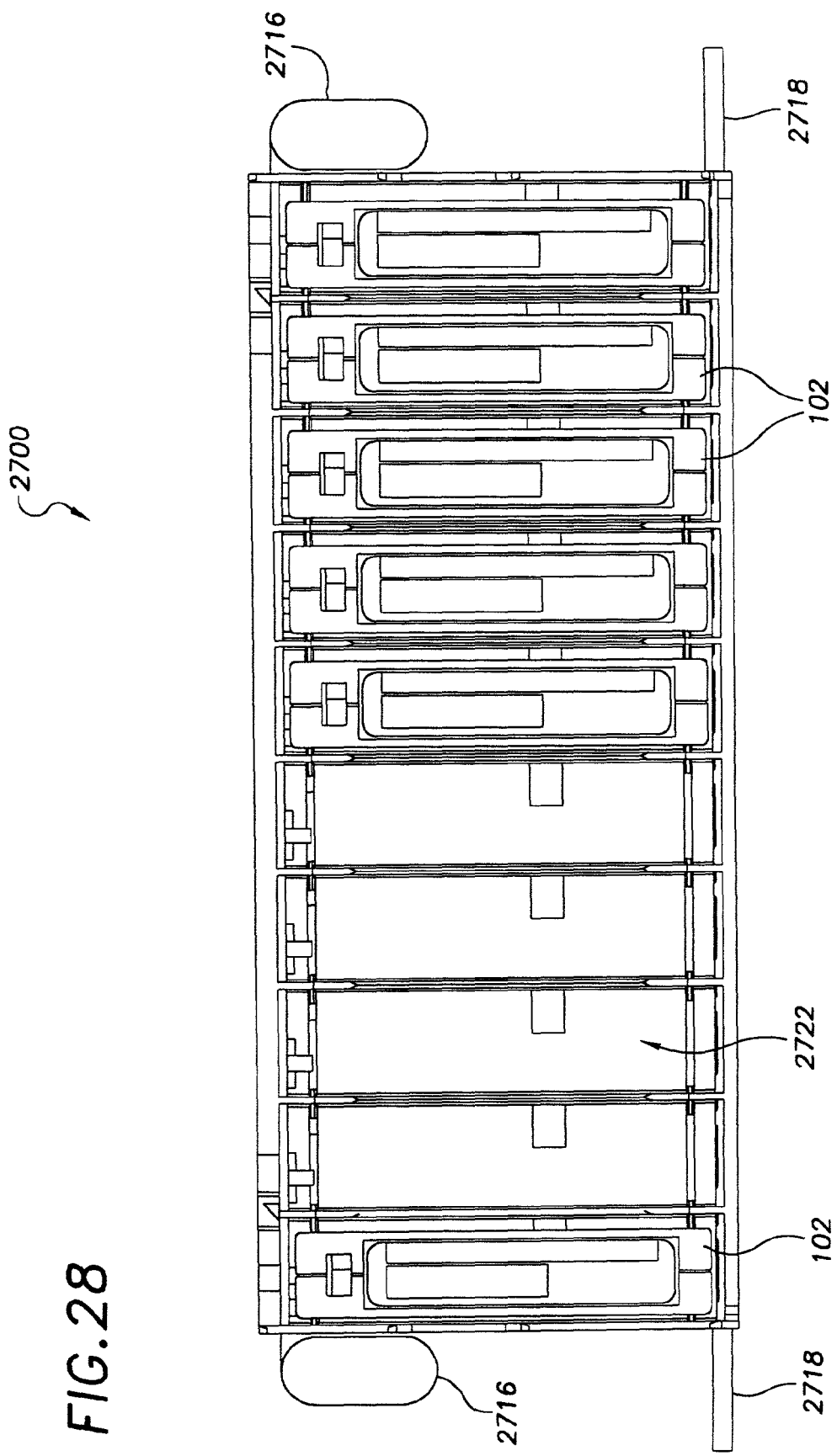
FIG. 28 is a side view of the integrated media exchange/ storage device of FIG. 27.

As illustrated best in FIGS. 1, 2 and 12, data media exchange apparatus 120 includes an unused volume between end wall 1202 and front access panel 110, which data medium access device 216 of media handling system 200 cannot access due to the thickness of housing 114 and front access panel 110. FIGS. 24-26 illustrate another embodiment of a data media exchange apparatus 2400 that may also be implemented within data storage system 100.

Data media exchange apparatus 2400 may be configured in much the same manner as data media exchange apparatus 120. Data media exchange apparatus 2400 may also be mounted directly to mounting system 1330 and operated in the same manner described above with respect to data media exchange apparatus 120. However, data media exchange apparatus 2400 further comprises a supplemental storage apparatus 2402 positioned between end wall 1202 and front access panel 110. Supplemental storage apparatus 2402 comprises a plurality of slots 2408 defined by one or more slot members 2404 and a base member 2405. Base member 2405 extends from front end wall 1202 to provide a base for supporting data media 102 received in slots 2408. Slot members 2408 extend away from base member 2405. As illustrated in FIG. 25, base member 2405 and one or more slot members 2408 provide one or more slots 2408 for receiving spare data medium 2500. Slots 2408 and the data media 2500 contained therein will not be accessible to media handling system 200 because of the thickness of housing 104 and front access panel 110 and the configuration of media handling system 200.

One of ordinary skill in the art will appreciate that the precise volume between end wall 1202 and front access panel 110 may vary depending on a variety of factors, such as the precise size and configuration of data media exchange apparatus 2400, data media 102, media storage devices 106, and data storage system 100. Thus, the number of slots 2408 and slot members 2402 in supplemental storage apparatus 2402 may vary. Furthermore, the precise size and configuration of slots 2408 and slot members 2402 may also vary depending on the type of data media 2500 being contained within storage slots 2408. For example, in one of the many possible embodiments illustrated in FIGS. 24-26, the volume between end wall 1202 and front access panel 110 enables supplemental storage apparatus 2402 of data media exchange apparatus 2400 to be configured with two slots 2408, each containing a data medium 2500. In this example, slot 2408 adjacent end wall 1202 may be defined by a slot member 2404, base member 2405, and end wall 1202. Alternatively, slot 2408 adjacent end wall 1202 may be defined by two slot members 2404. Similarly, slot 2408 adjacent front access panel 110 may be defined by a slot member 2404 and front access panel 110 or any other component of data exchange apparatus 2400. Alternatively, slot member 2408 adjacent front access panel 1202 may be defined by two slot members 2404. Slot 2408 adjacent end wall 1202 and slot 2408 adjacent-front access panel 110 may or may not be defined by a common slot member 2404. Furthermore, where supplemental storage apparatus 2402 comprises more than two slots 2408, each pair of interior slots 2408 may or may not be defined by a common slot member 2402.

Supplemental storage apparatus 2402 may be made from any of a wide range of desirable materials, such as metals or plastics, suitable for the intended application. In one of many possible embodiments, supplemental storage apparatus 2402 may be molded as a single piece from a fiber reinforced polycarbonate plastic material. Supplemental storage apparatus 2402 may be formed as an integral part of storage tray 1200. In other embodiments, supplemental storage apparatus 2402 may be formed as a separate component from storage tray 1200, in which case supplemental storage apparatus 2402 may be fixedly secured to storage tray 1200 or some other component of data media exchange apparatus 2400.

As stated above, data media exchange apparatus 2400, may be configured and operated in much the same manner as data media exchange apparatus 120. However, supplemental storage apparatus 2402 enables spare data medium 2500 to be stored in data media exchange apparatus 2400 rather than being stored in some other location outside of data storage system 100. Thus, supplemental storage apparatus 2402 provides an operator or service personnel with quick access to spare data media 2500 that may be used to replace data media 102 contained in media storage devices 106 without the burden of locating spare data media 2500 at some other location.

V. Integrated Media Exchange/Storage Device

FIGS. 27-30 illustrate an integrated media exchange/storage device 2700 configured to receive one or more data medium 102 and that may be easily inserted and removed from data storage system 100 by an operator or service personnel by slidably engaging the integrated media exchange/storage device 2700 with elongate reference rails 1316 and 1312 (FIGS. 13 and 21).

Integrated media exchange/storage device 2700 may generally comprise: a housing 2702 having end portions 2704 and 2706, top portion 2708, bottom portion 2710, and side portions 2712 and 2714; and one or more handles 2716 attached to the housing 2702; one or more lock plates 2718 attached to the housing 2702 and having at least one aperture 2720 therein. Side portion 2712 comprises a plurality of slots 2722 configured for receiving data media 102. Slots 2722 may be defined by a plurality of spaced dividers 2724 within the housing 2702. Dividers 2724 may be parallel to end portions 2706 and 2704 and may have beveled edges that serve to guide data media 102 into slots 2722. Slots 2722 may have inclined surfaces on bottom portion 2710 that also serve to guide data media 102 into the slots 2722. As described in detail below, in order to slidably engage with elongate reference rails 1316 and 1312, the top portion 2708 of housing 2702 may include an elongate alignment groove 2750, which engages with elongate reference rail 1316 (FIGS. 13 and 21), and the bottom portion 2710 may include an elongate alignment groove 2752, which engages with elongate reference rail 1312 (FIGS. 13 and 21).

One of ordinary skill in the art will appreciate that the precise configuration of integrated media exchange/storage device 2700 may vary depending on a variety of factors, such as the precise size and configuration of data media 102 and data storage system 100. Thus, the number of slots 2722 and dividers 2724 may vary. Furthermore, the precise size and configuration of slots 2722 and slot members 2724 may also vary depending on the type of data media 102 being contained within slots 2722. For example, in one of the many possible embodiments illustrated in FIGS. 27-29, integrated media exchange/storage device 2700 includes ten slots 2722 for receiving data media 102. Furthermore, dividers 2724 need not extend the entire distance from top portion 2708 to bottom portion 2710. Dividers 2724 are preferably configured to guide data media 102 into slots 2722. For example, and not by way of limitation, a divider 2724 may comprise two small divider portions, one which extends downward from top portion 2708 and one which extends upward from bottom portion 2710. Divider 2724 may also comprise a single piece extending from bottom portion 2710, but not reaching top portion 2708, or extending from top portion 2708, but not reaching bottom portion 2710, etc.

Integrated data media exchange 2700 may also include a spring mechanism 2730 fixedly attached to top portion 2708 of housing 2702 for retaining data media 102 positioned in slots 2722. Spring mechanism 2730 provides a force for securing data media 102 in slots 2722 in housing 2702. Top portion 2708 of the housing 2702 may have a plurality of devices that are used to secure the spring mechanism 2730 to the housing 2702. The top portion 2708 may have a plurality of spring locks 2732. A spring lock 2732 may have a left portion, a right portion, a top portion, and an opening. The left portion and the right portion may extend normal to the top portion 2708 of the housing 2702. The top portion of the spring lock 2732 may extend between the left portion and the right portion to form the opening. The spring locks 2732 may, for example, be integrally formed into the top portion 2708 of the housing 2702. The top portion 2708 of the housing 2702 may also have one or more spring guides 2734 integrally formed into the top portion 2708. The spring guides 2734 may serve to align the spring mechanism 2730 relative to the top portion 2708 of the housing 2702 as described below.

As stated above, the spring mechanism 2730 may be attached to the top portion 2708 of the housing 2702. The spring mechanism 2730 may have a mounting portion 2736 and a plurality of fingers 2738. A finger 2738 may have a front portion 2740, a back portion 2742, and mid-portion 2744.

In a preferred embodiment, the front portion 2740 may have a width of approximately 7 millimeters and the back portion 2742 a width of approximately 4 millimeters. Fingers 2738 may have a length of approximately 40 millimeters. The tapered shape of fingers 2738 allows for a greater deflection of the finger 2738 relative to a non-tapered finger when the same stress is applied to both types of fingers.

The mounting portion 2746 may have a plurality of spring tabs (not shown) located opposite a front edge 2746 of spring mechanism 2730. The front edge 2746 may abut spring guides 2734. The spring guides 2734 may be adapted to fit in the openings (not shown) of the spring locks 2732. The combination of the spring guides 2734 and the spring locks 2732 allows the spring mechanism 2730 to be attached to the top portion 2708 of the housing 2702 without the need of fasteners. They further properly align the spring mechanism 2730 relative to the housing 2702.

The spring mechanism 2730 may be made from, for example, a single sheet of 301 stainless steel that is approximately 0.635 millimeters thick. The use of stainless steel reduces the probability of the spring mechanism 21300 corroding. The stiffness of the fingers 2738 may be selected by known mechanical techniques involving selecting the material of the spring mechanism 2730, the thickness of the material, the widths of the fingers 2738, and other factors that are known in the art.

As best illustrated in FIG. 30, the back portions 2742 of fingers 2738 may include locking elements 3000. Locking elements 3000 may be affixed to the back portions 2742 of the fingers 2738. The locking elements 3000 may serve to secure the data media in the housing 2702. FIG. 30 illustrates a cross-sectional view of integrated data media exchange/storage device 2700 with a data medium 102 located in a slot 2722. The locking element 3000 may, for example, be molded from nylon 6-10 modified by the addition of carbon fiber and PTFE, which is commercially available from the LNP Engineering Plastics Company of Exton, Pa. as product number QCL-4036. The locking element 3000 may be attached to the back portion 2742 of the finger 2738 by molding the locking element 3000 onto the finger 2738.

The locking element 3000 may be generally triangle-shaped with a top portion 3002, a back portion 3004, and a front portion 3006. The back portion 3004 and the front portion 3006 may intersect at a point 3008. A reference line AA may extend parallel to the top portion 3002 and may intersect the point 3008. A back angle 3010, for example, 55 degrees, may exist between the reference line AA and the back portion 3004. A front angle 3012 may exist between the reference line AA and the front portion 3006. In the embodiment illustrated in FIG. 30, the locking element 3000 may serve to secure data media 102 in slots 2722 of integrated data media exchange/storage device 2700.

As stated above, integrated data media exchange/storage device 2700 may include a handle 2716 attached to the housing 2702. The handle 2716 may be pivotally attached end portion 2704 and/or end portion 2706. In the embodiment illustrated in FIGS. 27-30, integrated data media exchange/storage device 2700 is configured so that it may be used in a data storage system 100 (FIGS. 1 and 2). Thus, integrated data media exchange/storage device 2700 preferably includes a handle 2716 on both end portions 2704 and 2706. In this manner, integrated data media exchange/storage device 2700 may be implemented with either the right or left side of data storage system 100. This configuration enables the manufacture of a single symmetrical integrated data media exchange/storage device 2700.

As stated above, integrated media exchange/storage device 2700 may be easily inserted and removed from data storage system 100 by an operator or service personnel by slidably engaging the elongate alignment grooves 2750 and 2752 with elongate reference rails 1316 and 1312 respectively as described above in detail with respect to FIGS. 13 and 21.

Integrated data media exchange/storage device 2700 may also have lock plates 2718 fixedly attached to end portion 2704 and/or end portion 2706. Lock plates 2718 may be used in conjunction with the lock apparatus 2200 (FIG. 22) of data storage system 100. As described in detail above, the lock apparatus 2200 may comprise a lock actuator 2202 for moving a plunger or lock bolt 2204 between a locked position 2206 and an unlocked position 2208. The lock bolt 2204 is sized to engage an aperture 2720 provided in a lock plate 2718 on integrated data media exchange/storage device 2700. A limit switch 2214 mounted to the chassis 1310 of data storage system 100 detects when integrated data media exchange/storage device 2700 is fully inserted in data storage system 100. Limit switch 2214 may be connected to the lock control system 2216 which may be used to operate the lock actuator 2202 as described above.

Integrated data media exchange/storage device 2700 may be operated as follows to allow an operator (not shown) to access the various data media 102 contained within an integrated data media exchange/storage device 2700 in data storage system 100. During normal operation of data storage system 100, integrated data media exchange/storage device 2700 may be slidably engaged within data storage system 100 by elongate alignment grooves 2750 and 2752 and elongate reference rails 1316 and 1312. While integrated data media exchange/storage device 2700 is inserted within data storage system 100, media handling system 200 (FIGS. 2 and 4) inside the data storage system 100 may access all of the data media 100 contained within slots 2722. If the need then arises for the operator to access one or more of the media 102, such as, for example, to remove one or more of the data media 102 and replace it or them with a substitute data medium 102 (not shown), the operator may remove or open a front panel 110. Then, the operator may slide integrated data media exchange/storage device 2700 from alignment apparatus 1314 by pulling on the handle 2716. As the operator pulls on the handle 2716, elongate alignment grooves 2750 and 2752 slide over elongate reference rails 1316 and 1312, thereby removing integrated data media exchange/storage device 2700. If data storage system 100 is provided with a lock apparatus 1200, then the lock control system 2216 would first have to be instructed to unlock integrated data media exchange/storage device 2700. The lock control system 2216 could be instructed by the control system (not shown), or by the operator via a control panel 112.

Once integrated data media exchange/storage device 2700 has been partially extended or removed, the operator may access the exposed data media 102 for their exchange, removal, or replacement. While integrated data media exchange/storage device 2700 is partially extended or removed, the data storage system 100 may remain operable and the media handling system 200 may continue to access the data media 102 stored in other integrated data media exchange/storage devices 2700 and/or data media exchange apparatus 120 and 2400. However, the media handling system 200 will not access the data media contained in the partially extended or removed integrated data media exchange/storage device 2700.

When the operator no longer needs access to the exposed data media 102, he or she may insert integrated data media exchange/storage device 2700 into data storage system 100. Integrated data media exchange/storage device 2700 should be pushed into data storage system 100 so that the elongate reference rails 1316 and 1312 engage the respective elongate alignment grooves 2750 and 2752 in integrated data media exchange/storage device 2700. When fully engaged with the alignment grooves 2750 and 2752, the reference rails 1316 and 1312 slightly lift integrated data media exchange/storage device 2700, thereby ensuring that the media handling system 200 will be able to quickly locate the desired data media 102 in slots 2722.

After integrated data media exchange/storage device 2700 has been fully inserted, the lock control system 2216 (FIG. 22) may operate the lock apparatus 2200 to insert the lock bolt 2204 within the aperture 2720 in the lock plate 2718. Thereafter, the data storage system 100 may "re-inventory" the data media 102 stored within the data storage system 100. In this example, the data storage system 100 need only re-inventory those data media 102 contained in integrated data media exchange/storage device 2700, since those were the only data media 102 that could have been exchanged, removed, or replaced by the operator.

VI. Bulk Data Media Access System

As stated above, media storage devices 106 and data media 102 may be implemented in data storage system 100 in a variety of devices and in a variety of ways. For example, data media 102 may be implemented in a media storage device 106, such as an integrated data media exchange/storage device 2700, that may be easily inserted and removed from data storage system 100. In this type of configuration, media storage device 106 may be inserted and removed in a sliding arrangement. Data media 102 may also be implemented in a media storage device 106 having a drawer configuration, such as, for example, data media exchange apparatus 120 and 2400. In the drawer configuration, each media storage device 106 may be accessed from a separate access means. For instance, consider a data storage system 100 that includes a plurality of data media exchange apparatus 120 and 2400, which may, for example, be arranged in a plurality of vertical stacks 300. In the drawer configuration, each data media exchange apparatus 120 and 2400 provides for a separate means for accessing the device. Specifically, an operator may access the data media 102 stored in a data media exchange apparatus 120 or 2400 by extending and retracting the drawer 114. Thus, each data media exchange apparatus 120 and 2400 in data storage system 100 employs a separate access means and a separate locking means.

Figure 38:
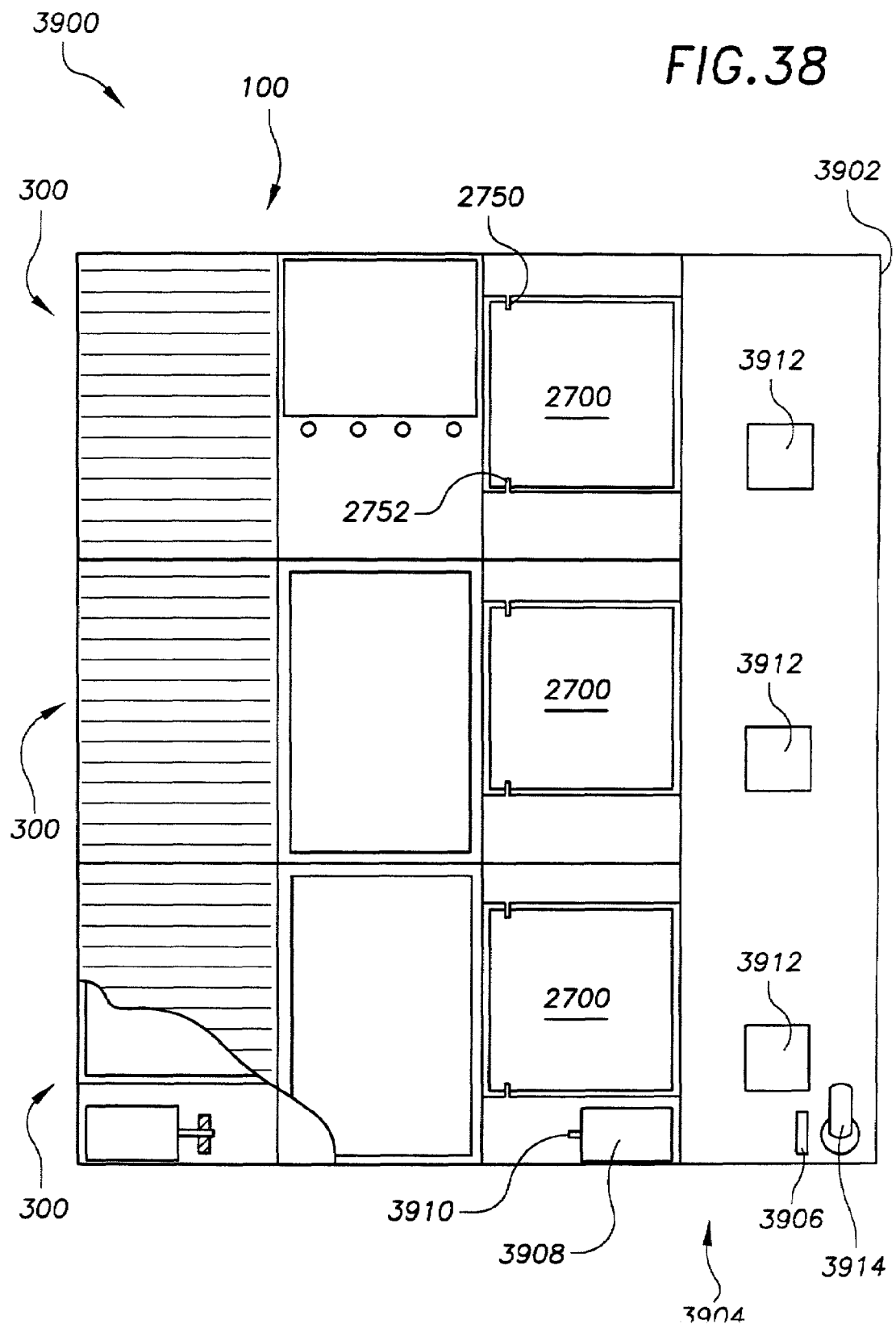
FIG. 38 is a perspective view of one of many possible embodiments of a bulk data media access system according to the present invention for providing an operator and/or service personnel access to a plurality of data media contained in the data storage system of FIG. 3.
Figure 39:
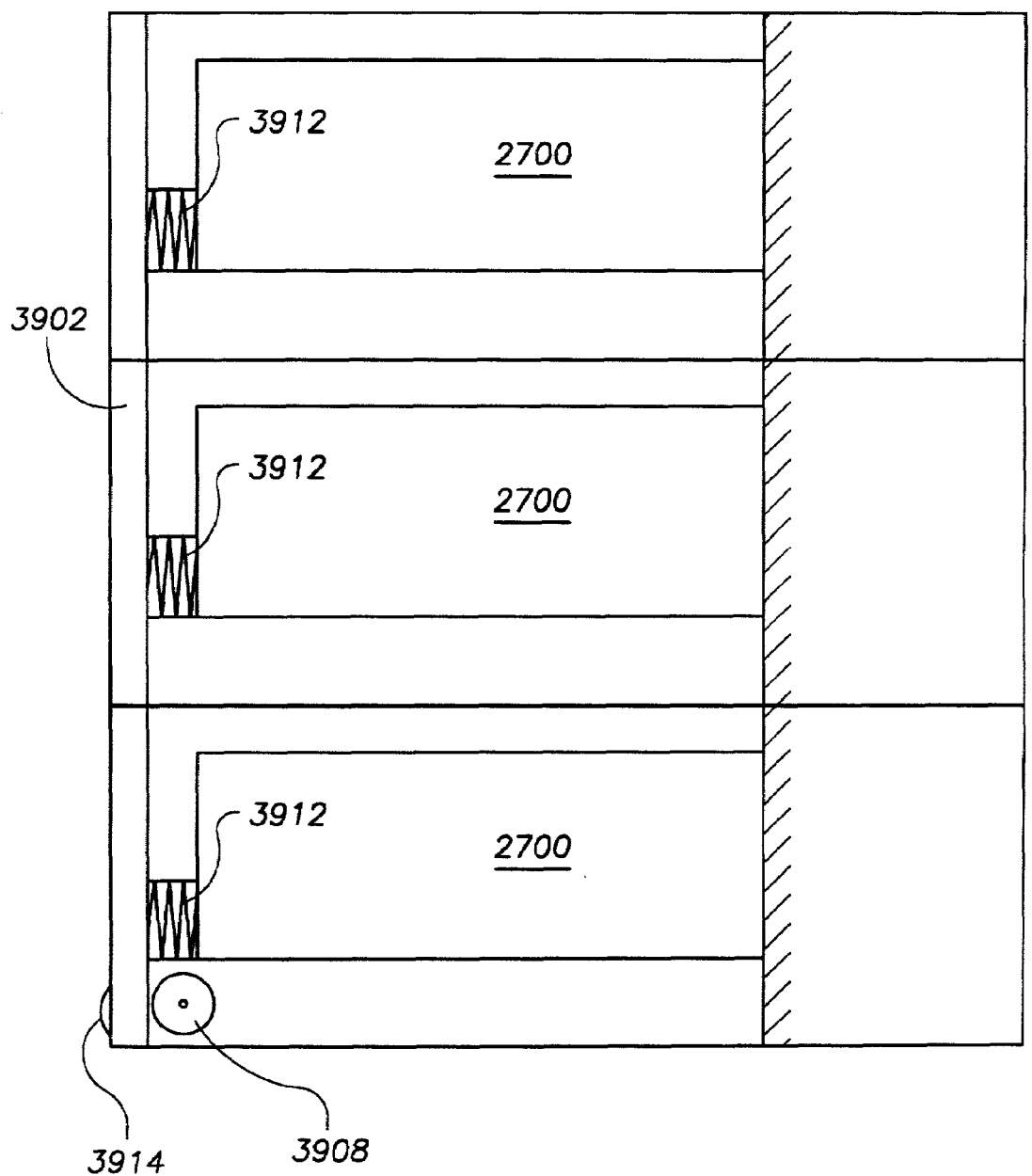
FIG. 39 is a side cross-sectional view of the bulk data media access system of FIG. 38.
Figure 40:
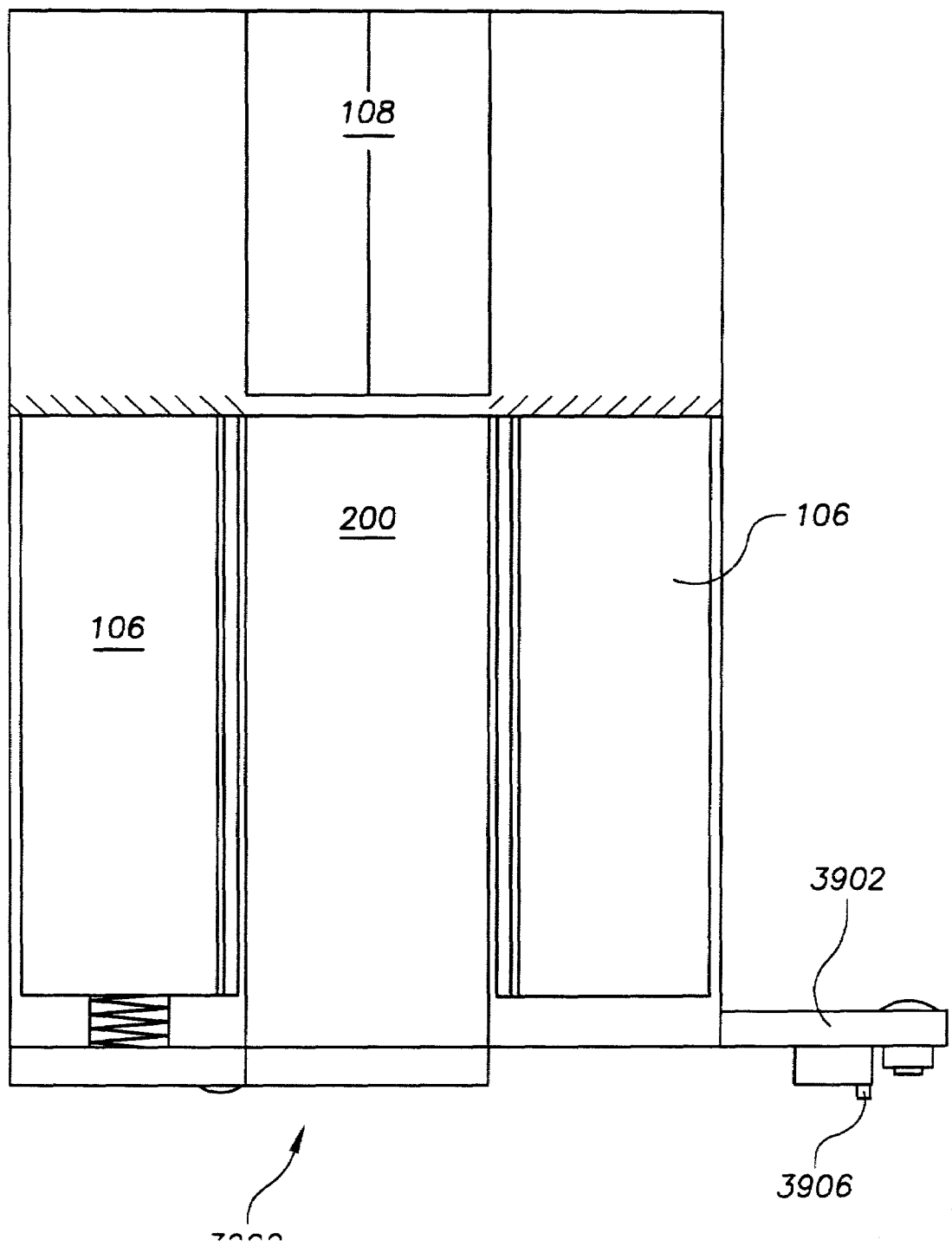
FIG. 40 is a top cross-sectional view of the bulk data media access system of FIG. 38.

Referring to FIGS. 38-40, a bulk data media access system 3900 for a data storage system 100 will be described. Regardless the precise configuration of media storage devices 106 and data storage system 100, bulk data media access system 3900 provides a single means for accessing the plurality of media storage devices 106 arranged in the data storage system 100. In other words, bulk data media access system 3900 may eliminate the need for providing a separate access means and a separate locking means for each media storage device.

Bulk data media access system 3900 provides a bulk access apparatus 3902 for accessing at least a portion of the plurality of media storage devices 106 arranged in a contiguous manner. As illustrated in FIGS. 39 and 40, in one of many possible embodiments, bulk access apparatus 3902 may be configured to provide a single access means to a plurality of media storage devices 106 arranged in a plurality of vertical stacks 300. One of ordinary skill in the art will appreciate that bulk access apparatus 3902 may be configured in a variety of other ways. For instance, bulk access apparatus 3902 may be configured to provide a single access means to a plurality of media storage devices arranged horizontally in a plurality of rows. The precise configuration of bulk access apparatus 3902 may be altered to correspond to any contiguous arrangement of media storage devices 106. The important aspect is that bulk access apparatus 3902 enables an operator to access more than one media storage device 106 at a time.

Accordingly, bulk media access system 3900 may employ more than one bulk access apparatus 3902. In a preferred embodiment, bulk media access system 3900 is implemented in a data storage system 100 in which media storage devices 106 are arranged in a plurality of vertical stacks 300 as illustrated in FIGS. 3, 39, and 40. Within each stack 300, media storage devices 106 are arranged on opposite sides of media handling system 200 as illustrated in FIG. 2. Accordingly, two groups of contiguous media storage devices 106 may be defined: one defined by the vertical arrangement of contiguous media storage devices 106 on one side portion of data storage system 100 and the other defined by the vertical arrangement of contiguous media storage devices 106 on the other side portion of data storage system 100. Thus, in this embodiment, bulk media access system 3900 preferably provides two bulk access apparatus 3902.

Furthermore, bulk access apparatus 3902 may be attached to data storage system 100 in a variety of ways for providing a single access means to a plurality of media storage devices 106. As illustrated in FIGS. 38-40, bulk access apparatus 3902 maybe configured as a door that is hinged to a housing 104 of data storage system 100. Bulk access apparatus 3902 may also be configured as a removable panel that may be easily attached and removed from housing 104 of data storage system 100. Bulk access apparatus 3902 preferably provides a single access means to a plurality of media storage devices 106 arranged in a contiguous manner.

As illustrated in FIG. 38, bulk access apparatus 3902 may further include a plurality of spring pads 3912 that are attached to the side of bulk apparatus 3902 opposing media storage device 106. Each spring pad 3912 is positioned opposite a corresponding media storage device 106. Spring pads 3912 may be configured as a foam panel, a passive spring mechanism, or any other mechanism for providing a force against media storage device 106 when bulk apparatus 3902 is closed and/or attached to data storage system 100. In this manner, spring pads 3912 may hold media storage device 106 in a predefined position relative to the media handling system 200, thereby promoting effective operation of the data storage system 100.

Bulk access apparatus 3902 may also include a locking mechanism 3904 configured to lock the bulk access apparatus 3902 relative to the housing of data storage system 100. In one of many possible embodiments, locking mechanism 3904 may comprise two systems for locking the bulk access apparatus 3902: a key lock mechanism and an electronic lock mechanism controlled by a control system associated with data storage system 100. Key lock mechanism may comprise a door key lock 3914 attached to the bulk access apparatus 3902 and configured to engage a key lock latch (not shown) within data storage system 100. Key lock 3914 and the key lock latch may provide a locked state, in which key lock 3914 and the key lock latch are engaged, and an unlocked state, in which key lock 3914 and the key lock latch are not engaged.

Locking mechanism 3904 may also include an electronic lock mechanism for additional security. The electronic lock mechanism may be configured to work in cooperation with a control system associated with data storage system 100. In one of many possible embodiments, the electronic lock mechanism may comprise an electro-mechanical device 3910, such as a solenoid, that is contained within data storage system 100 and controlled by the control system and a door latch 3906 secured to the bulk access apparatus. The electromechanical device 3910 and the door latch 3906 may provide a locked state, in which device 3910 and the door latch 3906 are engaged, and an unlocked state, in which device 3910 and the door latch are not engaged.

In operation, locking mechanism 3904 may provide two levels of security for the data storage system 100. Thus, in order to access the media storage devices 106 associated with the bulk access apparatus 3902, an operator or service personnel preferably unlocks both the electronic mechanism and the key lock mechanism. Using a key, the operator places the key lock 3914 and the key lock latch in the unlocked state. In addition, the operator preferably places the device 3910 and the door latch 3906 in the unlocked state. After both mechanisms are unlocked, the bulk access apparatus 3902 may be opened and access provided to the associated media storage devices 106.

The electro-mechanical locking may used to meet safety requirements designed to prevent users from obtaining access to functional areas of data storage system 100 when media handling system 200 is in operation. This prevents possible injury to users. It also allows the control system associated with data storage system 100 to maintain control over the timing of access to data media 102. Otherwise a user could remove or switch locations of a data medium 102 that the data storage system 100 was in the process of accessing. If the data storage system 100 could not find the data medium 102 in the expected location it would generate an error. The electro-mechanical lock must shut down or fail in an open state (allowing access to data media 102). If it did not, the users data would be trapped in the data storage system 100 during a power failure or mechanical failure. The key lock provides security from unauthorized access to data media 102 in the event the power fails, or if the data storage system 100 is powered down for other reasons.

VII. Spring Retention System

As stated above, integrated data media exchange/storage device 2700 may include a spring mechanism 2730 fixedly attached to top portion 2714 of housing 2702 for retaining data media 102 positioned in slots 2722. Spring mechanism 2730 provides a force for securing data media 102 in slots 2722 in housing 2702. In the embodiment described above with respect to FIGS. 27-30, the combination of the spring guides 2734 and the spring locks 2732 allow the spring mechanism 2730 to be attached to the top portion 2714 of the housing 2702 without the need of fasteners. They further properly align the spring mechanism 213000 relative to the housing 2702.

One of ordinary skill in the art will appreciate that various other ways exist for attaching spring mechanism 2730 to housing 2702, some of which are described below. These systems and methods for attaching spring mechanism 2730 to housing 2720 may be implemented in a variety of devices, such as, for example, integrated data media exchange/storage device 2700, media storage devices 106, or any other device for storing data media 102, including those disclosed in U.S. Pat. No. 6,042,205.

Figure 33:
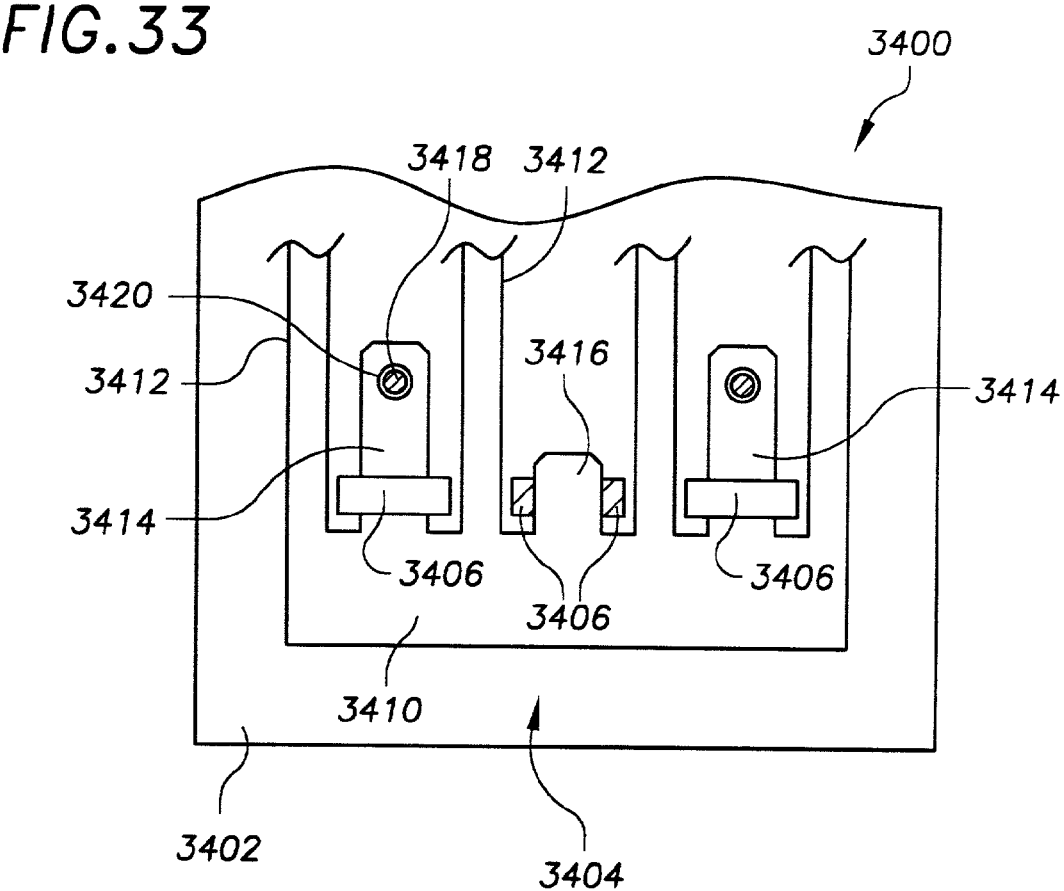
FIG. 33 is a top view of another embodiment of a spring retention system according to the present invention that may be used in the data media exchange apparatus of FIGS. 12 and 24-30 for retaining the data media.
Figure 34:
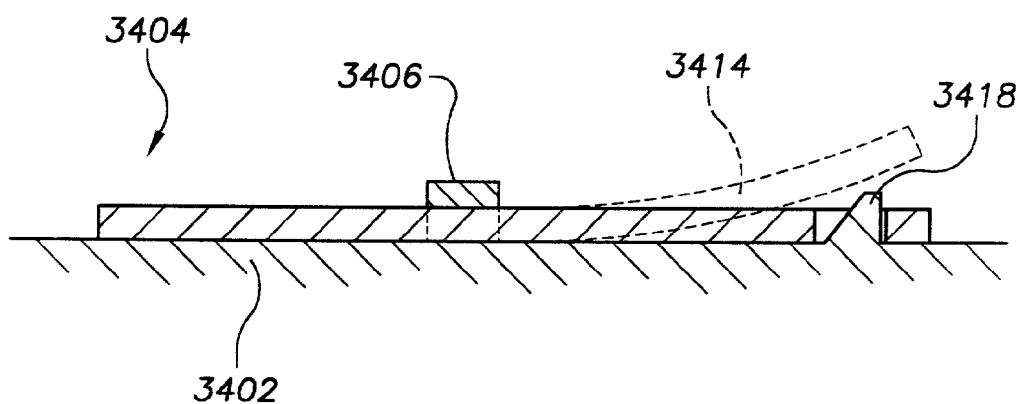
FIG. 34 is a side view of the operation of the spring retention system of FIG. 33.

Referring to FIGS. 33 and 34, a spring retention system 3400 for retaining data media 102 in a data media storage device will be described. Spring retention system 3400 may be configured to operate in much the same manner as described above with respect to spring mechanism 2730. Accordingly, spring retention system 3400 provides a spring mechanism 3404 attached to one side, for example a top portion, of a housing 3402 of any of a variety of media storage devices.

Spring mechanism 3404 provides a force for securing data media 102 in slots (not shown) within housing 3402. The top portion of the housing 3402 may have a plurality of spring alignment members 3406 and one or more spring retention elements 3418. The top portion of housing 3402 may have a plurality of spring alignment members 3406, each of which may include a left portion, a right portion, a top portion, and an opening. The left portion and the right portion may extend normal to the top portion of the housing 3402. The top portion of the spring alignment member 3406 may extend between the left portion and the right portion to form the opening. The spring alignment members 3406 may, for example, be integrally formed into the top portion of the housing 3402.

The top portion of the housing 3402 may also have one or more spring retention members 3418 that extend from the top portion of the housing 3402. As described in detail below, in operation, each spring retention member 3418 aligns with an aperture 3420 in spring mechanism 3404 and works in cooperation with a spring alignment member 3406. Therefore, there are numerous configurations for spring retention member 3418 and aperture 3420. As illustrated in cross-section in FIG. 35, in one embodiment spring retention members 3418 are substantially triangle-shaped so that they define a ramp angle that opposes a corresponding spring alignment member 3406. The spring retention members 3418 may be integrally formed into the top portion of the housing 3402, or in the alternative may be attached to the top portion of the housing 3402.

Figure 29:
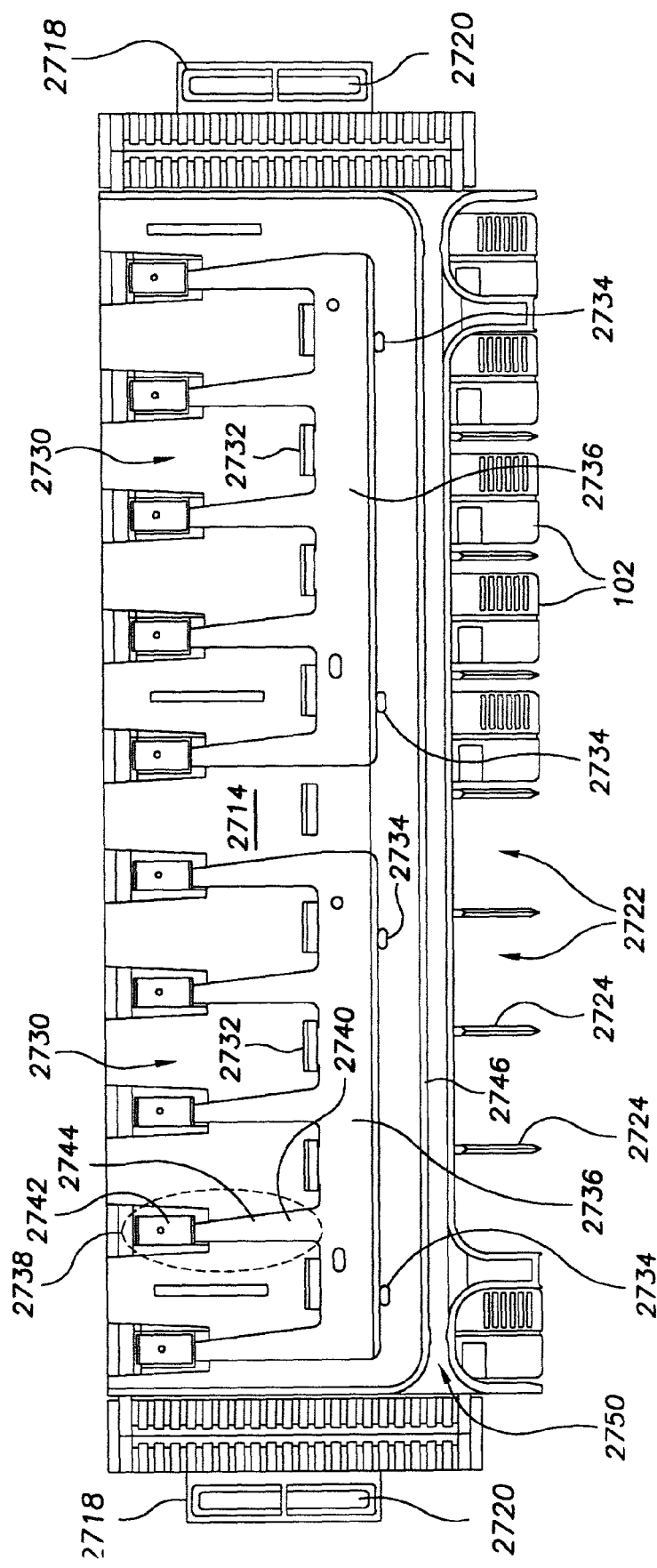
FIG. 29 is a top view of the integrated media exchange/ storage device of FIG. 27 illustrating a spring mechanism.

Spring mechanism 3404 may be attached to the top portion of the housing 3402. The spring mechanism 3404 comprises a mounting portion 3410 from which extend a plurality of fingers 3412 and one or more elongate spring tabs 3414. Fingers 3412 may be configured in much the same manner as fingers 2730 (FIG. 29). As stated above, each elongate spring tab 3414 includes an aperture 3420. Aperture 3420 is positioned on the elongate spring tab 3414 to align with the spring retention member 3418 of housing 3402. Aperture 3420 is also configured to be placed over and retained by the spring retention member 3418 of housing 3402. Spring mechanism 3404 may also include one or more spring tabs 3416 that also extend from mounting portion 3410. Spring tabs 3416 preferably do not include an aperture 3420 and are shorter in length than elongate spring tabs 3414.

As illustrated in FIG. 34, spring retention system 3400 provides for a convenient method for attaching spring mechanism 3404 to housing 3402. For example, spring mechanism 3404 may be attached to housing 3402 by placing spring mechanism 3404 flat against the top portion of housing 3402 and sliding the elongate spring tabs 3414 through the openings in spring alignment members 3406. As a spring mechanism 3404 slides across the top portion of housing 3402 and comes in contact with a spring retention member 3418, an elongate spring member 3414 deflects until the aperture 3420 engages the spring retention member 3418. Elongate spring members 3414 need not automatically deflect as a result of the sliding motion and engagement with the spring retention members 3418. For instance, the elongate spring members may be manually deflected and arranged in cooperation with spring retention member 2418. In this manner, spring alignment members 3406 may retain spring mechanism 3404 relative to lateral and vertical movement, while the engagement of apertures 3420 and spring retention members 3418 may prevent spring mechanism 3404 from sliding within the openings in the spring alignment members 3406.

Spring mechanism 3404 may be constructed of any material, which based on the precise configuration of spring mechanism 3404 and housing 3402, has a desirable spring constant that permits proper deflection of elongate spring tabs 3414. In one embodiment, spring mechanism 3404 maybe made from a single sheet of 301 stainless steel that is approximately 0.1901908 millimeters thick. The use of stainless steel reduces the probability of the spring mechanism 3404 failing due to fatigue.

Figure 35:
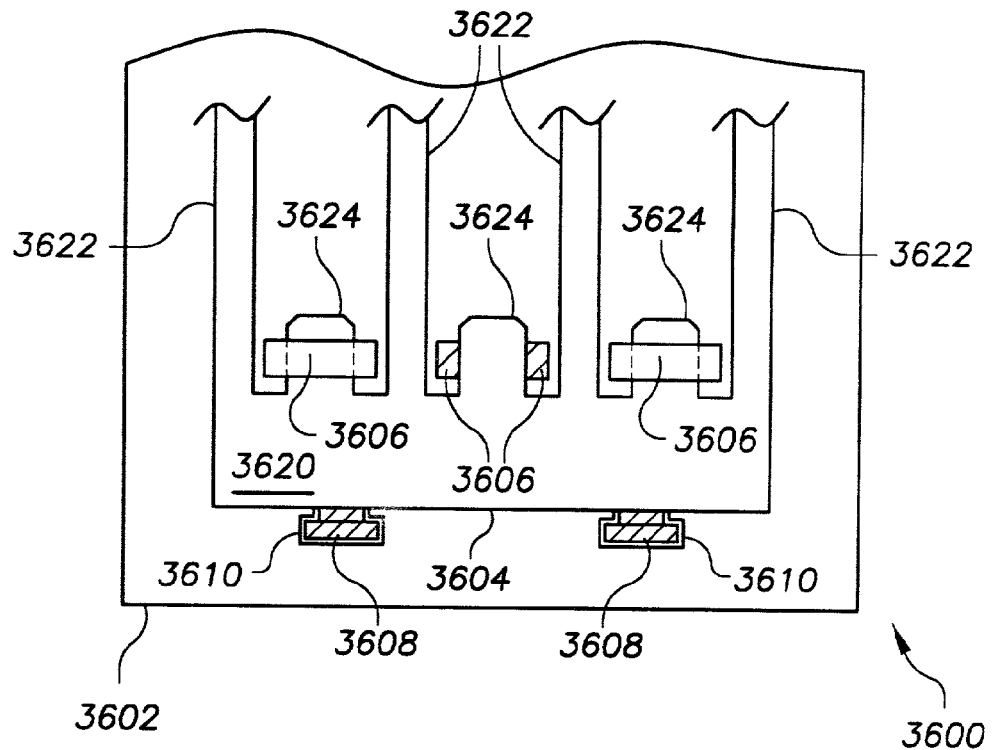
FIG. 35 is a top view of yet another embodiment of a spring retention system according to the present invention that may be used in the data media exchange apparatus of FIGS. 12 and 24-30 for retaining the data media.
Figure 36:
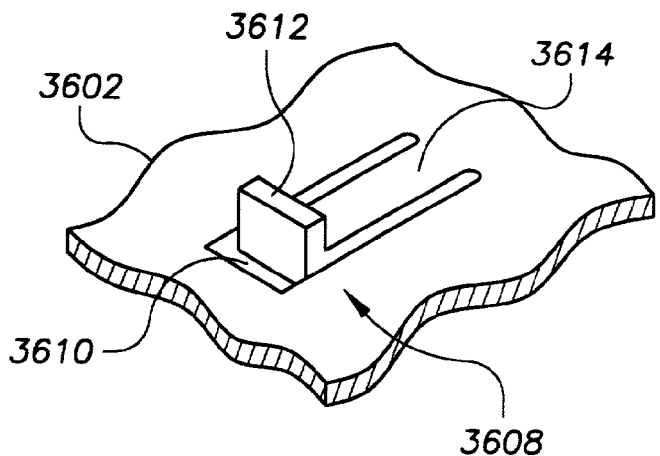
FIG. 36 is a detailed view of spring guide tabs of the spring retention system in FIG. 35.
Figure 37:
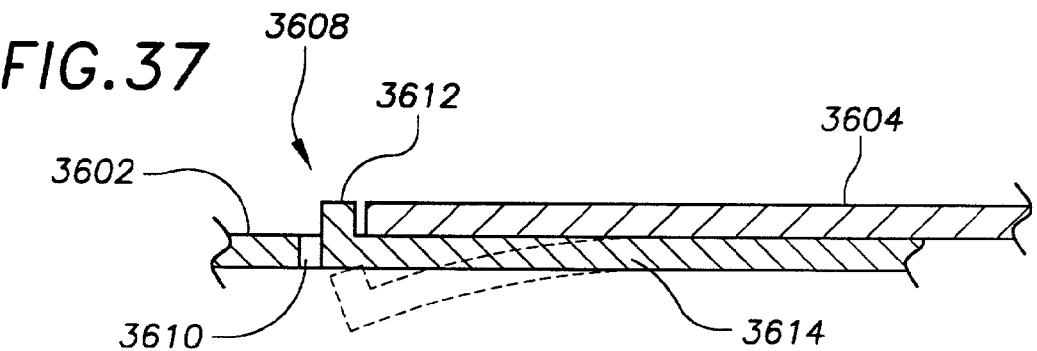
FIG. 37 is a side view of the operation of the spring retention system of FIG. 35.

Referring to FIGS. 35-37, another spring retention system 3600 for retaining data media 102 in a data media storage device will be described. Spring retention system 3600 provides a spring mechanism 3604 attached to one side, for example a top portion, of a housing 3602 of any of a variety of media storage devices.

Spring mechanism 3604 provides a force for securing data media 102 in slots (not shown) within housing 3602. The top portion of the housing 3602 may have a plurality of spring alignment members 3606 and one or more spring tabs 3608. The spring alignment members 3606 may be configured similar to spring alignment members 3406 (FIGS. 34 and 35). The top portion of the housing 3602 may also have one or more guide tabs 3608. Guide tabs 3608 have a tab portion 3612 and an elongate portion 3614 defined by a break 3610 in the top portion of the housing 3602. As best illustrated in FIGS. 36 & 37, tab portion 3612 extends substantially normal to the elongate portion 3614 defined by break 3610. One of ordinary skill in the art will appreciate that the break 3610 that defines elongate portion 3614 provides for some deflection of the guide tab 3608 with respect to the top portion of housing 3602. In this manner, guide tabs 3608 operate as cantilevered springs.

Spring mechanism 3604 may be attached to the top portion of the housing 3602. The spring mechanism 3604 comprises a mounting portion 3620 from which extend a plurality of fingers 3622 and a plurality of spring tabs 3624. Fingers 3620 may be configured in much the same manner as fingers 2730 (FIG. 29). Spring tabs 3624 may be configured in much the same manner as tabs 2732 (FIG. 29). As best illustrated in FIG. 37, spring retention system 3600 provides for another convenient method for attaching spring mechanism 3604 to housing 3602. For example, spring mechanism 3604 may be attached to housing 3402 by sliding spring tabs 3424 through the openings in spring alignment members 3606. As spring mechanism 3604 slides, mounting portion 3620 may apply a force to tab portion 3612, thereby deflecting guide tab 3608 away from the top portion of housing 3602. This deflection enables spring mechanism 3604 to be easily positioned with respect to spring alignment members 3606. When spring mechanism 3604 is in the proper position within spring alignment members 3606, the edge of the mounting portion 3620 of spring mechanism 3604 preferably clears the tab portion 3612 of guide tab 3608, thereby returning the guide tab 3608 to the un-deflected position. In the un-deflected position, guide tabs 3608 prevent spring mechanism 3604 from sliding within the openings in the spring alignment members, while the spring alignment members 3606 retain spring mechanism 3604 relative to lateral and vertical movement.

It should be emphasized that the above-described embodiments, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

Therefore, having thus described the invention, at least the following is claimed:

1. A data storage system comprising:
a system housing having an opening, and reference structures located adjacent the opening;
a media storage device for storing a plurality of data media, the media storage device comprising a device housing configured to receive the plurality of data media, the device housing having alignment structures, each of which slidably engages with a respective one of the reference structures such that the media storage device may be inserted into and removed from the system housing by slidably engaging the reference structures and the alignment structures and guiding the media storage device through the opening of the system housing along a longitudinal axis of the device housing, the data media being inserted into and removed from the device housing along an axis transverse to the longitudinal axis;
a spring mechanism having lingers configured to engage the corresponding plurality of data media to secure the plurality of data media in the device housing;
a drawer to receive the media storage device, the drawer being moveable between a retracted position and an extended position through the opening of the system housing, and
guide rails provided with the system housing and drawer to enable movement of the drawer between the retracted and extended positions, the guide rails being separate from the reference structures.

2. The data storage system of claim 1, wherein the guide rails comprise a first guide rail attached to the drawer, a second guide rail attached to the system housing, and a third guide rail slidably engaged to the first and second guide rails.

3. The data storage system of claim 1, wherein engagement of the reference structures and respective alignment structures lifts the media storage device from the drawer.

4. The data storage system of claim 3, wherein engagement of the reference structures and respective alignment structures when the drawer is in the retracted position determines a position of the media storage device in the data storage system housing instead of the drawer determining the position of the media storage device.

5. The data storage system of claim 1, wherein the drawer and media storage device are an integrated unit.

6. The data storage system of claim 1, wherein the fingers comprise respective locking elements configured to secure respective data media.

7. The data storage system of claim 1, wherein the drawer comprises supplemental slots defined by one or more slot dividers to receive spare data media, the supplemental slots separate from the media storage device.

8. A data storage system comprising:
a data storage system housing having an opening and reference structures;
a media storage device for storing a plurality of data media devices, the media storage device having a housing with alignment structures to slidably engage the respective reference structures to enable slidable movement of the media storage device through the opening of the data storage system housing;
a spring mechanism having plural fingers configured to engage and secure the corresponding plurality of data media in the device housing;
a moveable media exchange device to receive the media storage device, the media exchange device moveable between a retracted position and an extended position, wherein the media storage device is positioned inside the data storage system housing when the media exchange device is in the retracted position, and wherein the media storage device protrudes from the data storage system housing when the media exchange device is in the extended position; and
guide structure provided with the system housing and movable media exchange device; to moveably guide the media exchange device between the retracted and extended positions.

9. The data storage system of claim 8, wherein the media storage device further comprises a locking plate attached to the device housing and configured to engage a locking mechanism located in the opening in the system housing.

10. The data storage system of claim 8, wherein the housing of the media storage device is molded from plastic.

11. The data storage system of claim 8, wherein the device housing further comprises a handle configured to enable an operator to apply a force substantially parallel to the alignment structures such that when the alignment structures engage the reference structures the media storage device may be inserted and removed from the system housing.

12. The data storage system of claim 8, wherein the spring mechanism has a first end and a second end, the first end being operationally attached to the top of the device housing; and
each finger is attached to the second end of the spring mechanism.

13. The data storage system of claim 8, wherein the device housing comprises a plurality of slots defined by a plurality of dividers positioned in spaced-apart relation within the device housing, and wherein the spring mechanism and fingers are configured to engage and secure the corresponding plurality of data media in respective slots.

14. The data storage system of claim 8, wherein the spring mechanism comprises a metallic strip.

15. The data storage system of claim 8 further comprising:
an automated drive system adapted to, in response to user input, move the media exchange device between the retracted position and the extended position.

16. The data storage system of claim 15, wherein the drive system has a motor to cause movement of the media exchange device.

17. The data storage system of claim 16, wherein the drive system has a drive gear driven by the motor to cause movement of the media exchange device.

18. The data storage system of claim 8, wherein the media exchange device comprises a drawer, and
the drawer having supplemental slots to store spare data media, the supplemental slots separate from the media storage device.

19. The data storage system of claim 18, further comprising at least another media storage device for storing a plurality of data media,
wherein the drawer has trays to receive respective media storage devices,
the supplemental slots being separate from the media storage devices.

20. The data storage system of claim 8, wherein the media exchange device comprises a first drawer, and the data storage system further comprises:

at least another media storage device for storing a plurality of data media, the media storage devices stacked in a vertical stack arrangement; and at least another moveable drawer to receive the at least another media storage device.

21. The data storage system of claim 8, wherein the guide structures are separate from the reference structures and alignment structures.

22. The data storage system of claim 21, wherein the media storage device has a plurality of slot configured to receive respective data media devices.

23. The data storage system of claim 8, wherein the reference structures comprise elongate reference rails, and wherein the alignment structures comprise elongate alignment grooves.

24. The data storage system of claim 8, wherein the fingers comprise respective locking elements configured to secure respective data media.

* * * * *

UNITED STATES PATENT AND TRADEMARK OFFICE
CERTIFICATE OF CORRECTION

PATENT NO. : 7,455,375 B2  Page 1 of 1
APPLICATION NO. : 09/938159
DATED : November 25, 2008
INVENTOR(S) : Paul Clinton Coffin et al.

It is certified that error appears in the above-identified patent and that said Letters Patent is hereby corrected as shown below:

In column 31, line 29, in Claim 1, delete "lingers" and insert -- fingers --, therefor.

In column 31, line 35, in Claim 1, before "and" delete "," and insert -- ; --, therefor.

In column 32, line 16, in Claim 8, delete "structure" and insert -- structures --, therefor.

In column 32, lines 16-17, in Claim 8, delete "movable" and insert -- moveable --, therefor.

In column 32, line 17, in Claim 8, delete "device;" and insert -- device --, therefor.

In column 34, line 2, in Claim 22, delete "slot" and insert -- slots --, therefor.

Signed and Sealed this

Twelfth Day of May, 2009

JOHN DOLL
*Acting Director of the United States Patent and Trademark Office*